(12) United States Patent
Haga et al.

(10) Patent No.: US 7,626,761 B2
(45) Date of Patent: Dec. 1, 2009

(54) FLY'S-EYE LENS SHEET HAVING LIGHT-SHIELDING LAYER, METHOD FOR FABRICATING THE SAME, TRANSMISSIVE SCREEN, AND REAR PROJECTION IMAGE DISPLAY DEVICE

(75) Inventors: Yumi Haga, Miyagi (JP); Yukio Miyaki, Kanagawa (JP); Hiroyuki Kiso, Miyagi (JP); Tsutomu Nagahama, Miyagi (JP); Shinichi Matsumura, Miyagi (JP)

(73) Assignee: Sony Corporation, Tokyo (JP)

( * ) Notice: Subject to any disclaimer, the term of this patent is extended or adjusted under 35 U.S.C. 154(b) by 568 days.

(21) Appl. No.: 11/445,194

(22) Filed: Jun. 2, 2006

(65) Prior Publication Data
US 2006/0285214 A1 Dec. 21, 2006

(30) Foreign Application Priority Data
Jun. 3, 2005 (JP) ............................. 2005-164857
Jun. 3, 2005 (JP) ............................. 2005-164858
May 26, 2006 (JP) ............................. 2006-146908

(51) Int. Cl.
*G03B 21/60* (2006.01)
(52) U.S. Cl. .................................................. 359/456
(58) Field of Classification Search ......... 359/455–457, 359/460
See application file for complete search history.

(56) References Cited

U.S. PATENT DOCUMENTS

| | | | | |
|---|---|---|---|---|
| 4,666,248 A | * | 5/1987 | van de Ven | 359/457 |
| 5,870,225 A | | 2/1999 | Ogino et al. | |
| 6,256,145 B1 | | 7/2001 | Kono et al. | |
| 6,342,121 B1 | | 1/2002 | Ito et al. | |
| 7,167,306 B2 | * | 1/2007 | Sakaguchi et al. | 359/457 |
| 2005/0083571 A1 | | 4/2005 | Shimizu | |

FOREIGN PATENT DOCUMENTS

| | | |
|---|---|---|
| JP | 9-120102 | 5/1997 |
| JP | 10-293362 | 11/1998 |

* cited by examiner

*Primary Examiner*—Christopher Mahoney
(74) *Attorney, Agent, or Firm*—Oblon, Spivak, McClelland, Maier & Neustadt, L.L.P.

(57) ABSTRACT

A fly's-eye lens sheet having a light-shielding layer includes a fly's-eye lens sheet body provided with fly's-eye lenses on one principal surface thereof, the light-shielding layer provided on the other principal surface of the fly's-eye lens sheet body, and a photosensitive adhesive layer disposed between the fly's-eye lens sheet body and the light-shielding layer, the photosensitive adhesive layer having adhesive and non-adhesive patterns, wherein the light-shielding layer includes a light-shielding portion disposed on the adhesive pattern and transmitting portions disposed on the non-adhesive pattern for transmitting light transmitted through the fly's-eye lenses, the transmitting portions are located at positions corresponding to light-collecting parts of the fly's-eye lenses, and the light-shielding portion contains carbon particles, the content of the carbon particles being 45% to 65% by weight.

19 Claims, 23 Drawing Sheets

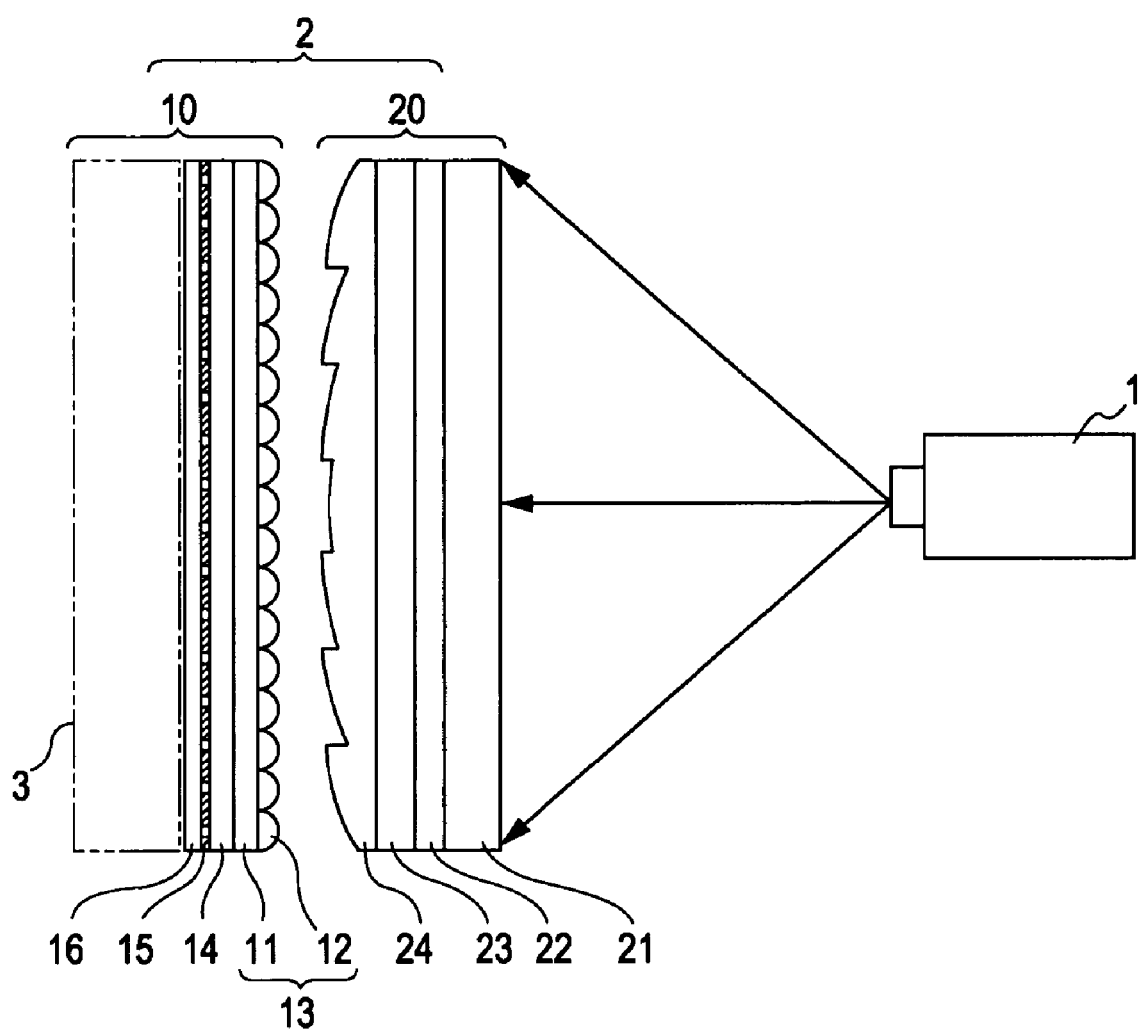

FIG. 9
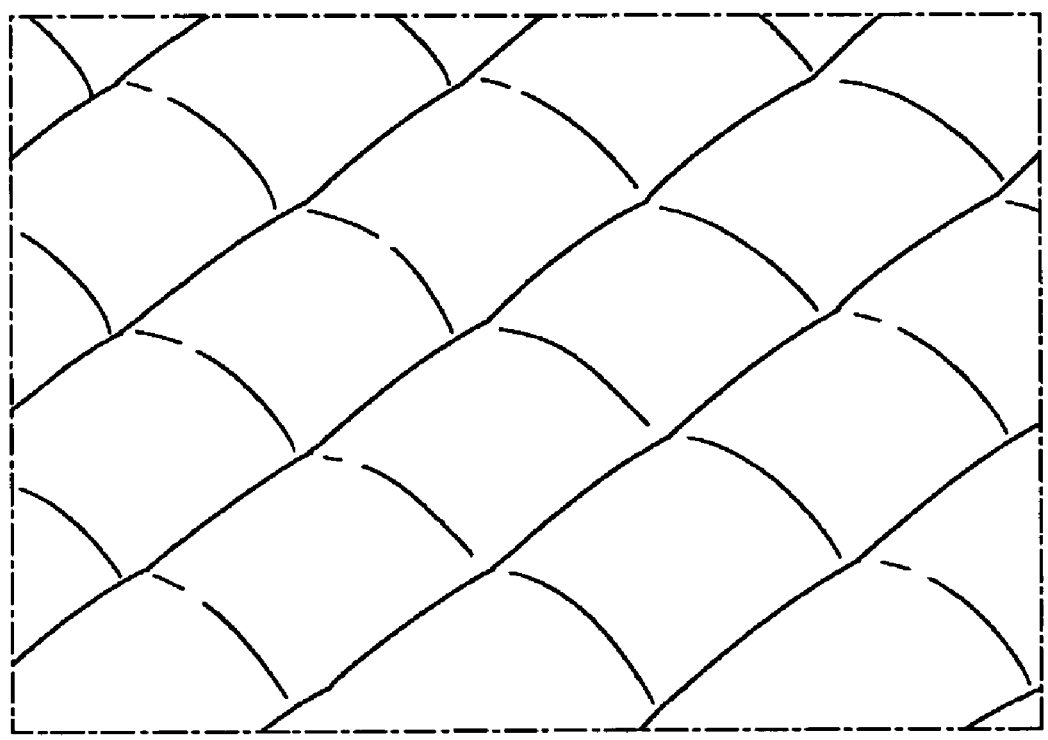
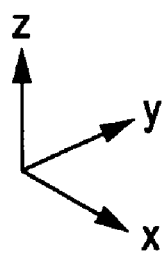

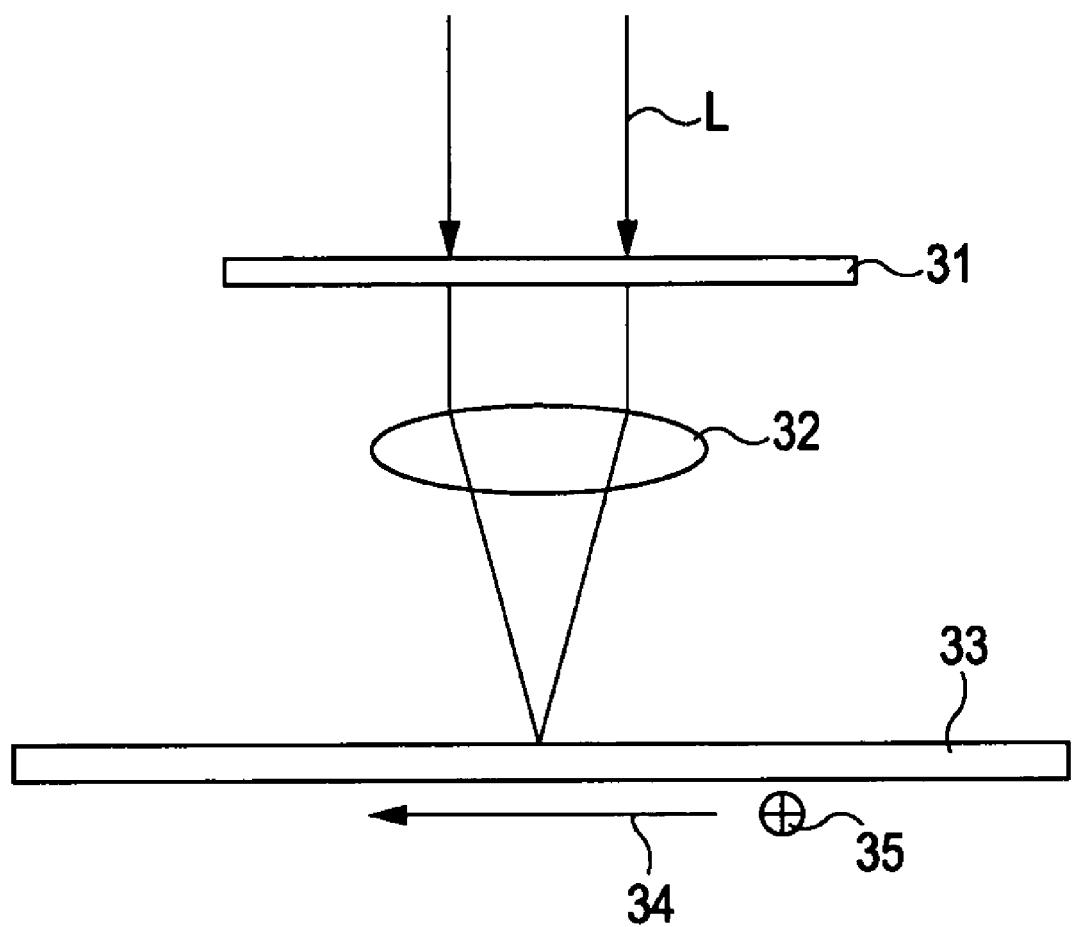

FLY'S-EYE LENS SHEET HAVING LIGHT-SHIELDING LAYER, METHOD FOR FABRICATING THE SAME, TRANSMISSIVE SCREEN, AND REAR PROJECTION IMAGE DISPLAY DEVICE

CROSS REFERENCES TO RELATED APPLICATIONS

The present invention contains subject matter related to Japanese Patent Application JP 2005-164857 filed on Jun. 3, 2005, Japanese Patent Application JP 2005-164858 filed on Jun. 3, 2005, and Japanese Patent Application JP 2006-146908 filed on May 26, 2006, in the Japanese Patent Office, the entire contents of which are incorporated herein by reference.

BACKGROUND OF THE INVENTION

1. Field of the Invention

The present invention relates to a fly's-eye lens sheet having a light-shielding layer, the fly's-eye lens sheet including a fly's-eye lens sheet body, fly's-eye lenses disposed on one principal surface thereof, and the light-shielding layer disposed on the other principal surface thereof; a method for fabricating the fly's-eye lens sheet; a transmissive screen; and a rear projection image display device.

2. Description of the Related Art

Image display devices in which transmitted light from light sources is modulated by optical elements, such as liquid crystal elements, to display images are known. In such image display devices, external light, such as fluorescent light, present on the side of the viewer is reflected from the display surfaces of the image display devices, resulting in reduction of the contrast of image light and degradation in image quality.

In order to improve the contrast of image light, a method of increasing the intensity of the image light source or a method of reducing reflection of external light in the image display device is employed. In order to display rich color with depth and texture, the latter method, i.e., suppression of reflection of external light, is particularly important.

For example, in rear projection televisions (rear projection image display devices) which have been receiving attention in recent years, transmissive screens are used so as to achieve high transmittance with respect to image light from light sources and to reduce the reflectance of external light, the transmissive screens each having a cylindrical lens on one surface and a light-shielding layer (black stripes) that absorbs external light on the other surface (refer to Japanese Unexamined Patent Application Publication No. 10-293362 (Patent Document 1)).

Furthermore, in order to form a light-shielding layer with high positional accuracy on a cylindrical lens sheet, a method of fabricating a transmissive screen using a photosensitive adhesive layer is known (refer to Japanese Unexamined Patent Application Publication No. 9-120102 (Patent Document 2)). In this method, first, a photosensitive adhesive layer is formed on the viewing surface of a lens sheet. A positive-type adhesive that loses adhesion when exposed to light is used for the photosensitive adhesive layer. A sensitizing source, such as ultraviolet light, is applied from the lens side of the lens sheet to expose the photosensitive adhesive layer. Thereby, the light-collecting portion of the photosensitive adhesive layer is exposed and adhesion is lost. Subsequently, a black layer supported by a support base is bonded to the photosensitive adhesive layer provided with adhesive and non-adhesive patterns, and then the support base is peeled off to transfer the black layer to the adhesive pattern. Thus, a light-shielding pattern with a predetermined shape is formed on the viewing surface of the lens sheet.

SUMMARY OF THE INVENTION

As display images with higher definition have been produced in recent years, there has been a demand for transmissive screens which achieve higher contrast ratios of display images. In such a transmissive screen, in order to increase the contrast ratio of an image, it is necessary to increase the area ratio of the light-shielding portion while suppressing a decrease in the transmittance of image light and to form fine transmitting portions in the light-shielding layer.

It is desirable to provide a fly's-eye lens sheet having a light-shielding layer in which the area ratio of the light-shielding portion can be increased while suppressing a decrease in the transmittance of image light and fine transmitting portions can be formed; a method for fabricating the fly's-eye lens sheet; a transmissive screen; and a rear projection image display device.

According to an embodiment of the present invention, a fly's-eye lens sheet having a light-shielding layer includes a fly's-eye lens sheet body provided with fly's-eye lenses on one principal surface thereof, the light-shielding layer provided on the other principal surface of the fly's-eye lens sheet body, and a photosensitive adhesive layer disposed between the fly's-eye lens sheet body and the light-shielding layer, the photosensitive adhesive layer having adhesive and non-adhesive patterns, wherein the light-shielding layer includes a light-shielding portion disposed on the adhesive pattern and transmitting portions disposed on the non-adhesive pattern for transmitting light transmitted through the fly's-eye lenses, the transmitting portions are located at positions corresponding to light-collecting parts of the fly's-eye lenses, and the light-shielding portion contains carbon particles, the content of the carbon particles being 45% to 65% by weight.

In such a structure, the transmitting portions can be formed two-dimensionally in the light-shielding layer, and thus by increasing the area ratio of the light-shielding portion while suppressing a decrease in the transmittance, the contrast can be improved.

Furthermore, by setting the content of the carbon particles constituting the light-shielding portion in the range of 45% to 65% by weight, the transmitting portions can be formed with high accuracy so as to correspond to the adhesive and non-adhesive patterns of the photosensitive adhesive layer. Thus, fine transmitting portions can be formed. If the content of the carbon particles is less than 45% by weight, black density is insufficient and the light-shielding property is degraded. On the other hand, if the content of the carbon particles exceeds 65% by weight, the content of carbon particles is excessive, and there is concern that cracks and separation of the carbon particles may occur.

The area of the light-shielding layer corresponds to the sum of the area of the light-shielding portion and the area of the transmitting portions. Preferably, the area of the light-shielding portion is set at 75% or more of the area of the entire light-shielding layer, and thus image display with high contrast can be performed.

The area ratio of the light-shielding portion (area ratio of the light-shielding portion to the entire light-shielding layer) greatly depends on the processing accuracy of the transmitting portions. Consequently, when the light-shielding portion is formed by transferring a black layer corresponding to the adhesive pattern of the photosensitive adhesive layer, in order to form the transmitting portions lying on the non-adhesive pattern with higher accuracy, it is preferable to form concave portions on the light-shielding layer side surface of the non-adhesive pattern. By the formation of the concave portions, the area in which the black layer is in contact with the non-adhesive pattern can be greatly reduced, and remaining of the black layer on the non-adhesive pattern can be suppressed. Thus, transmitting portions can be formed with high accuracy.

Preferably, the depth of the concave portions on the non-adhesive pattern is 0.05 μm or more. At a depth of less than 0.05 μm, it is not possible to improve the formation accuracy of the transmitting portions. The concave portions may be formed using shrinkage of exposed portions of the photosensitive adhesive layer.

Furthermore, preferably, the thickness of the light-shielding layer is 0.5 to 2.0 μm. At a thickness of less than 0.5 μm, the black density is insufficient and the external light-shielding property is degraded. At a thickness exceeding 2.0 μm, the thickness of the coating film is too large, which may cause cracks.

The lens pitch of the fly's-eye lens array is preferably 35 to 150 μm. At less than 35 μm, the light-collecting parts become excessively small, resulting in difficulty in forming the transmitting portions. At more than 150 μm, moiré is likely to occur.

The fly's-eye lens sheet body may include fly's-eye lenses and a film-like support base supporting the fly's-eye lenses. Preferably, the thickness of the support base is 35 to 105 μm. If the thickness is outside this range, an out-of-focus shape of light collection occurs and the formation accuracy of the transmitting portions is degraded.

According to the embodiment of the present invention, a method for fabricating a fly's-eye lens sheet having a light-shielding layer having the structure described above includes the steps of forming a photosensitive adhesive layer on one surface of a fly's-eye lens sheet body provided with fly's-eye lenses on the other surface thereof, applying ultraviolet light to the photosensitive adhesive layer through the fly's-eye lenses to form adhesive and non-adhesive patterns on the photosensitive adhesive layer; and forming transmitting portions at positions corresponding to light-collecting parts of the fly's-eye lenses by bringing a black transfer film into contact with the surface of the photosensitive adhesive layer and then peeling the black transfer film away from the photosensitive adhesive layer, the black transfer film including a black layer containing 45% to 65% by weight of carbon particles provided on one principal surface of a support base.

According to an embodiment of the present invention, a transmissive screen for a rear projection image display device includes a combination of a Fresnel lens and the fly's-eye lens sheet having the light-shielding layer according to the embodiment of the present invention.

As described above, according to the embodiment of the present invention, it is possible to obtain a transmissive screen having a large area ratio of a light-shielding portion and good transmittance, and thus higher contrast ratios of display images can be achieved.

BRIEF DESCRIPTION OF THE DRAWINGS

FIG. 1 is a schematic diagram showing an example of a structure of a rear projection image display device according to a first embodiment of the present invention;

FIG. 9 is a schematic diagram showing an example of a fly's-eye lens sheet having the transmitting portion shown in FIG. 8A or 8B;

FIG. 13 is a schematic diagram showing the principle of laser-beam machining;

DESCRIPTION OF THE PREFERRED EMBODIMENTS

Figure 2A:
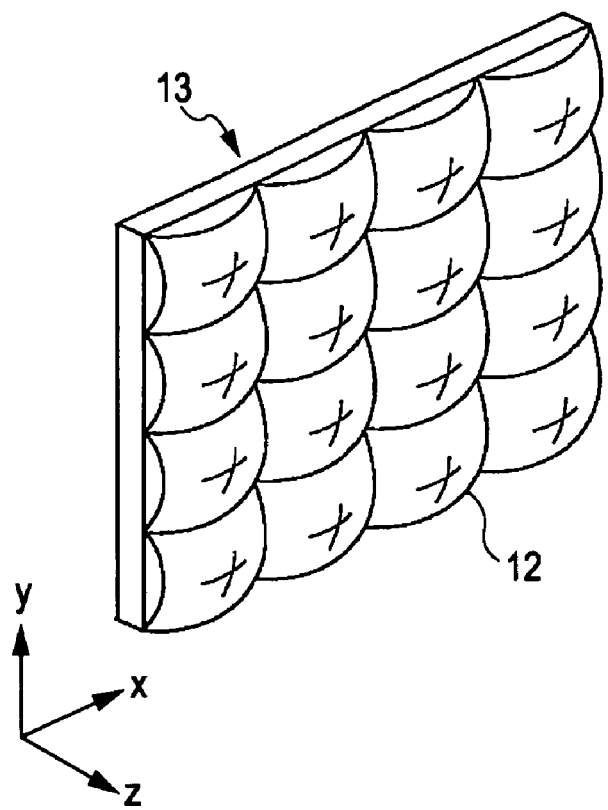
FIGS. 2A and 2B are perspective views each showing the appearance of a fly's-eye lens sheet having a light-shielding layer according to the first embodiment of the present invention.

Embodiments of the invention will be described below with reference to the drawings. The same or corresponding part is designated by the same reference numeral throughout the drawings in the embodiments.

First Embodiment

[Overall Structure of Rear Projection Image Display Device]

FIG. 1 is a schematic diagram showing an example of a structure of a rear projection image display device according to a first embodiment of the present invention. This rear projection image display device includes a projector 1 and a transmissive screen 2, and an image projected from the projector 1 is transmitted through the transmissive screen 2 for display.

The projector 1 enlarges and projects an image on the transmissive screen 2. As the projector 1, for example, a projector in which liquid crystal display elements or digital light processing "DLP (Registered Trademark)" elements are used as light valves may be used. As the projector 1 provided with liquid crystal display elements, for example, a projector provided with transmissive liquid crystal display elements or reflective liquid crystal display elements may be used. The transmissive screen 2 displays an image projected by the projector 1.

[Overall Structure of Transmissive Screen]

As shown in FIG. 1, the transmissive screen 2 according to the first embodiment includes a Fresnel lens sheet 20 which has a function of emitting projected light from the projector 1 as substantially collimated light, and a fly's-eye lens sheet 10 having a light-shielding layer, the fly's-eye lens sheet 10 receiving collimated light emitted from the Fresnel lens sheet 20 and expanding the collimated light horizontally and vertically to emit it as display light. In the transmissive screen 2, the Fresnel lens sheet 20 is disposed on the projector 1 side, and the fly's-eye lens sheet 10 having the light-shielding layer is disposed on the viewer side. The size of the transmissive screen 2 is not particularly limited, and for example, the transmissive screen 2 has a rectangular shape with a size of 786 mm in height and 1,362 mm in width (60 inches diagonally).

A Fresnel lens 24 is provided on the viewer side surface of the Fresnel lens sheet 20. On the other hand, the projector side surface of the Fresnel lens sheet 20 is planar. Furthermore, fly's-eye lenses 12 are provided on the projector side surface of the fly's-eye lens sheet 10 having the light-shielding layer. On the other hand, a light-shielding layer 15 is provided on the viewer side surface of the fly's-eye lens sheet 10 having the light-shielding layer. As necessary, a plastic plate 3, such as a diffuser plate, may be disposed on the light-shielding layer 15 with an adhesive layer 16 therebetween. The Fresnel lens sheet 20 and the fly's-eye lens sheet 10 having the light-shielding layer are disposed so that the individual lens portions face with each other.

The structures of the Fresnel lens sheet 20 and the fly's-eye lens sheet 10 having the light-shielding layer will be described more specifically below.

[Structure of Fresnel Lens Sheet]

The Fresnel lens sheet 20 includes a substrate 21 and a film 23 provided with the Fresnel lens 24 on one principal surface thereof. The substrate 21 and the film 23 are bonded to each other through an adhesive layer 22. The substrate 21 is composed of a transparent material, and for example, a glass substrate is used.

As the film 23, a film composed of a transparent plastic can be used, and for example, a polyethylene terephthalate (PET) film may be used. The Fresnel lens 24, for example, has a structure in which prisms are arranged concentrically from the center of the Fresnel lens sheet 20. The Fresnel lens 24 can be produced by a known method. For example, a production method using a UV curable resin may be employed.

[Structure of Fly's-Eye Lens Sheet Having Light-Shielding Layer]

The fly's-eye lens sheet 10 includes a fly's-eye lens sheet body 13, a photosensitive adhesive layer 14 disposed on the viewer side surface of the fly's-eye lens sheet body 13, a light-shielding layer 15 disposed on the photosensitive adhesive layer 14, and a plastic plate 3 disposed on the light-shielding layer 15 with an adhesive layer 16 therebetween. The fly's-eye lens sheet body 13 includes a film 11 which is a support base and fly's-eye lenses 12 disposed on the projector side surface of the film 11. The size of the fly's-eye lens sheet 10 depends on the size of the intended transmissive screen. For example, the fly's-eye lens sheet 10 has a rectangular shape with a size of 786 mm in height and 1,362 mm in width (60 inches diagonally).

Figure 2B:
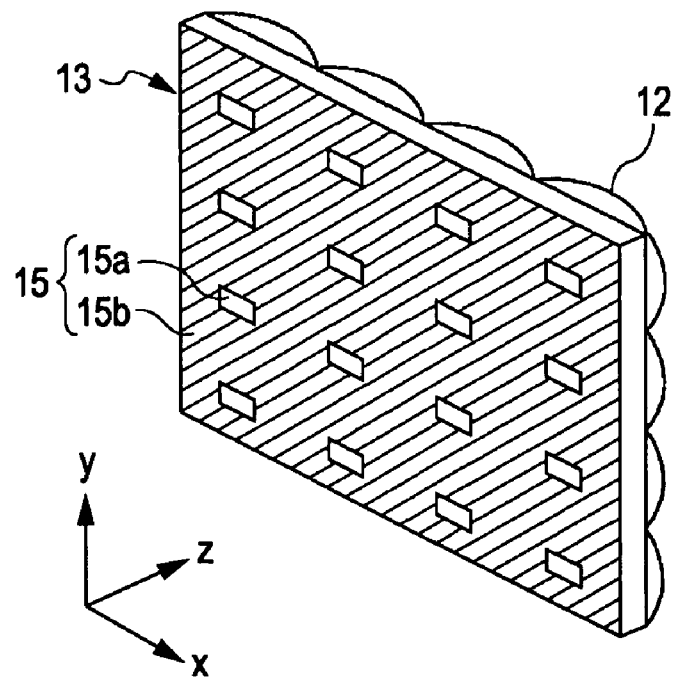

FIG. 2A is a perspective view showing the appearance of the projector side surface of the fly's-eye lens sheet 10 having the light-shielding layer. FIG. 2B is a perspective view showing the appearance of the viewer side surface of the fly's-eye lens sheet 10 having the light-shielding layer. As shown in FIGS. 2A and 2B, the x-axis is set along the lateral direction of the fly's-eye lens sheet 10, the y-axis is set along the longitudinal direction of the fly's-eye lens sheet 10, and the z-axis is set along the thickness direction of the fly's-eye lens sheet 10. In order to facilitate the description of the light-shielding layer 15, the plastic plate 3 is not shown in FIG. 2B.

The fly's-eye lens sheet body 13 is used to collect collimated light emitted from the Fresnel lens sheet 20. The photosensitive adhesive layer 14 is used when the light-shielding layer 15 is formed, as will be described below. The light-shielding layer 15 absorbs external light and improves the contrast of an image displayed on the transmissive screen 2. The plastic plate 3 is used to improve the rigidity and self-supporting property of the fly's-eye lens sheet body 13 and to diffuse the light transmitted through the fly's-eye lens sheet body 13. Note that, as the plastic plate 3, a transparent plastic plate without a light-diffusion function may be used. In such a case, in order to impart a diffusion function, a diffusion sheet may be laminated to the surface of the plastic plate.

As shown in FIG. 2A, a plurality of fly's-eye lenses 12 are densely arrayed on the projector side surface of the fly's-eye lens sheet 10. The symbol "+" attached to each fly's-eye lens 12 represents the position of an apex of the lens.

As shown in FIG. 2B, the light-shielding layer 15 includes transmitting portions 15a provided at positions corresponding to the fly's-eye lenses 12 provided on the projector side surface. The transmitting portions 15a are openings formed in the light-shielding layer 15, and light collected by the fly's-eye lenses 12 is emitted through the transmitting portions 15a toward the viewer. The region other than the transmitting portions 15a of the light-shielding layer 15 functions as the light-shielding portion 15b that absorbs external light.

Figure 3A:
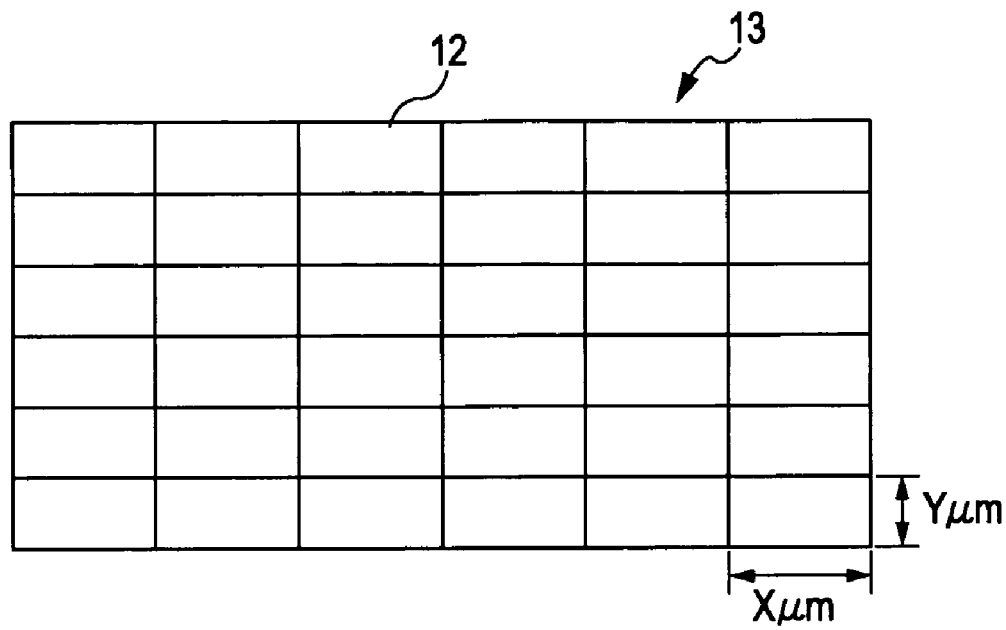
FIGS. 3A and 3B are plan views each showing a fly's-eye lens sheet having a light-shielding layer according to the first embodiment of the present invention.

FIG. 3A is a plan view showing an example of the fly's-eye lenses 12. Each fly's-eye lens 12 has a quadrangular shape, such as a square or rectangular shape, when viewed from a direction perpendicular to the fly's-eye lens sheet body 13. The plurality of fly's-eye lenses 12 are periodically arrayed both in the x-axis direction and in the y-axis direction to form a dense array. The lens pitch X in the x-axis direction is set preferably at 35 to 150 μm, and for example, at 100 μm. The lens pitch Y in the y-axis direction is set preferably at 35 to 150 μm, and for example, at 60 μm. At less than 35 μm, the size of the light-collecting parts becomes excessively small, resulting in difficulty in forming the transmitting portions 15a. If the lens pitch exceeds 150 μm, there is concern that moiré may occur.

Figure 3B:
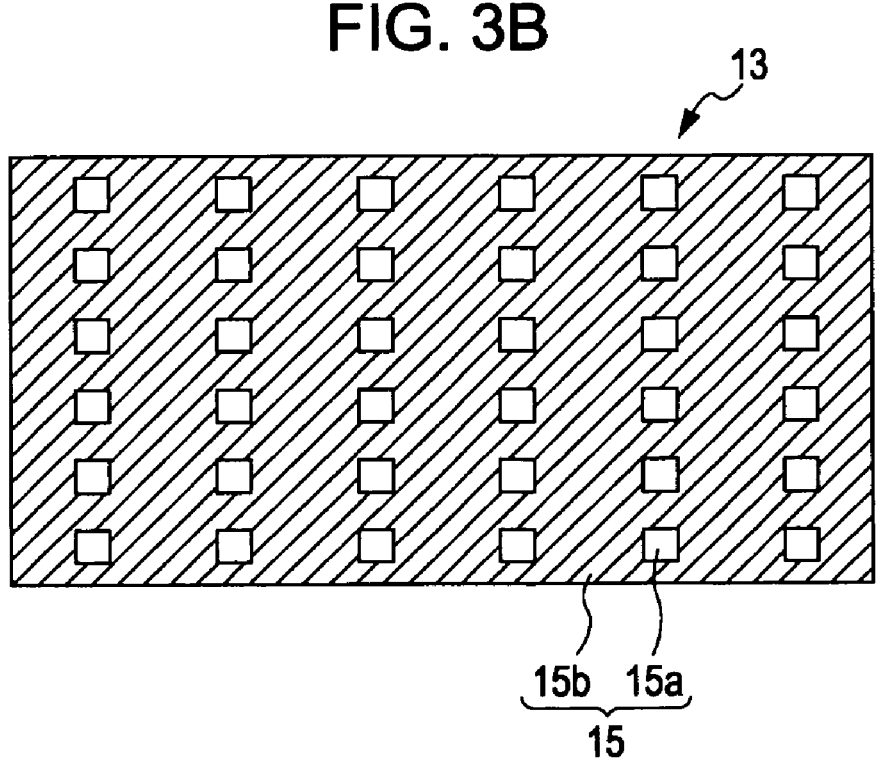
Figure 4A:
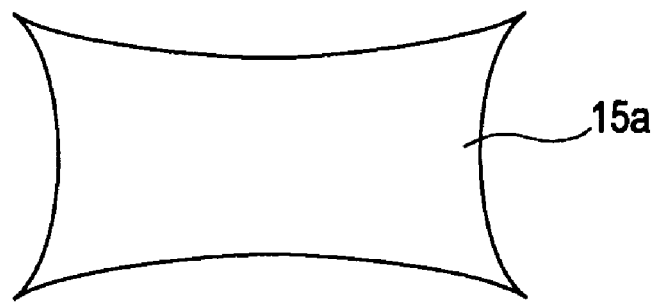
FIGS. 4A to 4C are schematic diagrams each showing an example of the shape of a transmitting portion.
Figure 4B:
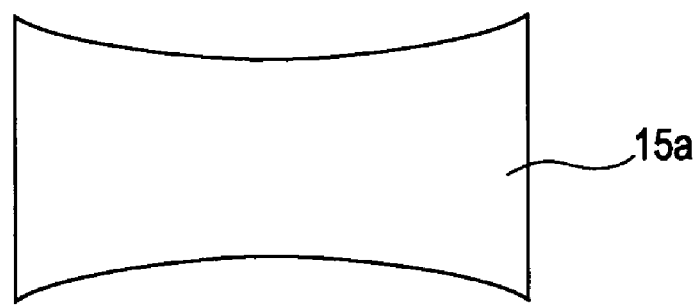
Figure 4C:
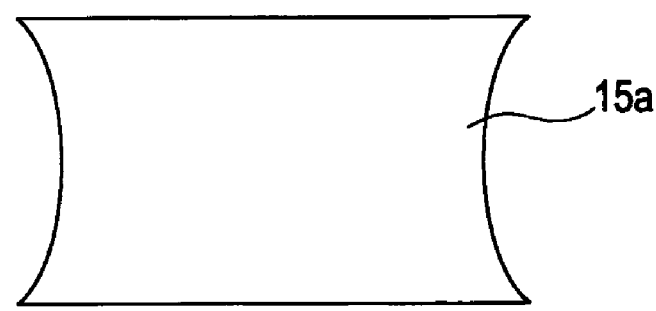
Figure 5A:
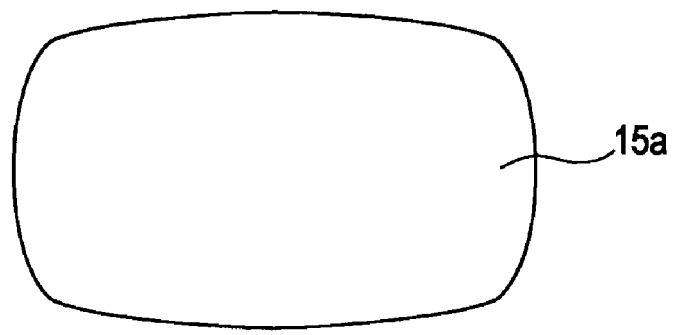
FIGS. 5A to 5C are schematic diagrams each showing an example of the shape of a transmitting portion.
Figure 5B:
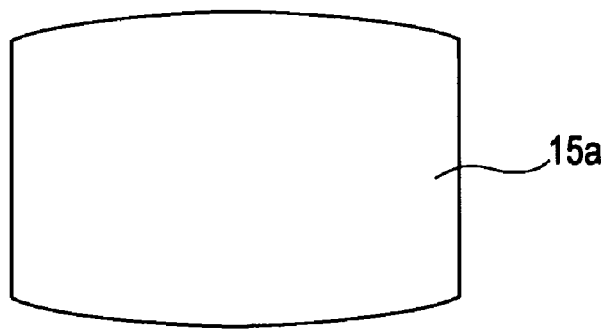
Figure 5C:
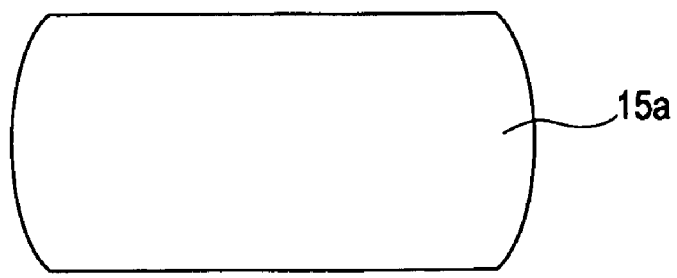

FIG. 3B is a plan view showing an example of the light-shielding layer 15. FIGS. 4A to 4C and 5A to 5C are schematic diagrams each showing an example of the shape of the transmitting portion 15a. A plurality of transmitting portions 15a provided on the light-shielding layer 15 are periodically arrayed both in the x-axis direction and in the y-axis direction. The shape of the transmitting portion 15a depends on the lens design of the fly's-eye lens 12, and for example, is set to be substantially quadrangular. Examples of the substantially quadrangular shape include, in addition to a quadrangular shape, a shape in which each of the four sides of a quadrangle is curved toward the center (refer to FIG. 4A), a shape in which each of the two sides in the x-axis direction (lateral direction) or in the y-axis direction (longitudinal direction) of a quadrangle is curved toward the center (refer to FIGS. 4B and 4C), a shape in which each of the four sides of a quadrangle is curved outward (refer to FIG. 5A), and a shape in which each of the two sides in the x-axis direction (lateral direction) or in the y-axis direction (longitudinal direction) of a quadrangle is curved outward (refer to FIGS. 5B and 5C). Note that the shape of the opening of the transmitting portion 15a shown in each of the drawings is schematically shown. The opening may not always be formed by a clearly straight line or curved line as shown in the drawings, but examples of the opening may include an opening formed by an indented or irregularly straight line or curved line.

Figure 6A:
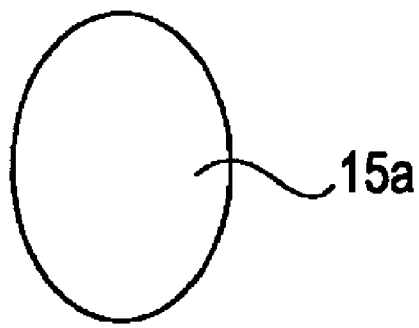
FIGS. 6A to 6C are schematic diagrams each showing an example of the shape of a transmitting portion.
Figure 6B:
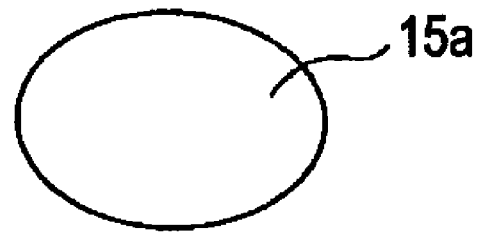
Figure 6C:
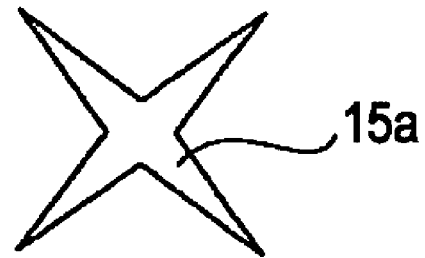

Depending on the lens design of the fly's-eye lens 12, the transmitting portion 15a may be formed so as to have an elliptic shape (refer to FIGS. 6A and 6B) or a substantially X shape (refer to FIG. 6C). In particular, it has been confirmed that with use of the substantially X-shaped transmitting portion 15a, the viewing angle characteristics of the screen can be improved. The X shape of the transmitting portion 15a can be considered to have evolved from the shape in which each of the four sides of a quadrangle is curved toward the center, which is described above with reference to FIG. 4A, and in the present specification, the shape of the transmitting portion shown in FIG. 4A or 6C is also referred to as a "modified X shape".

Figure 7A:
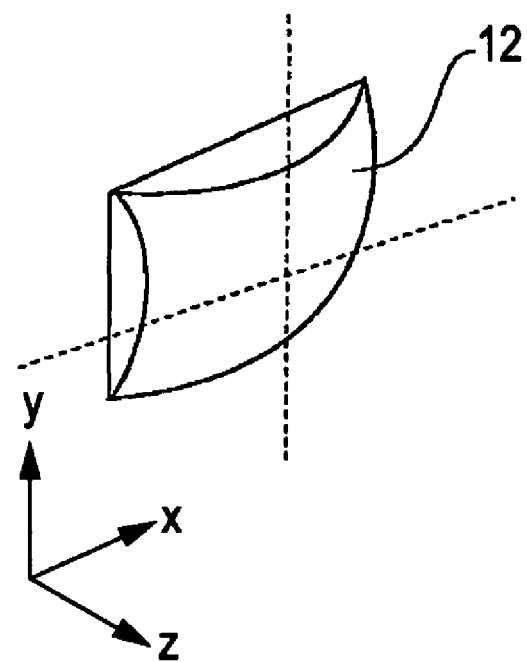
FIGS. 7A to 7C are schematic diagrams each showing an example of the shape of a fly's-eye lens.
Figure 7B:
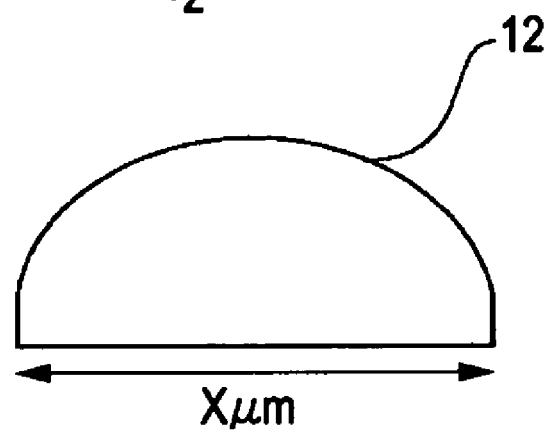
Figure 7C:
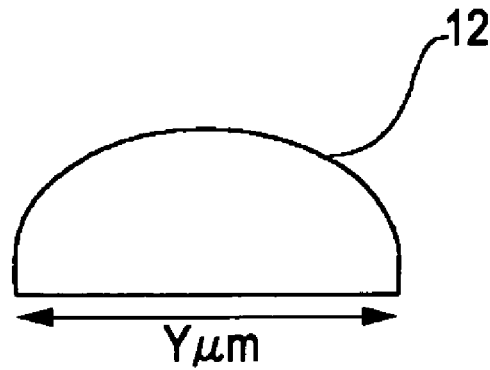

FIG. 7A is a perspective view showing an example of the shape of a fly's-eye lens 12. FIG. 7B is a cross-sectional view showing an example of the x-z cross section of the fly's-eye lens 12. FIG. 7C is a cross-sectional view showing an example of the y-z cross section of the fly's-eye lens 12. For example, the fly's-eye lens 12 has a spherical or aspherical shape. When a fly's-eye lens has an aspherical shape, the aspheric surface is, for example, expressed by the formula (1):

$$Z(x) = \frac{C_x x^2}{1+\sqrt{1-(k_x+1)C_x^2 x^2}} + \frac{C_y y^2}{1+\sqrt{1-(k_y+1)C_y^2 y^2}} \quad (1)$$

wherein Cx is the center curvature in the x-axis direction, Cy is the center curvature in the y-axis direction, kx is the aspherical coefficient in the x-axis direction, and ky is the aspherical coefficient in the y-axis direction.

Table 1 below shows examples of a combination of the Cx value, the Cy value, the kx value, the ky value, the lens pitch (x-pitch) in the x-axis direction (lateral direction), and the lens pitch (y-pitch) in the y-axis direction (longitudinal direction) in the formula (1). Note that these values are merely examples, and the values are appropriately set depending on the desired screen characteristics, such as the transmittance and the area ratio of the light-shielding portion.

TABLE 1

|   | Cx | Cy | x-pitch | y-pitch | kx | ky |
|---|---|---|---|---|---|---|
| 1 | 0.0225 | 0.0245 | 98 | 61 | −0.45 | −0.71 |
| 2 | 0.0150 | 0.0164 | 147 | 92 | −0.45 | −0.71 |
| 3 | 0.0280 | 0.0305 | 79 | 49 | −0.45 | −0.71 |

Figure 8A:
FIGS. 8A and 8B are each a sample photo of a substantial part of a light-shielding layer in which the shape of the opening of the transmitting portion has a linear shape or a modified linear shape.
Figure 8B:
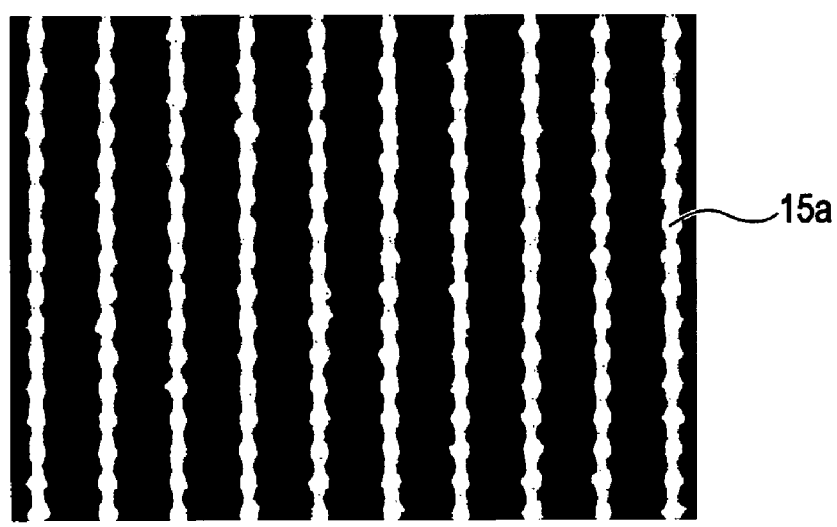

In order to increase the luminance of the screen, the fly's-eye lens is designed such that the vertical viewing angle is relatively narrow. In such a case, preferably, the transmitting portion 15a is formed so as to have a linear shape as shown in FIG. 8A or a modified linear shape as shown in FIG. 8B. The term "modified linear shape" means that the edge of the transmitting portion is not linear but is indented or irregular.

In a cylindrical lens sheet which has been used in the known transmissive screen in combination with a Fresnel lens sheet, the transmitting portion has a linear shape. However, in such a case, only the horizontal viewing angle is controlled. In contrast, in this embodiment of the present invention, by forming a fly's-eye lens sheet so that the transmitting portion has a linear shape, both the horizontal viewing angle and the vertical viewing angle can be controlled. Consequently, it is possible to obtain a high-luminance screen that is thus superior to the known transmissive screen including the cylindrical lens sheet.

FIG. 9 is a schematic diagram showing an example of a fly's-eye lens sheet having the transmitting portion shown in FIG. 8A or 8B. In this case, the fly's-eye lens is an aspherical lens in which the curvature of the cross section of the lens in the y-axis direction is far smaller than the curvature of the cross section of the lens in the x-axis direction. When a fly's-eye lens is such an aspherical lens, the aspheric surface is, for example, expressed by the formula (2):

$$Z(x) = \frac{C_x x^2 + C_y y^2}{1+\sqrt{1-(k_x+1)C_x^2 x^2 -(k_y+1)C_y^2 y^2}} \quad (2)$$

Table 2 below shows examples of a combination of the Cx value, the Cy value, the kx value, the ky value, the lens pitch (x-pitch) in the x-axis direction, and the lens pitch (y-pitch) in the y-axis direction in the formula (2). Note that these values are merely examples, and the values are appropriately set depending on the desired screen characteristics, such as the transmittance and the area ratio of the light-shielding portion.

TABLE 2

|   | Cx | Cy | x-pitch | y-pitch | kx | ky |
|---|---|---|---|---|---|---|
| 1 | 0.0218 | 0.0202 | 90 | 61 | −3.4 | 0.7 |
| 2 | 0.0227 | 0.0194 | 98 | 52 | −2.5 | 0.8 |

[Fabrication Method of Fly's-Eye Lens Sheet Having Light-Shielding Layer]

In the transmissive screen 2, the fly's-eye lens sheet 10 having the light-shielding layer to be disposed on the viewer side is fabricated by a method including the steps of (1) forming a mold by laser-beam machining, (2) forming a duplicate mold by electroforming or the like using the mold, (3) forming a fly's-eye lens sheet body using the duplicate mold, and (4) forming a light-shielding layer on the fly's-eye lens sheet body.

Figure 10A:
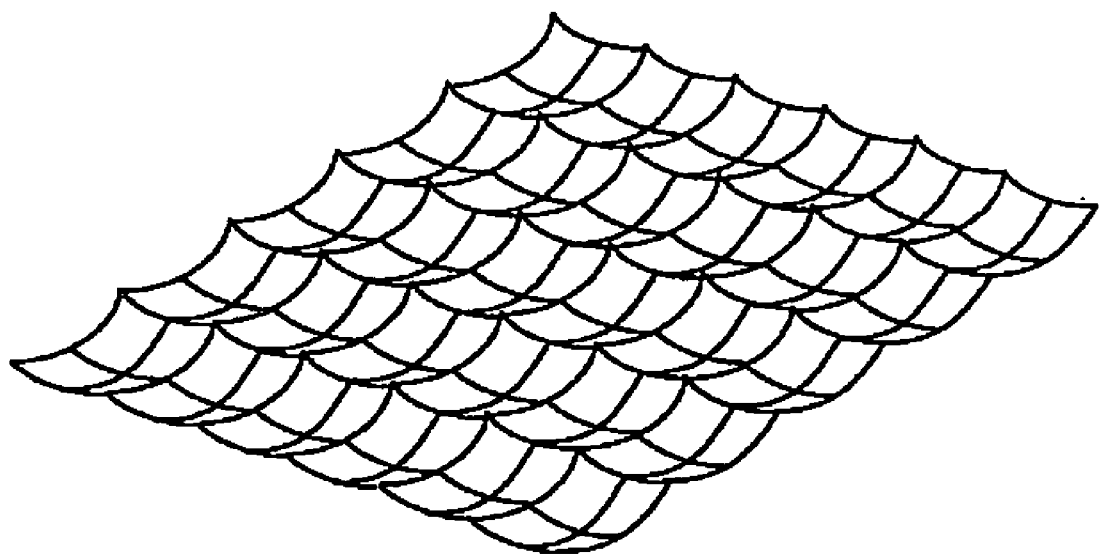
FIGS. 10A and 10B are schematic diagrams each showing a lens-forming surface of a mold.
Figure 10B:
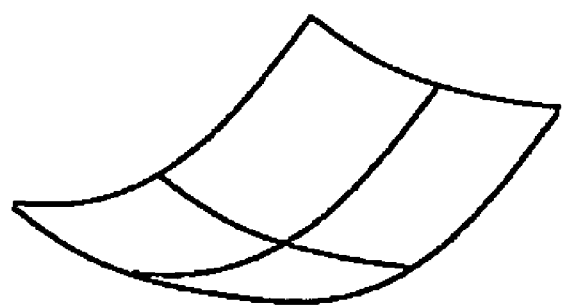

The method for fabricating the fly's-eye lens sheet having the light-shielding layer according to the first embodiment will be described in the following order:

(1) Formation of mold
(2) Formation of duplicate mold
(3) Formation of sheet body
(4) Formation of light-shielding layer
(1) Formation of Mold FIG. 10A is a schematic diagram showing a lens-forming surface of a mold. FIG. 10B is an enlarged schematic diagram showing one constitutional unit of the lens-forming surface of the mold. As shown in FIGS. 10A and 10B, a plurality of concave portions corresponding to the fly's-eye lens described above are periodically arrayed both in the longitudinal direction and in the lateral direction.

The mold for forming the fly's-eye lens sheet can be formed, for example, by machining a substrate which is a workpiece by a mask imaging method using a KrF excimer laser. As the material for the substrate, a plastic material can be used. Note that the workpiece is not limited to a substrate composed of a plastic material or the like, and a sheet or a film may be used as the workpiece. The material for the workpiece is not limited to a plastic, and a metal, glass, or the like may also be used.

As the material for the plastic substrate which is a workpiece, a known plastic can be used. In such a case, workability and the surface shape after machining change depending on the heat resistance and the glass transition point of the plastic, and therefore, preferably, the material is appropriately selected depending on the machining conditions. Use of polycarbonate is most preferable. Furthermore, the mold may be formed by a pressing method, a method using a stamper for molding, or a cutting method. In such a case, as the material for the substrate as the workpiece, not only a plastic but also a metal can be used.

Figure 11A:
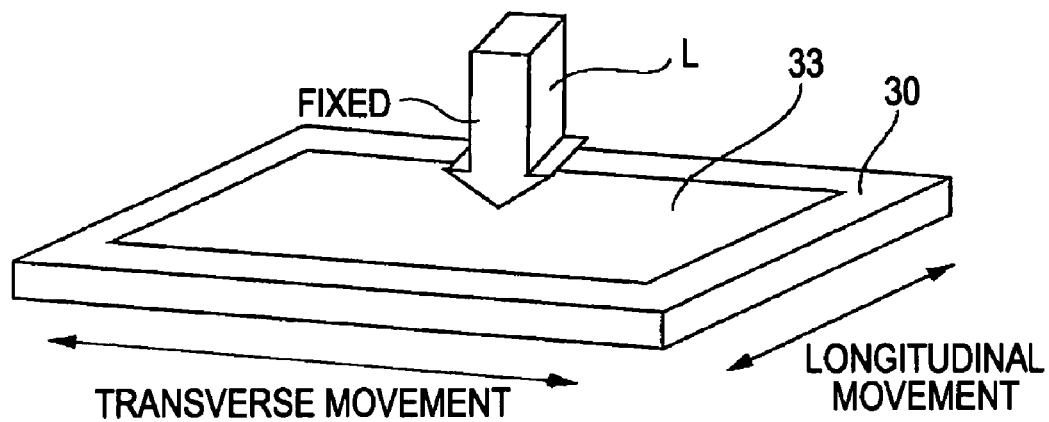
FIGS. 11A and 11B are schematic diagrams each illustrating a laser-beam machining method in the step of machining a lens-forming surface of a mold.
Figure 11B:
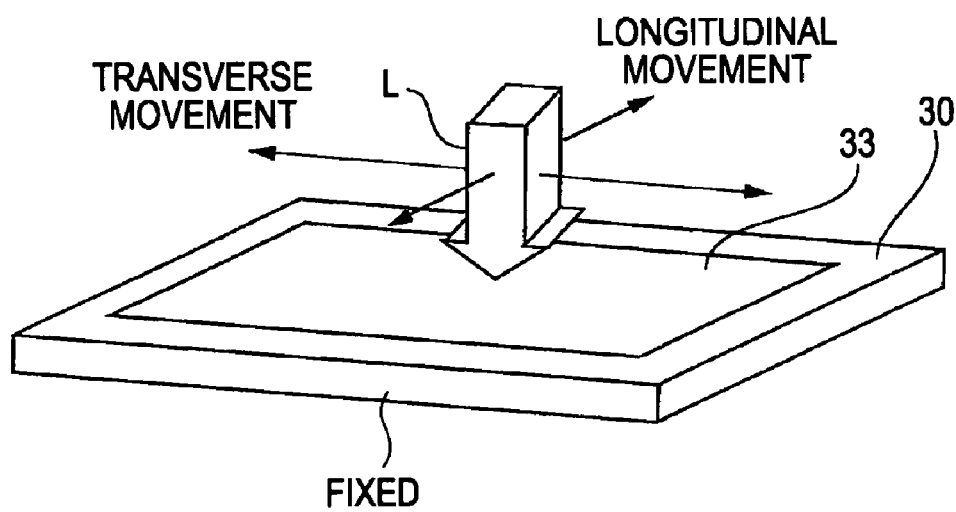

Examples of a method for moving a mask image formed on the workpiece include a method in which a stage on which the workpiece is placed is moved relative to a laser beam and a method in which a laser beam is moved relative to the workpiece. FIG. 11A shows an example of a method in which the irradiation position of a laser beam L is fixed and a stage 30 which supports a workpiece 33 is moved in the longitudinal direction and in the transverse direction so that a mask image formed on the workpiece 33 is moved. FIG. 11B shows an example of a method in which a stage 30 is fixed and a laser beam L is moved in the longitudinal direction and in the transverse direction relative to a workpiece 33 fixed on the stage 30 so that a mask image formed on the workpiece 33 is moved.

Figure 12A:
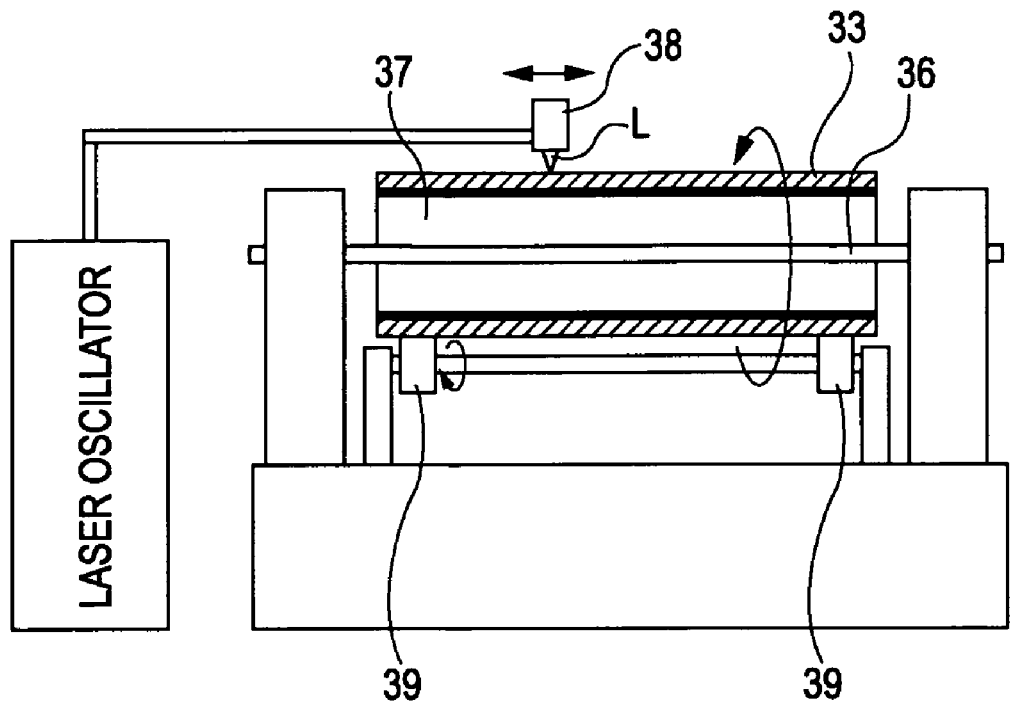
FIGS. 12A and 12B are schematic diagrams illustrating a laser-beam machining method in the step of machining a lens-forming surface of a mold.
Figure 12B:
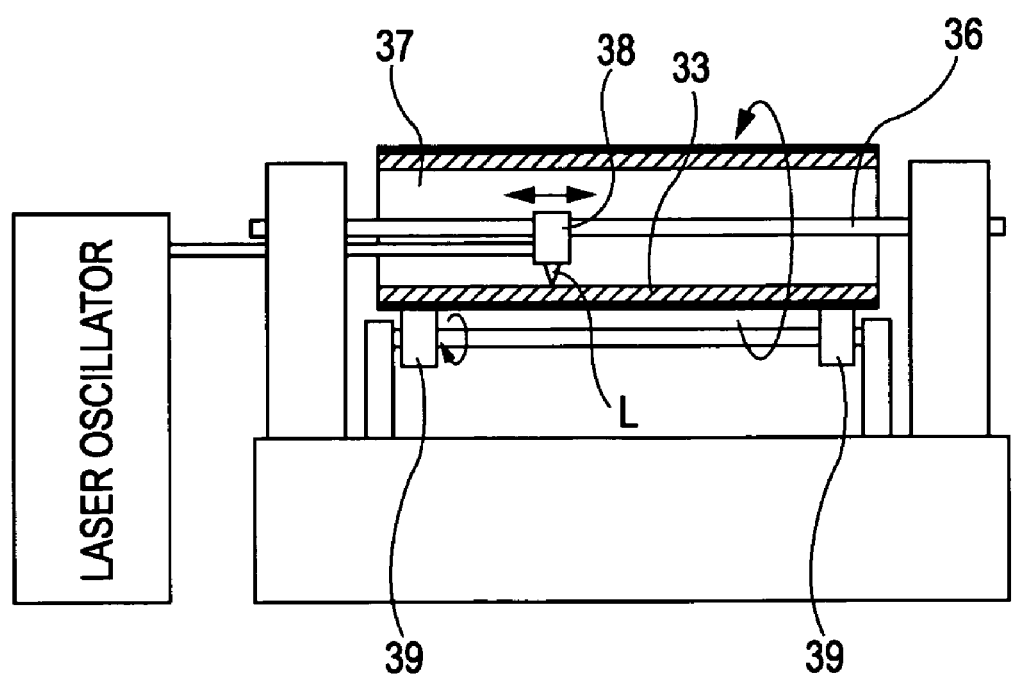

On the other hand, besides the plane stage shown in FIG. 11A or 11B, a rotational stage which rotates in one direction, such as the one shown in FIG. 12A or 12B, may be used. In the example of the rotational stage device shown in FIG. 12A or 12B, a workpiece 33 is mounted on the outer peripheral surface or the inner peripheral surface of a drum 37 rotating around a rotating shaft 36 under the influence of driving forces of driving rollers 39, and a laser head 38 is moved along the axial direction relative to the workpiece 33 to move a mask image formed on the workpiece 33.

Figure 14A:
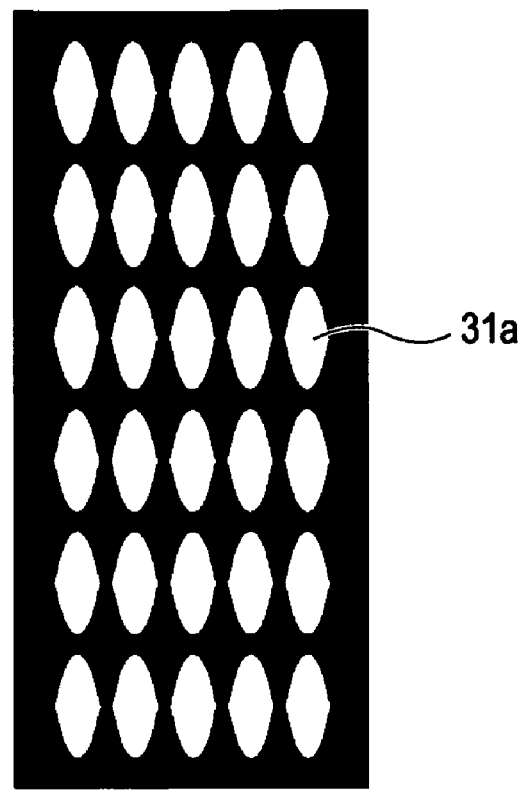
FIGS. 14A and 14B are schematic diagrams each showing an example of a mask used for laser-beam machining.
Figure 14B:
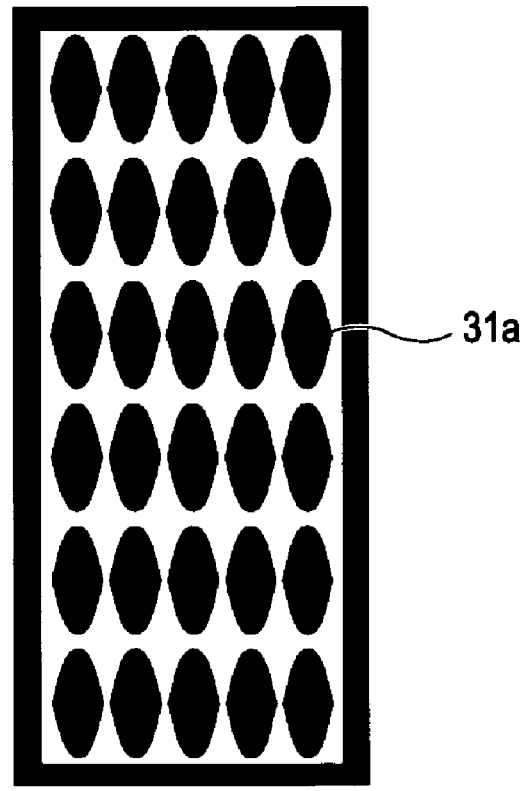

FIG. 13 is a schematic diagram showing the principle of laser-beam machining. FIGS. 14A and 14B are schematic diagrams each showing an example of a mask used for laser-beam machining. In FIG. 13, the arrow 35 indicates a direction perpendicular to the surface of the sheet. In the step of forming the mold according to the first embodiment of the present invention, the mold is formed by laser-beam machining. As the laser beam machine for performing laser-beam machining, for example, a laser micromachining system MAS-300 manufactured by OPTEC s.a., Belgium, may be used.

As shown in FIGS. 14A and 14B, a mask 31 has a plurality of openings or light-shielding portions 31a. The openings or light-shielding portions 31a are arrayed in rows and/or columns. A laser beam L is applied to a workpiece 33 with the openings or light-shielding portions 31a of the mask 31 therebetween to form a mask image on the workpiece 33. Thus, the workpiece 33 is machined by means of the energy of the laser beam L. As the material for the mask 31, a material that can withstand irradiation of the laser beam L is selected, and for example, a metal mask or a mask formed by vapor-depositing a metal on quartz can be selected.

The shape of the openings or light-shielding portions 31a is selected so that the laser beam L can be applied through the mask 31 provided with the openings or light-shielding portions 31a and a lens 32 to form a mask image on the workpiece 33 and spherical or aspherical recesses (concaves) or protrusions (convexes) can be formed by moving the mask image in one direction on the workpiece 33. The workpiece 33 can be composed of a plastic material, and for example, polycarbonate may be used.

Examples of the shape of the openings or light-shielding portions 31a capable of forming spherical or aspherical recesses include a shape that is symmetrical (vertically symmetrical) with respect to the moving direction of the mask as shown in FIG. 14A or 14B, and a shape in which an end thereof is curved like an arch, such as a semicircular shape or a nail-like shape. In each of FIGS. 14A and 14B, a white region represents an opening region of the mask and a black region represents a light-shielding region of the mask. The moving direction of the mask image is determined such that the curved side is directed in the moving direction of the mask image or in a direction opposite thereto. Thus, when the mask image is moved in one direction, in the case in which the mask shown in FIG. 14A is used, a larger amount of the laser beam L can be applied to the positions over which the center of the mask image passes. As a result, spherical or aspherical recesses can be formed.

When spherical or aspherical protrusions are formed on the workpiece 33, as shown in FIG. 14B, a mask in which the opening region and the light-shielding region are reversed may be used.

The step of forming a mold will be described below with reference to FIG. 13.

First, a mask 31 is disposed above a workpiece 33, and a laser beam L is applied through the mask 31 to the workpiece 33 to form a mask image on the workpiece 33 while the workpiece 33 is moved in the lateral direction as indicated by the arrow 34. Thus, the mask image is moved in the lateral direction on the workpiece 33, and the upper surface of the workpiece 33 is continuously machined. By means of this step, strips of recesses are formed on the workpiece 33.

Subsequently, the mask 31 is rotated by 90 degrees in the in-plane direction, and the laser beam L is applied through the mask 31 to the workpiece 33 to form a mask image on the workpiece 33 while the workpiece 33 is moved in the longitudinal direction as indicated by the arrow 35. Thus, the mask image is moved in the longitudinal direction on the workpiece 33, and the upper surface of the workpiece 33 is continuously machined. In such a manner, the intended mold is formed.

Figure 15A:
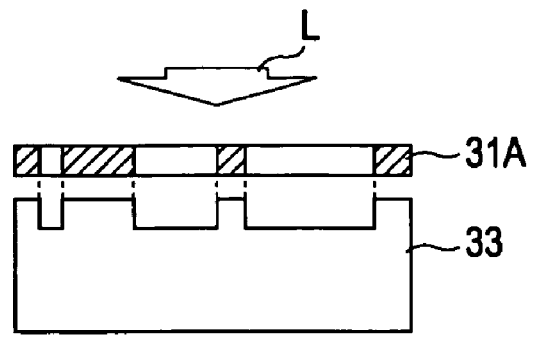
FIGS. 15A to 15C are schematic diagrams showing a variation example of a laser-beam machining method.
Figure 15B:
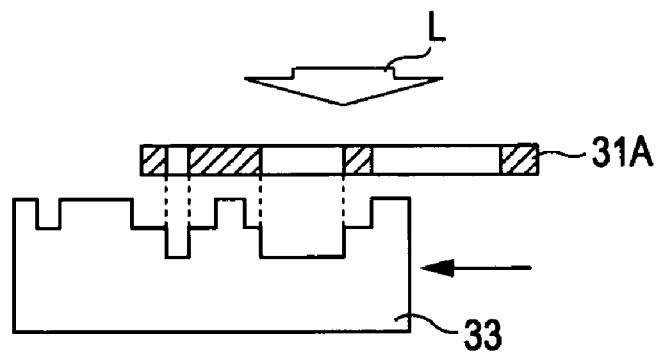
Figure 15C:
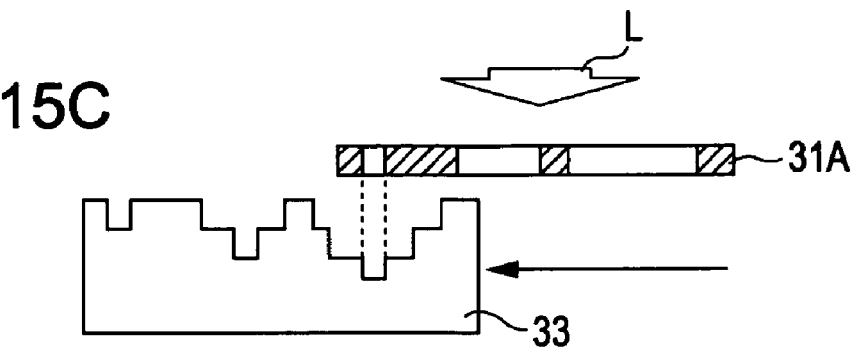
Figure 16:
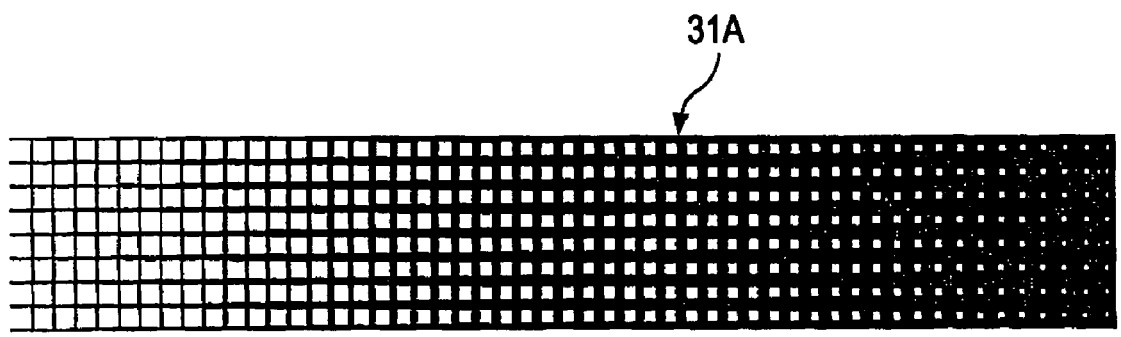
FIG. 16 is a schematic diagram showing an example of a mask used in the laser-beam machining method shown in FIGS. 15A to 15C.

The formation method of the mold is not limited to the examples described above. For example, FIGS. 15A to 15C are schematic diagrams showing the principle of another method of forming a mold, and FIG. 16 is a schematic diagram showing an example of a structure of a mask used in the method. As the laser beam machine employed in this method of forming the mold, a laser micromachining system "MicrAblaster M2000" manufactured by Exitech Corporation, UK, may be used.

As shown in FIG. 16, a mask 31A has a plurality of openings. The shape of the openings is selected so that, as shown in FIG. 15, spherical or aspherical lenses can be formed by forming a mask image on a workpiece 33 by the irradiation of a laser beam L through the openings while moving the mask image in one direction on the workpiece 33. Specifically, with respect to the shape of the openings of the mask 31A shown in FIG. 16, the shape of the intended lens is divided heightwise into a plurality of cross sections, which are then arrayed in the moving direction of the mask image.

The method of forming a mold using the mask 31A will be described below with reference to FIGS. 15A to 15C. First, a mask 31A is disposed above a workpiece 33, and a laser beam L is applied through the mask 31A to the workpiece 33 to form a mask image on the workpiece 33 (FIG. 15A). Thus, portions of the workpiece 33 corresponding to the shapes of the individual openings are machined. Subsequently, as indicated by the arrow, the workpiece 33 is moved by one pattern, i.e., the distance between the center of one opening and the center of its adjacent opening of the mask 31A, in the lateral direction, and then the laser beam L is applied (FIG. 15B). Thus, two-stage machining is performed in the height direction on the workpiece 33. Similarly, the mask 31A is moved in the lateral direction by the distance corresponding to one pattern, and machining is performed. Thus, as shown in FIG. 15C, three-stage machining is performed in the height direction. In such a manner, by sequential movement in the lateral direction by one pattern and subsequent laser irradiation, the workpiece 33 is machined in the height direction the number of times corresponding to the number of patterns in the moving direction of the mask 31A. For example, by setting the number of patterns formed in the mask 31A at 100 or more, smoothly curved lens shapes in the height direction can be formed on the workpiece 33.

(2) Formation of Duplicate Mold

First, a conductive film is formed on the concave-convex pattern of the mold prepared as described above, for example, by electroless plating. Here, the conductive film is a metal film composed of a metal, such as nickel. The mold provided with the conductive film is placed in an electroforming apparatus, and a metal plating layer, such as a nickel plating layer, is formed on the conductive film by electroplating or the like. Then, the metal plating layer is peeled off from the mold. Thus, a duplicate mold having a concave-convex pattern reversed from that of the mold can be obtained.

Subsequently, a metal plating layer, such as a nickel plating layer, is formed, for example, by electroplating on the surface provided with the concave-convex pattern of the resulting duplicate mold. Then the metal plating layer is peeled off from the mold. Thus, a duplicate mold having the same concave-convex shape as that of the mold is formed.

(3) Formation of Fly's-Eye Lens Sheet Body

Figure 17A:
FIGS. 17A to 17C are schematic diagrams showing an example of formation steps of a fly's-eye lens sheet.
Figure 17B:
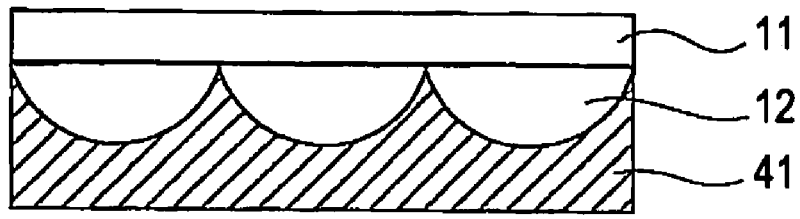
Figure 17C:
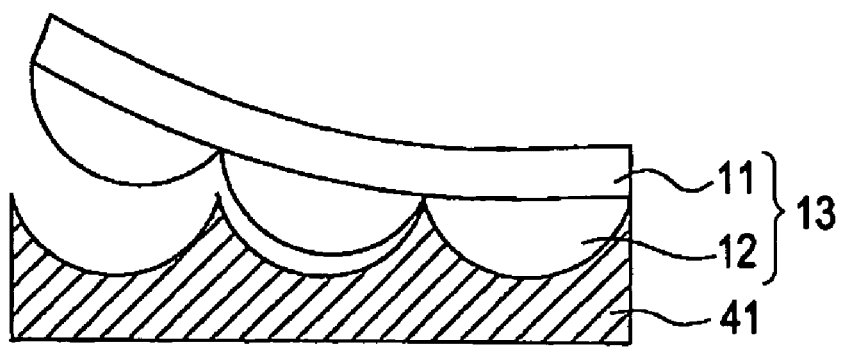

FIGS. 17A to 17C are schematic diagrams showing an example of formation steps of a fly's-eye lens sheet body.

First, as shown in FIG. 17A, a resin material, such as a UV curable resin, is poured into the concave-convex pattern of a duplicate mold 41 prepared as described above. Subsequently, as shown in FIG. 17B, a film 11 which is a support is laid over the duplicate mold 41. Then, pressure is applied to the film 11 by a rubber roller or the like to achieve a uniform thickness of the resin material.

Subsequently, for example, ultraviolet light is applied from the side of the film 11 to cure the resin material, such as the UV curable resin. Then, as shown in FIG. 17C, the cured resin material, such as the UV curable resin, is peeled away from the duplicate mold 41. Thus, fly's-eye lenses 12 are formed on one principal surface of the film 11 and the intended fly's-eye lens sheet body 13 is obtained.

The resin material constituting the fly's-eye lenses 12 is not particularly limited to the UV curable resin. Although any resin material having light transmissiveness can be used, changes in hue of transmitted light and the amount of transmitted light due to color development and haze are not preferable. From the standpoint of ease of manufacturing, a resin that can be cured by ultraviolet light, electron beams, or heat is preferable, and a photosensitive resin that can be cured by ultraviolet light is most preferable. Examples of the resin that may be used include acrylate resins, such as urethane acrylates, epoxy acrylates, polyester acrylates, polyol acrylates, polyether acrylates, and melamine acrylates.

As necessary, a light stabilizer, an ultraviolet absorber, an antistatic agent, a flame retardant, an antioxidant, or the like may be appropriately used together with the photosensitive resin. The thickness of the photosensitive resin is not particularly limited. However, as the thickness of the photosensitive resin increased, absorption of UV light which is applied in the subsequent step of curing a photosensitive adhesive layer increases. Therefore, preferably, the thickness of the photosensitive resin is set at 200 µm or less.

As the film 11, for example, a transparent plastic film may be used. A known polymer film can be used. Specifically, for example, any known resin film may be appropriately selected from the group consisting of polyesters, polyethylene terephthalate (PET), polyimides (PI), polyamides, aramids, polyethylene, polyacrylates, polyethersulfones, triacetyl cellulose, polysulfones, diacetyl cellulose, polypropylene, polyvinyl chloride, acrylic resins, polycarbonate, epoxy resins, urea resins, urethane resins, and melamine resins.

When a plastic film having a crystal orientation, such as a PET film, is used as the film 11, it is preferable to align the direction of the narrow side of a single lens (the side with a narrower pitch) with the direction with large heat shrinkage of the film 11. In the case of a film having a crystal orientation, the term "the direction with large heat shrinkage" generally means a machining direction during the film formation (film-forming direction). By aligning the direction with large heat shrinkage of the film with the direction of the narrow side of the single lens, it is possible to reduce deformation during processing when the fly's-eye lens sheet is fabricated.

Preferably, the thickness of the film 11 is 35 to 105 µm. If the thickness is outside the range, when the lens pitch of the fly's-eye lenses 12 is set at 35 to 150 µm, the light-collecting point becomes deviated and an out-of-focus shape of light collection occurs.

The method for forming the fly's-eye lens sheet body 13 is not limited to the example described above. It may also be possible to perform molding using a transparent thermoplastic resin, such as a polyacrylic resin, polyvinyl chloride, polycarbonate, or a cyclic olefin resin, by a given method. When molding is performed in such a manner, the film 11 serving as a support base may be omitted.

(4) Formation of Light-Shielding Layer

FIGS. 18A to 18E are schematic diagrams showing an example of formation steps of a light-shielding layer.

Figure 18A:
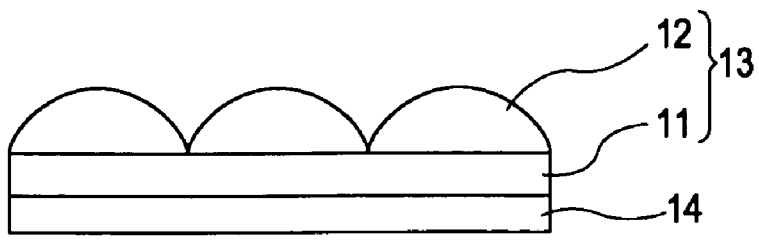
FIGS. 18A to 18E are schematic diagrams showing an example of formation steps of a light-shielding layer.

First, as shown in FIG. 18A, a photosensitive adhesive layer 14, such as an ultraviolet-sensitive resin adhesive layer, is formed on a planar surface opposite to the lens surface of a fly's-eye lens sheet body 13 prepared as described above. Examples of the method of forming the photosensitive adhesive layer 14 include a method in which a photosensitive adhesive is directly applied to the surface of the film 11, and a method in which a photosensitive adhesive layer 14 is formed on a support in a detachable manner, the photosensitive adhesive layer 14 is laminated to the surface of the film 11, and then the support is detached.

As the material constituting the photosensitive adhesive layer 14, a material containing, as main components, a heat-adhesive binder composed of at least one organic polymer, an ethylenically unsaturated group-containing photopolymerizable compound, and a photoinitiator can be used.

The heat-adhesive binder composed of the organic polymer is preferably compatible with the other components. Examples of the general organic polymer include polyvinyl chloride, poly (meth)acrylic acid, poly (meth)acrylates, polyvinyl ether, polyvinyl acetal, polyurethane resins, epoxy resins, polyamides, polyesters, vinylidene chloride-acrylonitrile copolymers, vinylidene chloride-methacrylate copolymers, vinylidene chloride-vinyl acetate copolymers, cellulosics, polyolefins, diallyl phthalate resins, and various types of synthetic rubber, such as butadiene-acrylonitrile copolymers.

As the photopolymerizable compound, any of known radically polymerizable ethylenically unsaturated group-containing, addition-polymerizable or crosslinkable monomers, oligomers, and polymers can be used without limitations. For example, a vinyl group or acryl group-containing monomer or oligomer, or a polymer having an ethylenically unsaturated group at the end or the side chain thereof can be used. Examples include acrylic acid and salts thereof, acrylates, acrylamides, methacrylic acid and salts thereof, methacrylates, methacrylamides, maleic anhydride, maleates, itaconic acid esters, styrenes, vinyl ethers, vinyl esters, N-vinyl heterocycles, acrylic ethers, acrylic esters, and derivatives of these. Examples of the specific compounds that may be preferably used include (meth)acrylic acid, methyl (meth)acrylate, butyl (meth)acrylate, cyclohexane (meth)acrylate, dimethylaminomethyl (meth)acrylate, carbitol (meth)acrylate, 2-ethylhexyl (meth)acrylate, lauryl (meth)acrylate, 2-hydroxyethyl (meth)acrylate, 2-hydroxypropyl (meth)acrylate, (meth)acrylamide, N-methylol (meth)acrylamide, styrene, acrylonitrile, N-vinylpyrrolidone, ethylene glycol (meth)acrylate, triethylene glycol di(meth)acrylate, propylene glycol di(meth)acrylate, tripropylene glycol di(meth)acrylate, pentaerythritol di(meth)acrylate, butanediol di(meth)acrylate, hexanediol di(meth)acrylate, nonanediol di(meth)acrylate, neopentyl glycol di(meth)acrylate, trimethylolpropane tri(meth)acrylate, ditrimethylol propane tetra(meth)acrylate, pentaerythritol tri(meth)acrylate, pentaerythritol tetra(meth)acrylate, dipentaerythritol tetra(meth)acrylate, dipentaerythritol penta(meth)acrylate, triethylene glycol divinyl ether, hydroxybutyl vinyl ether, urethane (meth)acrylate, polyester (meth)acrylate, and epoxy (meth)acrylate. These compounds may be used alone or two or more of these may be combined for use.

With respect to the material described above, about 20% to 80% by weight of the heat-adhesive binder composed of the organic polymer and about 20% to 80% of the radically polymerizable ethylenically unsaturated bond-containing photopolymerizable compound are mixed.

Figure 18B:
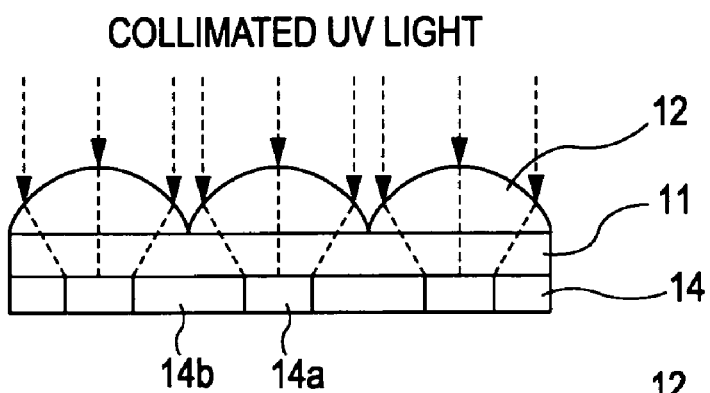

Next, as shown in FIG. 18B, ultraviolet light (collimated UV light) is applied to the photosensitive adhesive layer 14 in an uncured state from the side of the fly's-eye lenses 12. Thus, ultraviolet light is focused by the fly's-eye lenses 12 on light-collecting parts 14a, and portions corresponding to the light-collecting part 14a of the photosensitive adhesive layer 14 are cured. That is, in the light-collecting parts 14a of the photosensitive adhesive layer 14, adhesion is lost. In contrast, in non-light-collecting parts 14b of the photosensitive adhesive layer 14, adhesion is maintained.

Figure 18C:
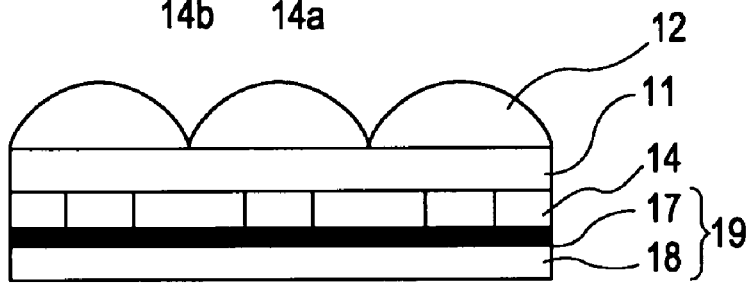
Figure 18D:
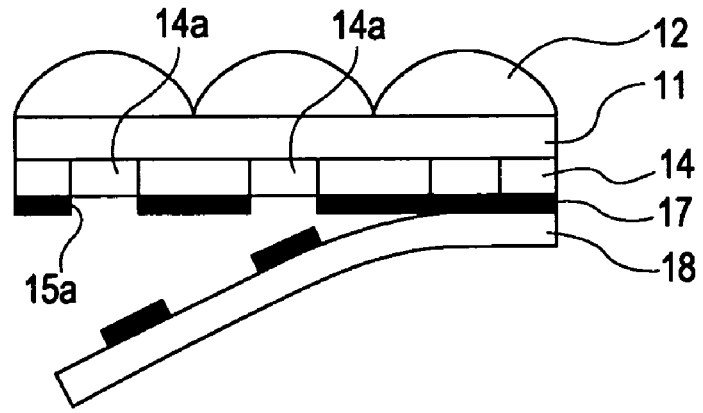
Figure 18E:
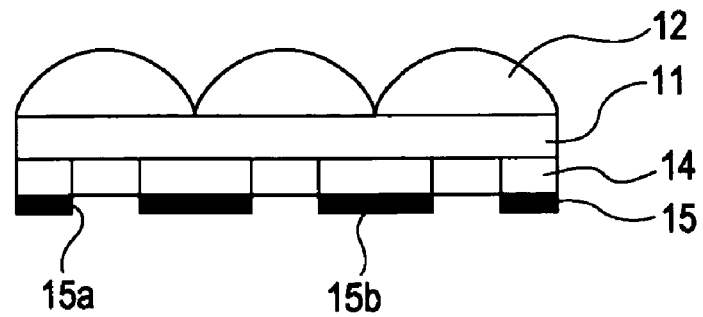

Next, as shown in FIG. 18C, a black layer 17 of a black transfer film 19 is bonded to the photosensitive adhesive layer 14, and then a base 18 is peeled off. As a result, as shown in FIG. 18D, portions of the black layer 17 corresponding to the light-collecting parts 14a (non-adhesive pattern region) are peeled together with the base 18. Thus, transmitting portions 15a, for example, having a quadrangular shape, an X shape, a linear shape, or a modified shape thereof shown in any of FIGS. 4A to 4C, 5A to 5C, 6A to 6C, and 8A and 8B are formed, and a light-shielding portion composed of the remaining black layer 17 is formed in a region (adhesive pattern region) other than the region of the light-collecting parts 14a. Thus, as shown in FIG. 18E, a fly's-eye lens sheet having a light-shielding layer in which a light-shielding layer 15 including the transmitting portions 15a and the light-shielding portion 15b is disposed on the surface on the side of the viewer is obtained. Subsequently, according to need, a plastic plate 3 is disposed on the light-shielding layer 15.

The black transfer film 19 is formed by applying a coating material obtained by mixing a resin and carbon black onto the base 18.

As the carbon black, commercially available carbon black can be used. Examples thereof include #980B, #850B, MCF88B, and #44B which are manufactured by Mitsubishi Kasei Corp.; BP-800, BP-L, REGAL-660, and REGAL-330 which are manufactured by Cabot Corporation; RAVEN-1255, RAVEN-1250, RAVEN-1020, RAVEN-780, and RAVEN-760 which are manufactured by Columbian Chemicals Company; and Printex-55, Printex-75, Printex-25, Printex-45, and SB-550 which are manufactured by Degussa Corp. These may be used alone or in combination.

As the binder resin to be mixed with carbon black, a modified or unmodified vinyl chloride resin, polyurethane resin, phenoxy resin, polyester resin, or the like may be used. In addition, a cellulose ester, such as cellulose acetate butyrate, may also be used. Other examples of the binder resin which may be used include thermoplastic resins, thermosetting resins, reactive resins, electron beam curable resins, and the like which have specific usages.

In this embodiment, the content of carbon black in the coating material is set at 45% to 65% by weight.

When the content of carbon black exceeds 65% by weight, the amount of carbon black is excessive relative to the resin, and carbon black is easily separated. Thus, it is difficult to form the transmitting portions 15a with high accuracy corresponding to the light-collecting parts 14a. Furthermore, falling of carbon black particles to the light-collecting parts and during the transfer step causes contamination to the lens sheet and the working environment, thus being undesirable.

When the content of carbon black is less than 45% by weight, the amount of resin is excessive. Thus, the strength of the film is high, and the film is not cut along the boundary between the light-collecting part and the non-light-collecting part. Thus, the black layer to be attached to the non-lightcollecting part may become short, or the black layer may remain in the light-collecting part. The shortage of the black layer in the non-light-collecting part or remaining of the black layer in the light-collecting part causes reduction in the contrast of the projected image and partial loss of the projected image, thus being undesirable.

By setting the content of carbon black as described above, it is possible to form the transmitting portions 15a having a quadrangular shape, an X shape, a linear shape, or a modified shape thereof with high accuracy corresponding to the light-collecting parts 14a. Furthermore, since the intended shape of the transmitting portions 15a can be formed with high reproducibility on the basis of the lens shape of the fly's-eye lenses 12, it is possible to form fine transmitting portions. Most preferably, the carbon content is set at 50% to 60% by weight.

In addition to carbon black and the binder resin, as necessary, additives, such as organic pigments and inorganic pigments, and dispersing agents for improving dispersion may be incorporated into the black layer 17.

The coating material for the black layer 17 is prepared by mixing the individual components and as necessary, a solvent by an ordinary method using an agitator, and the resulting mixture is applied onto the base 18, followed by drying or curing.

As the base 18 for the coating material, a known plastic film can be used. As necessary, an undercoat layer may be formed on the surface of the plastic film so that the peel strength between the plastic film and the black layer 17 can be adjusted.

The thickness of the black layer 17 is preferably 0.5 to 2.0 µm. If the thickness is less than 0.5 µm, the black density is decreased and it is not possible to sufficiently block external light. Furthermore, significant nonuniformity in density occurs, thus being undesirable. If the thickness exceeds 2.0 µm, when the black transfer layer 19 is laminated to the photosensitive adhesive layer and pressure is applied, cracks occur in the film, which is undesirable. Most preferably, the thickness of the black layer 17 is 0.7 to 1.5 µm.

Second Embodiment

A second embodiment of the present invention will now be described.

In the first embodiment, the case in which a planar workpiece is subjected to laser-beam machining to form a mold has been described. In the second embodiment, the case in which a cylindrical workpiece is subjected to laser-beam machining to form a mold will be described.

The second embodiment is the same as the first embodiment except for the method for fabricating a fly's-eye lens sheet having a light-shielding layer. A method for fabricating a fly's-eye lens sheet having a light-shielding layer will be described below.

The method for fabricating the fly's-eye lens sheet having the light-shielding layer according to the second embodiment will be described in the following order:

(1) Formation of mold
(2) Formation of duplicate mold
(3) Formation of sheet body
(4) Formation of light-shielding layer (1) Formation of Mold First, a cylindrical workpiece is prepared. A known plastic can be used as the material for the workpiece. In such a case, workability and the surface shape after machining change depending on the heat resistance and the glass transition point of the plastic, and therefore, preferably, the material is appropriately selected depending on the machining conditions. Use of polycarbonate is most preferable.

Next, a laser irradiation system is moved on the inner peripheral surface of the cylindrical workpiece. A mask for processing the workpiece into a desired shape is mounted on the system. As the mask, for example, the mask according to the first embodiment may also be used.

Subsequently, a laser beam is applied through the mask to the inner peripheral surface of the workpiece to form a mask image on the inner peripheral surface of the workpiece while the laser irradiation system is moved from one open end toward the other open end. Thus, the mask image of the laser beam is moved from one open end toward the other open end, and a strip of recess extending from one open end to the other open end is formed on the inner peripheral surface of the workpiece.

The same procedure is repeated while appropriately rotating the workpiece with its central axis as the rotation axis. Thus, strips of recesses extending from one open end to the other open end are formed over the entire inner peripheral surface of the workpiece.

Subsequently, the laser irradiation system is moved to one open end. Then, a laser beam is applied through the mask to the inner peripheral surface of the workpiece to form a mask image on the inner peripheral surface of the workpiece while the workpiece is rotated with its central axis as the rotation axis at a constant speed. Thus the mask image of the laser beam moves over the circumference of the inner peripheral surface to machine the circumference of the inner peripheral surface. The same procedure is repeated while appropriately moving the laser irradiation system from one open end toward the other open end. Thus, the intended mold can be obtained.

When the openings of the mask have a semicircular shape or a nail-like shape, for example, the mounting position of the mask relative to the laser irradiation system is set such that the curved side of the mask image is directed in the moving direction of the mask image or in a direction opposite thereto.

(2) Formation of Duplicate Mold

First, a conductive film is formed on the inner peripheral surface of the mold prepared as described above, for example, by electroless plating. Here, the conductive film is a metal film composed of a metal, such as nickel. The mold provided with the conductive film is placed in an electroforming apparatus, and a metal plating layer, such as a nickel plating layer, is formed on the conductive film by electroplating or the like. Then, the mold is cut, for example, with a laser beam, to separate the metal plating layer from the mold. Thus, a duplicate mold having a concave-convex pattern reversed from that of the mold can be obtained.

(3) Formation of Sheet Body

Figure 19:
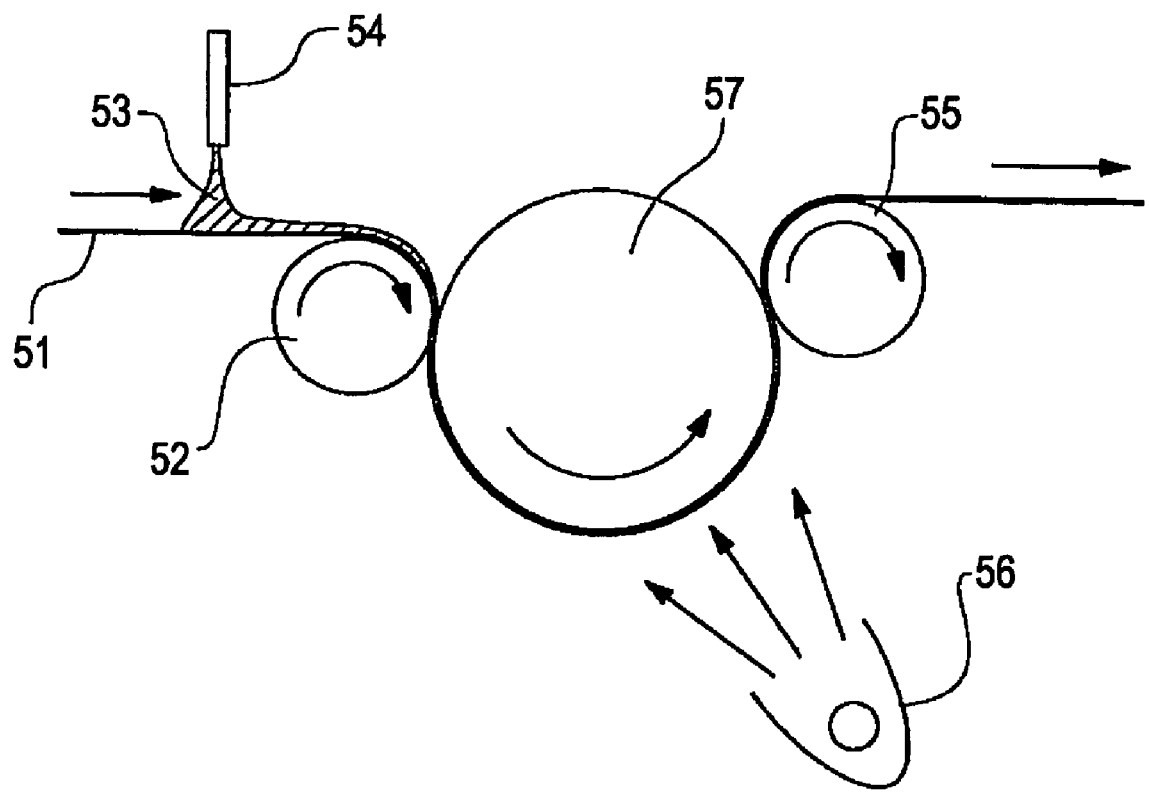
FIG. 19 is a schematic diagram showing a step of forming a fly's-eye lens sheet according to a second embodiment of the present invention.

FIG. 19 is a schematic diagram showing a step of forming a fly's-eye lens sheet body. First, with reference to FIG. 19, a sheet-forming apparatus used in the method for fabricating the fly's-eye lens sheet body will be described. As shown in FIG. 19, the sheet-forming apparatus includes a pressure roller 52, a resin dispenser 54, a separation roller 55, a UV lamp (ultraviolet light lamp) 56, and a duplicate mold 57.

A substrate sheet (substrate film) 51 has a strip shape. As the material for the substrate sheet 51, for example, a transparent plastic film can be used. A known polymer film can be used. Specifically, for example, any known resin film may be appropriately selected from the group consisting of polyesters, polyethylene terephthalate (PET), polyimides (PI), polyamides, aramids, polyethylene, polyacrylates, polyethersulfones, triacetyl cellulose, polysulfones, diacetyl cellulose, polypropylene, polyvinyl chloride, acrylic resins, polycarbonate, epoxy resins, urea resins, urethane resins, and melamine resins. The substrate sheet 5 is wound into a roll in advance, and the roll is mounted at a predetermined position of the sheet-forming apparatus in a rotatable manner.

The duplicate mold 57 is a mold roll obtained by the steps (1) and (2) described above, and is used for continuously forming many fly's-eye lenses 12 on one principal surface of the substrate sheet 51. The duplicate mold 57 has a cylindrical shape, and a fine mold for forming the fly's-eye lenses 12 is provided on the cylindrical surface thereof. The duplicate mold 57 is mounted in a rotatable manner with its central axis as the rotation axis, and the substrate sheet 51 is fed according to the rotation of the duplicate mold 57.

The pressure roller 52 applies pressure to the substrate sheet 51 so that the substrate sheet 51 is brought into close contact with the cylindrical surface of the duplicate mold 57. The pressure roller 52 has a cylindrical shape, and the radius thereof is, for example, selected to be smaller than the radius of the duplicate mold 57. The pressure roller 52 is configured so as to be rotatable with its central axis as the rotation axis.

The separation roller 55 separates the substrate sheet 51 provided with fly's-eye lenses 12 on the principal surface thereof from the duplicate mold 57. The separation roller 55 has a cylindrical shape, and the radius thereof is, for example, selected to be smaller than the radius of the duplicate mold 57. The separation roller 55 is configured so as to be rotatable with its central axis as the rotation axis.

The resin dispenser 54 is used for dropping a UV curable resin 53, and is configured so as to be movable such that the dropping position can be adjusted. The UV lamp 56 is configured so as to be able to emit ultraviolet light, and applies ultraviolet light to the substrate sheet 51 being carried by the duplicate mold 57.

Next, a method for forming a fly's-eye lens sheet body will be described below with reference to FIG. 19.

First, the substrate sheet 51 is wound around the duplicate mold 57 having a fine shape on the surface thereof, and the duplicate mold 57 is nipped between the pressure roller 52 and the separation roller 55. The UV curable resin 53 is dropped from the resin dispenser 54 to the substrate sheet 51, and the substrate sheet 51 is fed while pressure-bonding the substrate sheet 51 to the duplicate mold 57. Consequently, the UV curable resin is injected between the cylindrical surface of the duplicate mold 57 and the substrate sheet 51, and simultaneously, air bubbles included in the UV curable resin are removed. Thus, the shape of the duplicate mold 57 is transferred to the UV curable resin layer. Note that the dropping position of the UV curable resin 53 is not limited to the example described above. For example, a sheet may be formed with a resin basin being disposed between the duplicate mold 57 and the substrate sheet 51 by dropping the UV curable resin 53 between the duplicate mold 57 and the substrate sheet 51.

Examples of the UV curable resin 53 include, but are not limited to, acrylic resins, polyester resins, polyvinyl chloride, polyurethane, and silicone resins. Additionally, the resin is not limited to the UV curable resin, and any of various types of resins that are cured by absorbing energy. For example, an electron beam curable resin or a thermosetting resin may be used.

Ultraviolet light is applied to the substrate sheet 51 from below the duplicate mold 57 to cure the UV curable resin 53. Then, the substrate sheet 51 is separated from the duplicate mold 57 by the rotating separation roller 55. As a result, an optical layer provided with the fly's-eye lenses 12 is formed on the substrate sheet 51, and the desired fly's-eye lens sheet body 13 is thereby obtained.

(4) Formation of Light-Shielding Layer

The light-shielding layer is formed as in the first embodiment, and description thereof is omitted.

Third Embodiment

Figure 20:
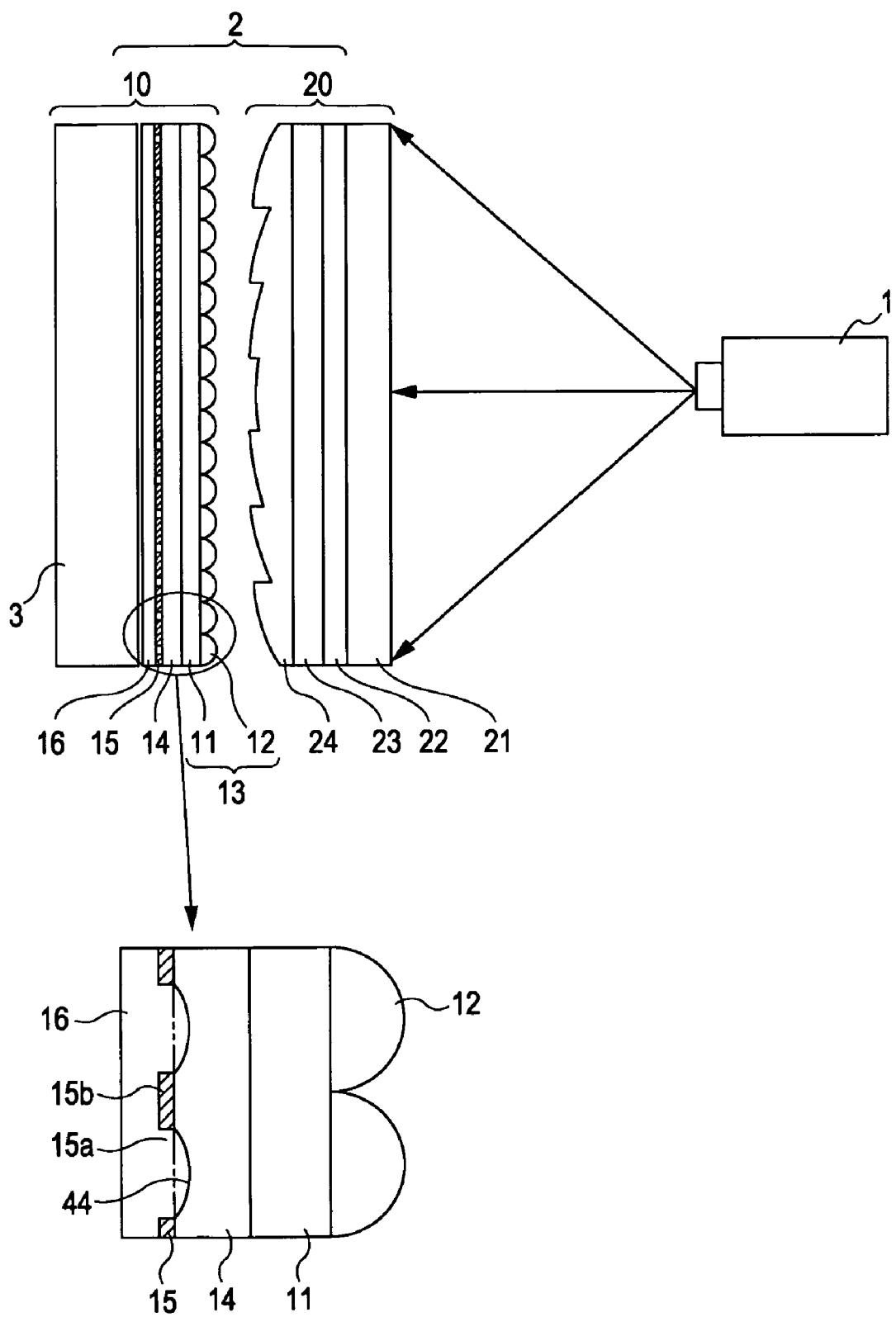
FIG. 20 is a schematic diagram showing an example of a structure of a rear projection image display device according to each of third and fourth embodiments of the present invention.

FIG. 20 is a schematic diagram showing an example of a structure of a rear projection image display device according to a third embodiment of the present invention. The same reference numeral is attached to each corresponding part to that employed in the first embodiment, and detailed description thereof is omitted.

In this embodiment, a fly's-eye lens sheet having a light-shielding layer 10 includes a fly's-eye lens sheet body 13 provided with fly's-eye lenses 12 on one principal surface thereof, a light-shielding layer 15 disposed on the other principal surface of the fly's-eye lens sheet body 13, and a photosensitive adhesive layer 14 disposed between the fly's-eye lens sheet body 13 and the light-shielding layer 15.

The photosensitive adhesive layer 14 has adhesive and non-adhesive patterns as in the first embodiment. The light-shielding layer 15 includes a light-shielding portion 15b disposed on an adhesive pattern of the photosensitive adhesive layer 14, and transmitting portions 15a which pass light transmitted through the fly's-eye lenses 12 disposed on a non-adhesive pattern. The transmitting portions 15a are disposed at positions corresponding to the light-collecting parts of the fly's-eye lenses 12. The light-shielding layer 15 is formed on the photosensitive adhesive layer 14 by transferring a black layer 17 using a black transfer film 19 as described with reference to FIG. 18.

In this embodiment, concave portions 44 are disposed in a region corresponding to the non-adhesive pattern of the photosensitive adhesive layer 14. By forming the concave portions 44 on the surface of the non-adhesive pattern of the photosensitive adhesive layer 14, when the black transfer film 19 is laminated after the photosensitive adhesive layer 14 is exposed, the black layer 17 is not easily attached to the non-adhesive pattern. Thus, during the peeling of the black transfer film 19, the black layer 17 located on the non-adhesive pattern of the photosensitive adhesive layer 14 is easily separated together with the base 18, and the black layer does not easily remain on the non-adhesive pattern.

Consequently, according to this embodiment, compared with the first embodiment, it is possible to improve the shape accuracy of the transmitting portions 15a, and it is possible to improve the contrast of a display image by increasing the area ratio of the light-shielding portion 15b (ratio of the area of the light-shielding portions 15b to the area of the entire light-shielding layer 15) without decreasing the transmittance. Furthermore, since the light-collecting region of the fly's-eye lens 12 does not require a high amount of irradiating ultraviolet light that allows the photosensitive layer to lose adhesion, and thus production cost can be reduced.

The concave portions 44 are formed on the light-shielding layer 15 side surface of the non-adhesive pattern of the photosensitive adhesive layer 14 at a depth of 0.05 μm or more, and preferably, 1 μm or more. If the depth of the concave portions 44 is less than 0.05 μm, it is not possible to reduce the contact area of the black layer with respect to the non-adhesive pattern of the photosensitive adhesive layer 14, and there is concern that the black layer may remain on the non-adhesive pattern.

In a preferable method of forming concave portions 44 in the non-adhesive pattern of the photosensitive adhesive layer 14, deformation due to heat shrinkage or cure shrinkage of the light-collecting parts during the exposure of the photosensitive adhesive layer 14 to ultraviolet light is used. Thus, the step of forming the adhesive and non-adhesive patterns on the photosensitive adhesive layer 14 and the step of forming the concave portions 44 can be carried out simultaneously.

In this embodiment, as the photosensitive adhesive layer 14, an adhesive polymer resin layer in which adhesion in the light-collecting parts is lost during exposure and the light-shielding layer 15 side surface is deformed into a concave shape due to heat shrinkage or cure shrinkage of the light-collecting parts is preferably used.

As the photosensitive adhesive layer 14, among the various photopolymerizable compounds described in the first embodiment, in particular, any of the compounds having high shrinkage during curing is preferably used.

The shape of the concave portions 44 is not particularly limited, and the shape that can reduce the physical contact with the black layer of the black transfer film is sufficient. The concave portions 44 is preferably formed into a rectangular shape, and may be crater-shaped.

The method of forming the concave portions 44 is not limited to the heat shrinkage or cure shrinkage during exposure of the photosensitive adhesive layer 14 as described above. For example, the concave portions 44 may be mechanically formed by subjecting the photosensitive adhesive layer 14 on the non-adhesive pattern to pressing, blasting, or the like before or after exposure.

On the other hand, in the step of forming the light-shielding layer 15 on the photosensitive adhesive layer 14, in order to form the transmitting portions 15a on the non-adhesive pattern of the photosensitive adhesive layer 14 with high accuracy, preferably, the cohesion of the black layer 17 (refer to FIG. 18) constituting the light-shielding portion 15b is limited. In this embodiment, the cohesion of the black layer 17 is set in the Martens hardness range of 30 to 200 N/mm².

If the Martens hardness of the black layer 17 exceeds 200 N/mm², during the transfer of the black layer 17, the film is not cut satisfactorily, and it is difficult to form the transmitting portions 15a according to the light collection of the fly's-eye lenses 12.

In the case of the lenticular lens (cylindrical lens), which has been used in the past, since the transmitting portions have a strip (one-dimensional) shape, the transmittance can be achieved to a certain degree without particularly controlling the cohesion of the black layer. In contrast, in the case of the fly's-eye lens sheet, the transmitting portions have a matrix (two-dimensional) shape, and the formation of the light-shielding layer is more complex than the case of the lenticular lens. If the film cohesion increases, the shape of the transmitting portions does not match that of the light-collecting parts, resulting in a decrease in transmittance and nonuniformity in black density. On the other hand, if the Martens hardness of the black layer 17 is less than 30 N/mm², the film cohesion is excessively low, and powder-falling occurs during the process, causing a reduction in workability or adherence to the transmitting portions, resulting in a decrease in transmittance.

Thus, the film strength of the black layer 17 in terms of the Martens hardness is preferably 30 to 200 N/mm², and more preferably 50 to 100 N/mm².

The Martens hardness used in the present invention is the hardness measured under a test load (indentation), and can be determined from the value of the load-indentation depth curve under increased loading. The Martens hardness includes both the plastic deformation component and the elastic deformation component.

The Martens hardness is defined with respect to a tetragonal pyramid indenter and a trigonal pyramid indenter. Specifically, as expressed by the following equation, the Martens hardness is defined as the value obtained by dividing the test load F by the surface area As occupied by an indenter that enters from the zero-contact point.

$$\text{Martens hardness} = F/As = F/26.43h^2$$

wherein the surface As is defined as follows:

1) In the case of Vickers indenter (tetragonal pyramid indenter)

$$As = (4\sin(\alpha/2)/\cos^2(\alpha/2)) \times h^2$$

2) In the case of Berkovich indenter (trigonal pyramid indenter)

$$As = (3\sqrt{3}\tan\alpha/\cos\alpha) \times h^2$$

By setting the film strength of the black layer 17 in terms of the Martens hardness preferably at 30 to 200 N/mm², and more preferably 50 to 100 N/mm², it is possible to form transmitting portions with a sharper edge. Thus, a fly's-eye lens sheet having a high transmittance can be formed without decreasing the area ratio of the light-shielding portion. Furthermore, a desired shape, such as a quadrangular shape, an X shape, or a linear shape, of the transmitting portions can be formed with high accuracy regardless of the shape of the transmitting portions.

Of course, it is possible to form a light-shielding layer of a transmissive screen including a lenticular lens (cylindrical lens) using the black layer 17 according to the embodiment of the present invention. In such a case, since the transmitting portions with a linear shape can be formed with high accuracy, the transmittance can be improved without decreasing the area ratio of the light-shielding portion.

In order to prevent the black layer 17 from adhering to the non-adhesion region of the photosensitive adhesive layer 14, preferably, the base 18 of the black transfer film 19 (FIG. 18) has a certain rigidity. As the material for the base 18, a known plastic film can be used. For example, when a PET film is used, the thickness of the film is preferably 12 to 50 μm.

If the thickness of the base 18 is less than 12 μm, since the base 18 has insufficient rigidity, the black layer 17 easily adheres to the concave portions 44 at the transmitting portions 15a. In such a case, it is necessary to form the concave portions 44 with a higher depth. If the thickness of the base 18 exceeds 50 μm, the concave portions 44 may be crushed by the stress applied thereto during bonding of the black transfer film 19. In such a case, it is necessary to control the optimum pressure during bonding of the black transfer film.

Fourth Embodiment

As shown in FIG. 20, in the transmissive screen 2, light from the projector 1 is collimated by the Fresnel lens sheet 20 and then enters the fly's-eye lens sheet 10 having the light-shielding layer. At this stage, if the fly's-eye lens sheet 10 is swollen or distorted, incident angle of light is varied, resulting in distortion and blurring of the image. Consequently, the degree of parallelization of the fly's-eye lens sheet 10 having the light-shielding layer is taken into consideration with respect to the Fresnel lens sheet 20.

In the fly's-eye lens sheet having the light-shielding layer 10, the fly's-eye lens sheet body 13 itself is thin and lacks in rigidity and the self-supporting property. Therefore, by bonding a plastic plate 3 to the light-shielding layer 15 through an adhesive layer 16, the rigidity and the self-supporting property are ensured so as to prevent the distortion of the image. The plastic plate is advantageous over the glass plate in view of lightweightness, low cost, and low risk of breakage.

However, because of its low hygroscopicity and heat resistance compared with the glass plate, the plastic plate expands or shrinks under high-humidity, low-temperature, or high-temperature environment. Furthermore, since the fly's-eye lens sheet is composed of a laminate including resin layers with different coefficients of linear expansion, dimensional changes occur under the environment similar to that described above. Consequently, the expansion or shrinkage of the plastic plate and the dimensional changes of the fly's-eye lens sheet may cause distortion of the display image. In particular, in the fly's-eye lens sheet having the light-shielding layer in which transmitting portions are two-dimensionally arrayed in the light-shielding layer to improve the contrast of the image, the incident angle is varied by the deformation of the sheet or the plastic plate to cause distortion of the image, and the image is darkened by the decrease in transmittance.

In this embodiment, in the screen having the structure in which the plastic plate is bonded to the fly's-eye lens sheet body with the adhesive layer therebetween, by suppressing the dimensional changes under the influence of the environment, such as heat and moisture, which are unique to the plastic, distortion of the screen and the image is improved.

This will be specifically described below with reference to FIG. 1 or 20. It is to be understood that the components not described below have the same structures as those described in the previous embodiments.

As the plastic plate 3, a known transparent plastic plate is used. As such a plastic plate, a known polymer plate can be used. Specifically, for example, any known resin plate may be appropriately selected from the group consisting of acrylic resins, styrene resins, polycarbonate, acrylic-styrene copolymers, polyesters, polyethylene terephthalate (PET), polyethylene, polyacrylates, polyethersulfones, triacetyl cellulose, polysulfones, diacetyl cellulose, polypropylene, polyvinyl chloride, epoxy resins, urea resins, urethane resins, and melamine resin.

In the resin material used for the plastic plate 3, preferably, the dimensional changes are small under the high-temperature, low-temperature, or high-humidity environment. A single plastic plate preferably has a water absorption of 0.2% or less. For example, in a methyl methacrylate-styrene copolymer, the water absorption can be decreased by increasing the styrene ratio.

The thickness of the plastic plate 3 is preferably, for example, 0.5 to 2.5 mm. The thicker plastic plate 3 is preferred in order to suppress swelling of the lens surface of the fly's-eye lens sheet body 13. However, if the thickness is excessively large, the transmittance is decreased by absorption of the resin, and also cost and weight are increased.

It is also possible to impart a light diffusion function to the plastic plate 3. In such a case, a certain diffusing agent is added to the resin constituting the plastic plate and a film is formed.

As the diffusing agent, any of various inorganic and organic fillers may be used. Specific examples thereof include, but are not limited to, crosslinked acrylic fine particles, styrene fine particles, crosslinked polyethylene fine particles, and silica fine particles. A filler that does not decrease the transmittance of the plastic plate and that has a diffusion function is preferable. The diffusing agent having an appropriately different refractive index from that of the resin is used. The particle size of the diffusing agent may be selected in any manner. For example, a diffusing agent having a particle size of 0.5 to 50 µm, preferably 1 to 30 µm, is used. As the particle size decreases, the influence of diffusion increases, and thus the transmittance is decreased. The type, particle size, etc. of the diffusing agent may be appropriately selected according to the desired diffusion characteristics.

Furthermore, the plastic plate 3 may be formed so as to be warped in a direction opposite to the direction of estimated warpage of the plastic plate 3 during storage in the environment.

A hard coat layer may be disposed on a surface (viewer side surface) of the plastic plate 3 opposite to the adhesive-bonding surface for the purpose of improving the anti-scratch property. A known transparent resin can be used as the material constituting the hard coat layer. Examples curing-type resins include polymers of silicon alkoxides, such as methyltriethoxysilane and phenyltriethoxysilane; melamine thermosetting resins, such as etherized methylol melamine; phenoxy thermosetting resins; epoxy thermosetting resins; and radiation (ultraviolet) curable polyfunctional acrylate resins, such as polyol acrylates, polyester acrylates, urethane acrylates, and epoxy acrylates. Among these, radiation curable resins, such as polyfunctional acrylate resins, are characteristic in that since a layer with a high degree of crosslinking can be obtained in a relatively short period of time by radiation exposure, the production process load is small, and the film density is high, thus being most preferably used.

In a method of forming the hard coat layer on the plastic plate 3, the resin is applied by coating on the plastic plate using a given technique, and then the resulting layer is cured by radiation (ultraviolet) exposure or heating treatment. Examples of the coating technique which may be used include microgravure coating, Myer bar coating, direct gravure coating, reverse roll coating, curtain coating, spray coating, comma coating, die coating, knife coating, and spin coating.

Furthermore, anti-glare and antistatic properties can be imparted by incorporating fine particles into the hard coat layer. Preferably, by setting the average particle size of fine particles to be incorporated at 0.5 to 15 µm, fine irregularities are formed on the surface of the hard coat layer. As the fine particles to be incorporated into the hard coat layer, fine particles of any of various inorganic and organic fillers may be used.

As the adhesive layer 16 for bonding the plastic plate 3 to the fly's-eye lens sheet body 13, any transparent adhesive may be used without particular limitations. For example, an acrylic adhesive, a silicone adhesive, or rubber adhesive may be used.

In this embodiment, the adhesive layer 16 is allowed to have a function of relieving the shrinkage and expansion of various resin layers, such as the fly's-eye lens sheet body 13 and the plastic plate 3, constituting the fly's-eye lens sheet 10 having the light-shielding layer. Consequently, the thickness of the adhesive layer 16 is 20 to 125 µm, and preferably 25 to 75 µm, and the adhesive layer 16 preferably has a moderate crosslinking density. Specifically, the Young's modulus (modulus of elasticity, more particularly, storage modulus) in the range of 100° C. to 200° C. is set at $1 \times 10^4$ to $1 \times 10^5$ Pa.

If the Young's modulus in the above temperature range exceeds $1 \times 10^5$ Pa, the crosslinking density is excessively increased, and the adhesive layer becomes rigid. Thus, the effect of relieving stress cannot be expected. If the Young's modulus is less than $1 \times 10^4$ Pa, the adhesive layer becomes excessively soft, and there is concern that the plastic plate 3 may slip off the fly's-eye lens sheet due to its own weight. Furthermore, if the thickness of the adhesive layer 16 is less than 20 µm, the effect of relieving stress cannot be expected. If the thickness exceeds 125 µm, the transmittance is decreased, workability is decreased, and the cost is increased.

In the step of bonding the plastic plate 3 to the fly's-eye lens sheet, after the adhesive layer 16 is disposed on the viewer side surface of the light-shielding layer 15, the plastic plate 3 is bonded to the adhesive layer 16. Alternatively, after the adhesive layer 16 is disposed on one surface of the plastic plate 3, the adhesive layer 16 together with the plastic plate 3 may be bonded to the light-shielding layer 15.

The heat shrinkage of the fly's-eye lens sheet body 13 is greatly affected by the dimensional change of the film 11 supporting the fly's-eye lenses 12. Consequently, preferably, the fly's-eye lens sheet body 13 is fabricated such that the machining direction of the film 11 during the film formation aligns with the longitudinal direction (horizontal direction) of the screen.

In the machining direction of the film 11 during the film formation, deformation is large and the dimensional change with respect to heat is large compared with the width direction of the film 11. In particular, this tendency is significant in a plastic film subjected to stretching during the film formation. With respect to the screen, distortion of image due to deformation in the narrow-side direction is higher than that in the long-side direction. Consequently, by aligning the direction of the film 11 in which deformation is small with the narrow-side direction of the screen, the distortion of the image due to heat shrinkage can be reduced.

Preferably, the heat shrinkage rate in the width direction of the film 11 during the film formation (i.e., direction perpendicular to the machining direction during the film formation) is 0.4% or less under the conditions of 150° C. and 30 minutes. It is preferable to perform annealing treatment in order to reduce the heat shrinkage of the film 11.

EXAMPLES

The present invention will be described specifically by way of examples. It is to be understood that the present invention is not limited to the examples.

Examples 1 to 15

Example 1

(1) Formation of Black Transfer Film

The starting materials shown below were mixed and dispersed for a predetermined time using a ball mill, and then the mixture was passed through a filter with a diameter of 5 μm. Thus, a coating material for a black transfer film with a carbon content of 65% by weight was prepared.

(Composition of Coating Material)

| | |
|---|---|
| Carbon black: RAVEN-1255 manufactured by Columbian Chemicals Company | 130 parts by weight |
| Binder resin: Polyester polyurethane (UR-8300 manufactured by Toyobo Co., Ltd.) | 70 parts by weight |
| Solvent: Methyl ethyl ketone | 500 parts by weight |
| Toluene | 500 parts by weight |

The coating material was applied to the surface of a PET film ("Lumirror" manufactured by Toray Industries, Inc.) with a thickness of 12 μm such that the film thickness after drying was 1 μm, followed by drying, and heat treatment was performed at 60° C. for 48 hours. The intended black transfer film was thereby obtained.

Evaluation of Black Transfer Film (a) Measurement of Total Light Transmittance

The total light transmittance of the black transfer film prepared in (1) was measured. The measurement result was 0.1%. As the evaluation apparatus, a haze meter HM-150 manufactured by Murakami Color Research Laboratory was used. The evaluation was performed under the conditions according to JIS K-7361.

(b) Powder-Falling

The surface of the black transfer film prepared in (1) was lightly wiped with a cotton swab, and adhesion of black was visually observed. When significant adhesion of black was observed, since there was a possibility of contamination in the subsequent steps, the film was determined to be not good (NG), and the subsequent steps were cancelled.

In Example 1, adhesion of black was not observed.

(2) Formation of Duplicate Mold

As the machine for forming a mold, a laser micromachining system MAS-300 manufactured by OPTEC s.a., Belgium, was used. As the mask, a mask in which a plurality of nail-like openings are arrayed in rows was used. As the workpiece, a substrate composed of polycarbonate was used.

First, a mask image was formed on the workpiece through the mask while the workpiece was moved in the lateral direction, and thus continuous machining was performed in the lateral direction by a laser beam to form recesses. Subsequently, after the mask was rotated by 90 degrees in the in-plane direction, a mask image was formed on the workpiece through the mask while the workpiece was moved in the longitudinal direction, and thus continuous machining was performed in the longitudinal direction by the laser beam to form recesses. By the process described above, a mold (lens pitch: X=100 μm, Y=60 μm) was formed.

Subsequently, a conductive film composed of nickel was formed, for example, by electroless plating on the mold thus obtained. The mold provided with the conductive film was placed in an electroforming apparatus, and a nickel plating layer was formed on the conductive film by electroplating. Then, the nickel plating layer was peeled off from the mold. Thus, a duplicate mold having a concave-convex pattern reversed from that of the mold was obtained.

Subsequently, a nickel plating layer was formed by electroplating on the surface provided with the concave-convex pattern of the resulting duplicate mold. Then the nickel plating layer was peeled off from the duplicate mold. Thus, a duplicate mold having the same concave-convex shape as that of the mold was formed.

(3) Formation of Fly's-Eye Lens Sheet Body

First, a UV curable resin (ARONIX manufactured by Toagosei Co., Ltd.) was poured into the duplicate mold (lens pitch: X=100 μm, Y=60 μm), and a PET film (A4300 manufactured by Toyobo Co., Ltd.) with a thickness of 50 μm was disposed thereon. Then, a load of 1 kg was applied by a rubber roller to achieve a uniform thickness of lenses. Subsequently, UV light of 1,000 $mJ/cm^2$ was applied from above the PET film to cure the UV curable resin. A fly's-eye lens sheet body was thereby obtained.

(4) Formation of Light-Shielding Pattern

Subsequently, a photosensitive adhesive (manufactured by Toagosei Co., Ltd.) was bonded to the fly's-eye lens sheet body thus obtained, and collimated UV light (500 $mJ/cm^2$) was applied from the side of the lenses to form adhesive and non-adhesive patterns.

(5) Transfer of Light-Shielding Pattern

Subsequently, the black transfer film prepared in (1) was laminated to the photosensitive adhesive layer side surface of the fly's-eye lens sheet body. Then, by pulling an extra portion of the black transfer film, the black transfer film was peeled off from the fly's-eye lens sheet body. Thus, the black layer was transferred to the adhesive portion of the photosensitive adhesive layer and a light-shielding layer including transmitting portions with quadrangular openings having a target area ratio of the light-shielding portion of 90% was formed. By the process described above, a fly's-eye lens sheet having a light-shielding layer with a size of 786 mm in height and 1,362 mm in width was obtained.

Example 2

First, a black transfer film was formed using the same materials and by the same process as in Example 1. Subsequently, a fly's-eye lens sheet body was fabricated under the conditions described below, and a light-shielding layer including transmitting portions with quadrangular openings having a target area ratio of the light-shielding portion of 90% was formed. The conditions other than those described were the same as those in Example 1.
(Fabrication Conditions)
lens pitch: X=76 μm, Y=46 μm
plastic base film: 35 μm

Example 3

First, a black transfer film was formed using the same materials and by the same process as in Example 1. Subsequently, a fly's-eye lens sheet body was fabricated under the conditions described below, and a light-shielding layer including transmitting portions with quadrangular openings having a target area ratio of the light-shielding portion of 90% was formed. The conditions other than those described were the same as those in Example 1.
(Fabrication Conditions)
lens pitch: X=150 μm, Y=90 μm
plastic base film: 75 μm

Example 4

First, a black transfer film was formed using the same materials and by the same process as in Example 1. Subsequently, a fly's-eye lens sheet body was fabricated under the conditions described below, and a light-shielding layer including transmitting portions with quadrangular openings having a target area ratio of the light-shielding portion of 90% was formed. The conditions other than those described were the same as those in Example 1.
(Fabrication Conditions)
lens pitch: X=150 μm, Y=120 μm
plastic base film: 105 μm

Example 5

First, a black transfer film was formed using the same materials and by the same process as in Example 1. Subsequently, a fly's-eye lens sheet body was fabricated under the conditions described below, and a light-shielding layer including transmitting portions with quadrangular openings having a target area ratio of the light-shielding portion of 93% was formed. The conditions other than those described were the same as those in Example 1.

(Fabrication Conditions)
lens pitch: X=76 μm, Y=46 μm
plastic base film: 38 μm

Example 6

First, a coating material for a black transfer film was prepared using the same materials and by the same process as in Example 1. Then, the coating material was applied to the surface of a PET film ("Lumirror" manufactured by Toray Industries, Inc.) with a thickness of 12 μm such that the film thickness after drying was 0.5 μm, followed by drying, and heat treatment was performed at 60° C. for 48 hours.

Subsequently, a fly's-eye lens sheet body was fabricated as in Example 1, and a light-shielding layer including transmitting portions with quadrangular openings having a target area ratio of the light-shielding portion of 90% was formed using the black transfer film described above. The conditions other than those described herein were the same as those in Example 1.

Example 7

First, a coating material for a black transfer film was prepared using the same materials and by the same process as in Example 1. Then, the coating material was applied to the surface of a PET film ("Lumirror" manufactured by Toray Industries, Inc.) with a thickness of 12 μm such that the film thickness after drying was 2 μm, followed by drying, and heat treatment was performed at 60° C. for 48 hours.

Subsequently, a fly's-eye lens sheet body was fabricated as in Example 1, and a light-shielding layer including transmitting portions with quadrangular openings having a target area ratio of the light-shielding portion of 90% was formed using the black transfer film described above. The conditions other than those described herein were the same as those in Example 1.

Example 8

First, the starting materials shown below were mixed, and using the same process as that in Example 1, a coating material for a black transfer film with a carbon content of 45% by weight was prepared.
(Composition of Coating Material)

| | |
|---|---|
| Carbon black: RAVEN-1255 manufactured by Columbian Chemicals Company | 110 parts by weight |
| Binder resin: Polyester polyurethane (UR-8300 manufactured by Toyobo Co., Ltd.) | 90 parts by weight |
| Solvent: Methyl ethyl ketone | 500 parts by weight |
| Toluene | 500 parts by weight |

Subsequently, the coating material was applied to the surface of a PET film ("Lumirror" manufactured by Toray Industries, Inc.) with a thickness of 12 μm such that the film thickness after drying was 1 μm, followed by drying, and heat treatment was performed at 60° C. for 48 hours. The resulting black transfer film had a total light transmittance of 1.5%.

Subsequently, a fly's-eye lens sheet body was fabricated as in Example 1, and a light-shielding layer including transmitting portions with quadrangular openings having a target area ratio of the light-shielding portion of 90% was formed using the black transfer film described above. The conditions other than those described herein were the same as those in Example 1.

Example 9

First, a black transfer film was formed using the same materials and by the same process as in Example 1. Subsequently, a fly's-eye lens sheet body was fabricated as in Example 1, and a light-shielding layer including transmitting portions with quadrangular openings having a target area ratio of the light-shielding portion of 91% was formed using the black transfer film described above. The conditions other than those described herein were the same as those in Example 1.

Example 10

First, a black transfer film was formed using the same materials and by the same process as in Example 1. Subsequently, a fly's-eye lens sheet body was fabricated under the conditions described below, and an antireflection coating was applied to the surface of the lens sheet body (applied CYTOP CTL-107M manufactured by Asahi Glass Co., Ltd. by a dipping method at a thickness of 120 nm). A light-shielding layer including transmitting portions with quadrangular openings having a target area ratio of the light-shielding portion of 90% was formed. The conditions other than those described herein were the same as those in Example 1.

(Fabrication Conditions)

lens pitch: X=100 μm, Y=60 μm plastic base film: 50 μm

By subjecting the surface of the lenses to antireflection treatment, surface reflection was reduced with respect to incident light, and the total light transmittance was increased. The method of antireflection treatment for the surface of the lenses is not particularly limited, and a known technique may be employed. For example, a known antireflection coating material may be applied to form a thin film, or antireflection may be performed by forming fine concaves and convexes on the surface of the lenses.

Example 11

The starting materials shown below were mixed, and using the same process as that in Example 1, a coating material for a black transfer film with a carbon content of 45% by weight was prepared.

(Composition of Coating Material)

| | |
|---|---|
| Carbon black: RAVEN-1255 manufactured by Columbian Chemicals Company | 110 parts by weight |
| Binder resin: Polyester polyurethane (UR-8300 manufactured by Toyobo Co., Ltd.) | 90 parts by weight |
| Solvent: Methyl ethyl ketone | 500 parts by weight |
| Toluene | 500 parts by weight |

Subsequently, the coating material thus prepared was applied to the surface of a PET film ("Lumirror" manufactured by Toray Industries, Inc.) with a thickness of 12 μm such that the film thickness after drying was 0.5 μm, followed by drying, and heat treatment was performed at 60° C. for 48 hours to obtain an intended black transfer film. The resulting black transfer film had a total light transmittance of 2.0%.

Subsequently, a fly's-eye lens sheet body was fabricated as in Example 1, and a light-shielding layer including transmitting portions with quadrangular openings having a target area ratio of the light-shielding portion of 90% was formed using the black transfer film described above. The conditions other than those described herein were the same as those in Example 1.

Example 12

First, a black transfer film was formed using the same materials and by the same process as in Example 1. Subsequently, a fly's-eye lens sheet body was fabricated under the conditions described below, and a light-shielding layer including transmitting portions with quadrangular openings having a target area ratio of the light-shielding portion of 90% was formed. The conditions other than those described herein were the same as those in Example 1.

(Fabrication Conditions)

lens pitch: X=55 μm, Y=35 μm plastic base film: 50 μm

Example 13

The starting materials shown below were mixed and dispersed for a predetermined time using a ball mill, and then the mixture was passed through a filter with a diameter of 5 μm to prepare a coating material for a black transfer film with a carbon content of 50% by weight.

(Composition of Coating Material)

| | |
|---|---|
| Carbon black: RAVEN-1255 manufactured by Columbian Chemicals Company | 100 parts by weight |
| Binder resin: Polyester polyurethane (UR-8300 manufactured by Toyobo Co., Ltd.) | 100 parts by weight |
| Solvent: Methyl ethyl ketone | 500 parts by weight |
| Toluene | 500 parts by weight |

The coating material thus prepared was applied to the surface of a PET film ("Lumirror" manufactured by Toray Industries, Inc.) with a thickness of 12 μm such that the film thickness after drying was 1 μm, followed by drying, and heat treatment was performed at 120° C. for 3 minutes to obtain an intended black transfer film.

Evaluation of Black Transfer Film

The total light transmittance of the resulting black transfer film was 0.5%, and powder-falling was not observed.

A lens array mold was formed by the same method as in Example 1, and a fly's-eye lens sheet body was fabricated using the same material and by the same process as in Example 1. The lens pitch, the curvature of a single lens, and the thickness of a plastic base film were set as follows:

(Fabrication Conditions)

Curvature: In the formula (1) the Cx, Cy, kx, and ky values were as follows:

Cx=0.0220

Cy=0.0220

Kx=−1.0

Ky=0.8 lens pitch: X=100 μm, Y=60 μm plastic base film: 75 μm

A light-shielding layer including transmitting portions with X-shaped openings having a target area ratio of the light-shielding portion of 90% was formed on the lens sheet body by the same process as that in Example 1.

Example 14

A screen was fabricated by the same process using the same materials as in Example 14 except that the composition of the coating material for the black transfer film was different.

The starting materials shown below were mixed and dispersed for a predetermined time using a ball mill, and then the mixture was passed through a filter with a diameter of 5 μm to prepare a coating material for a black transfer film with a carbon content of 60% by weight.

(Composition of Coating Material)

| | |
|---|---|
| Carbon black: RAVEN-1255 manufactured by Columbian Chemicals Company | 120 parts by weight |
| Binder resin: Polyester polyurethane (UR-8300 manufactured by Toyobo Co., Ltd.) | 80 parts by weight |
| Solvent: Methyl ethyl ketone | 500 parts by weight |
| Toluene | 500 parts by weight |

The coating material thus prepared was applied to the surface of a PET film ("Lumirror" manufactured by Toray Industries, Inc.) with a thickness of 12 μm such that the film thickness after drying was 1 μm, followed by drying, and heat treatment was performed at 120° C. for 3 minutes to obtain an intended black transfer film. The total light transmittance of the resulting black transfer film was 0.2%, and powder-falling was not observed.

Example 15

First, a black transfer film was formed using the same materials and by the same process as in Example 1. As the fly's-eye lenses, aspherical lenses in which the vertical viewing angle was narrowed were used. The thickness of the plastic base film was set at 75 μm. A mold was formed by the same process as in Example 1, a fly's-eye lens sheet body was formed, and then a light-shielding layer including transmitting portions with linear openings having a target area ratio of the light-shielding portion of 70% was formed using the black transfer film described above. The conditions other than those described herein were the same as those in Example 1.

Comparative Example 1

First, a black transfer film was formed using the same materials and by the same process as in Example 1. Subsequently, a fly's-eye lens sheet body was fabricated under the conditions described below, and a light-shielding layer with a target area ratio of the light-shielding portion of 90% was formed. The conditions other than those described herein were the same as those in Example 1.
(Fabrication Conditions)
lens pitch: X=250 μm, Y=150 μm
plastic base film: 125 μm Comparative Example 2

First, a black transfer film was formed using the same materials and by the same process as in Example 1. Subsequently, a fly's-eye lens sheet body was fabricated under the conditions described below, and a light-shielding layer with a target area ratio of the light-shielding portion of 85% was formed. The conditions other than those described were the same as those in Example 1.
(Fabrication Conditions)
lens pitch: X=50 μm, Y=30 μm
plastic base film: 25 μm Comparative Example 3

First, a black transfer film was formed using the same materials and by the same process as in Example 1 except that the thickness of the black layer after drying was set at 2.5 μm. Subsequently, a fly's-eye lens sheet body was fabricated under the conditions described below, and a light-shielding layer with a target area ratio of the light-shielding portion of 90% was formed. The conditions other than those described herein were the same as those in Example 1.
(Fabrication Conditions)
lens pitch: X=100 μm, Y=60 μm
plastic base film: 50 μm Comparative Example 4

First, the starting materials shown below were mixed, and using the same process as that in Example 1, a coating material for a black transfer film with a carbon content of 40% by weight was prepared.

(Composition of Coating Material)

| | |
|---|---|
| Carbon black: RAVEN-1255 manufactured by Columbian Chemicals Company | 80 parts by weight |
| Binder resin: Polyester polyurethane (UR-8300 manufactured by Toyobo Co., Ltd.) | 120 parts by weight |
| Solvent: Methyl ethyl ketone | 500 parts by weight |
| Toluene | 500 parts by weight |

Subsequently, the coating material thus obtained was applied to the surface of a PET film ("Lumirror" manufactured by Toray Industries, Inc.) with a thickness of 12 μm such that the film thickness after drying was 0.5 μm, followed by drying, and heat treatment was performed at 60° C. for 48 hours.

The total light transmittance of the black transfer film was measured to be 2.3%. Since the black density was low, the evaluation of the subsequent steps was cancelled.

Comparative Example 5

First, the starting materials shown below were mixed, and using the same process as that in Example 1, a coating material for a black transfer film with a carbon content of 80% by weight was prepared.

(Composition of Coating Material)

| | |
|---|---|
| Carbon black: RAVEN-1255 manufactured by Columbian Chemicals Company | 160 parts by weight |
| Binder resin: Polyester polyurethane (UR-8300 manufactured by Toyobo Co., Ltd.) | 40 parts by weight |
| Solvent: Methyl ethyl ketone | 500 parts by weight |
| Toluene | 500 parts by weight |

Subsequently, the coating material thus obtained was applied to the surface of a PET film ("Lumirror" manufactured by Toray Industries, Inc.) with a thickness of 12 μm such that the film thickness after drying was 0.5 μm, followed by drying, and heat treatment was performed at 60° C. for 48 hours.

With respect to the black transfer film thus obtained, powder-falling was checked. Since the result was NG, the evaluation of the subsequent steps was cancelled.

Comparative Example 6

First, a black transfer film was formed using the same materials and by the same process as in Example 1. Subsequently, a fly's-eye lens sheet body was fabricated under the conditions described below, and a light-shielding layer with a target area ratio of the light-shielding portion of 80% was formed. The conditions other than those described herein were the same as those in Example 1.
(Fabrication Conditions)
lens pitch: X=100 μm, Y=60 μm
plastic base film: 50 μm Comparative Example 7

First, a black transfer film was formed using the same materials and by the same process as in Example 1. Subsequently, a fly's-eye lens sheet body was fabricated under the conditions described below, and a light-shielding layer with a target area ratio of the light-shielding portion of 65% was formed. The conditions other than those described herein were the same as those in Example 1.
(Fabrication Conditions)
lens pitch: X=100 μm, Y=60 μm
plastic base film: 50 μm Comparative Example 8

First, a black transfer film was formed using the same materials and by the same process as in Example 1. Subsequently, a fly's-eye lens sheet body was fabricated under the conditions described below, and a light-shielding layer with a target area ratio of the light-shielding portion of 90% was formed. The conditions other than those described herein were the same as those in Example 1.
(Fabrication Conditions)
lens pitch: X=100 μm, Y=60 μm
plastic base film: 75 μm Comparative Example 9

First, a black transfer film was formed using the same materials and by the same process as in Example 1. Subsequently, a lenticular lens sheet was formed under the conditions described below. A light-shielding layer with a target area ratio of the light-shielding portion of 90% was formed. The conditions other than those described herein were the same as those in Example 1.
(Fabrication Conditions)
lens pitch: X=100 μm
plastic base film: 75 μm

[Evaluation Methods]

With respect to the fly's-eye lens sheet having the light-shielding layer in each of Examples 1 to 15 and Comparative Examples 1 to 9, evaluations were conducted on the following items.

Evaluation of Fly's-Eye Lens Sheet Having Light-Shielding Layer (a) Measurement of the area ratio of light-shielding portion and confirmation of the shape of transmitting portions A 1-cm-square sample was cut from a given point of the fly's-eye lens sheet having the light-shielding layer in each of the examples and comparative examples. The surface of the light-shielding layer in each sample was photographed with an optical microscope, and using image analysis software, the area ratio of the light-shielding portion was measured. Simultaneously, the shape of the transmitting portions was observed with the optical microscope.

(b) Measurement of Total Light Transmittance

The measurement was conducted while light was allowed to enter from the lens side of the fly's-eye lens sheet having the light-shielding layer in each of the examples and comparative examples. As the evaluation apparatus, a haze meter HM-150 manufactured by Murakami Color Research Laboratory was used. The evaluation was performed under the conditions according to JIS K-7361.

(c) Evaluation of Contrast

A portion of a lenticular lens screen was cut from a rear projection television ("Grand Wega") manufactured by Sony Corporation, and the fly's-eye lens screen having the light-shielding layer in each of the examples and comparative examples was fitted and fixed in the cut-away portion. An image was projected, and comparison was made with the portion composed of the lenticular lens screen as a known screen. Evaluations were conducted on the basis of the following three criteria:

Poor: Contrast is inferior to known screen
Average: Contrast is equal to known screen
Good: Contrast is superior to known screen The measurement results in the examples and comparative examples are shown in Tables 3, 4, and 5.

TABLE 3

| | | | Examples | | | | | | | |
| --- | --- | --- | --- | --- | --- | --- | --- | --- | --- | --- |
| | | | Example 1 | Example 2 | Example 3 | Example 4 | Example 5 | Example 6 | Example 7 | Example 8 |
| Black transfer film | Thickness of black layer | (μm) | 1.0 | 1.0 | 1.0 | 1.0 | 1.0 | 0.5 | 2.0 | 1.0 |
| | Carbon content | (wt %) | 65 | 65 | 65 | 65 | 65 | 65 | 65 | 45 |
| | Total light transmittance | (%) | 0.1 | 0.1 | 0.1 | 0.1 | 0.1 | 0.5 | 0.01 | 1.5 |
| | Power-falling | OK/NG | OK | OK | OK | OK | OK | OK | OK | OK |
| Lens | Pitch | X(μm) | 100 | 76 | 150 | 150 | 76 | 100 | 100 | 100 |
| | | Y(μm) | 60 | 46 | 90 | 120 | 46 | 60 | 60 | 60 |
| | Sag (depth) | (μm) | 45 | 35 | 68 | 90 | 35 | 45 | 45 | 45 |
| Base | Type | — | PET | PET | PET | PET | PET | PET | PET | PET |
| | Thickness | (μm) | 50 | 35 | 75 | 105 | 38 | 50 | 50 | 50 |
| Photosensitive adhesive layer | Thickness | (μm) | 20 | 20 | 20 | 20 | 20 | 20 | 20 | 20 |

TABLE 3-continued

|  |  |  | Examples | | | | | | | |
|---|---|---|---|---|---|---|---|---|---|---|
|  |  |  | Example 1 | Example 2 | Example 3 | Example 4 | Example 5 | Example 6 | Example 7 | Example 8 |
| Light-shielding layer | Thickness | (μm) | 1.0 | 1.0 | 1.0 | 1.0 | 1.0 | 0.5 | 2.0 | 1.0 |
|  | Shape of opening |  | Quad-rangular | Quad-rangular | Quad-rangular | Quad-rangular | Quad-rangular | Quad-rangular | Quad-rangular | Quad-rangular |
|  | Target area ratio of light-shielding portion | (%) | 90 | 90 | 90 | 90 | 93 | 90 | 90 | 90 |
| Lens sheet | Total light transmittance (incident from lens side) | (%) | 90 | 87 | 90 | 90 | 65 | 90 | 90 | 90 |
|  | Light-shielding portion area ratio | (%) | 90 | 93 | 90 | 90 | 95 | 90 | 90 | 90 |
|  | Contrast |  | Good | Good | Good | Good | Average | Good | Good | Good |

TABLE 4

|  |  |  | Examples | | | | | | |
|---|---|---|---|---|---|---|---|---|---|
|  |  |  | Example 9 | Example 10 | Example 11 | Example 12 | Example 13 | Example 14 | Example 15 |
| Black transfer film | Thickness of black layer | (μm) | 1.0 | 1.0 | 0.5 | 1.0 | 1.0 | 1.0 | 1.0 |
|  | Carbon content | (wt %) | 65 | 65 | 45 | 65 | 50 | 60 | 65 |
|  | Total light transmittance | (%) | 0.1 | 0.1 | 2 | 0.1 | 0.5 | 0.2 | 0.1 |
|  | Power-falling | OK/NG | OK | OK | OK | OK | OK | OK | OK |
| Lens | Pitch | X(μm) | 100 | 100 | 100 | 55 | 100 | 100 | 100 |
|  |  | Y(μm) | 60 | 60 | 60 | 35 | 60 | 60 | 60 |
|  | Sag (depth) | (μm) | 45 | 45 | 45 | 45 | 40 | 45 | 35 |
| Base | Type | — | PET | PET | PET | PET | PET | PET | PET |
|  | Thickness | (μm) | 50 | 50 | 50 | 50 | 75 | 50 | 75 |
| Photosensitive adhesive layer | Thickness | (μm) | 20 | 20 | 20 | 10 | 20 | 20 | 20 |
| Light-shielding layer | Thickness | (μm) | 1.0 | 1.0 | 1.0 | 1.0 | 1.0 | 1.0 | 1.0 |
|  | Shape of opening |  | Quad-rangular | Quad-rangular | Quad-rangular | Quad-rangular | X-shaped | X-shaped | Linear |
|  | Target area ratio of light-shielding portion | (%) | 91 | 90 | 90 | 90 | 90 | 90 | 70 |
| Lens sheet | Total light transmittance (incident from lens side) | (%) | 89 | 95 | 90 | 90 | 85 | 85 | 90 |
|  | Light-shielding portion area ratio | (%) | 91 | 90 | 90 | 90 | 90 | 90 | 70 |
|  | Contrast |  | Good | Good | Average | Average | Average | Average | Average |

TABLE 5

|  |  |  | Comparative Examples | | | | | | | | |
|---|---|---|---|---|---|---|---|---|---|---|---|
|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
| Black transfer film | Thickness of black layer | (μm) | 1.0 | 1.0 | 2.5 | 0.5 | 0.5 | 1.0 | 1.0 | 1.0 | 1.0 |
|  | Carbon content | (wt %) | 65 | 65 | 65 | 40 | 75 | 65 | 65 | 65 | 65 |
|  | Total light transmittance | (%) | 0.1 | 0.1 | 0.01≧ | 2.3 | 0.01≧ | 0.1 | 0.1 | 0.1 | 0.1 |
|  | Power-falling | OK/NG | OK | OK | OK | OK | NG | OK | OK | OK | OK |
| Lens | Pitch | X(μm) | 250 | 50 | 100 |  |  | 100 | 100 | 100 | 100 |
|  |  | Y(μm) | 150 | 30 | 60 |  |  | 60 | 60 | 60 | — |
|  | Sag (depth) | (μm) | 110 | 22 | 45 |  |  | 45 | 45 | 45 | 37 |

TABLE 5-continued

|  |  |  | Comparative Examples ||||||||| 
|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
| --- | --- | --- | --- | --- | --- | --- | --- | --- | --- | --- | --- |
| Base | Type | — | PET | PET | PET |  |  | PET | PET | PET | PET |
|  | Thickness | (μm) | 125 | 25 | 50 |  |  | 50 | 50 | 75 | 75 |
| Photosensitive adhesive layer | Thickness | (μm) | 20 | 20 | 20 |  |  | 20 | 20 | 20 | 20 |
| Light-shielding layer | Thickness | (μm) | 1.0 | 1.0 | 2.5 |  |  | 1.0 | 1.0 | 1.0 | 1.0 |
|  | Shape of opening |  | Quad-rangular | Quad-rangular | Quad-rangular |  |  | Quad-rangular | Quad-rangular | Irregular | Linear |
|  | Target area ratio of light-shielding portion | (%) | 90 | 85 | 90 |  |  | 80 | 65 | 90 | 90 |
| Lens sheet | Total light transmittance (incident from lens side) | (%) | 90 | 33 | 91 |  |  | 90 | 90 | 60 | 84 |
|  | Light-shielding portion area ratio | (%) | 90 | 97 | 90 |  |  | 80 | 65 | 95 | 70 |
|  | Contrast |  | Good | Poor | Average |  |  | Average | Poor | Poor | Average |

In the fly's-eye lens sheet having the light-shielding layer in each of Examples 1 to 15, since the carbon content in the light-shielding portion constituting the light-shielding layer was 45% to 65% by weight, it was possible to form the transmitting portions having the intended shape of the openings with high accuracy. That is, the area ratio of the light-shielding portion was high, and the total light transmittance in the transmitting portions was also high. Thus, good results were obtained.

Furthermore, in the fly's-eye lens sheet having the light-shielding layer in Example 15, since the target area ratio of the light-shielding portion was set at 70% the contrast was equal to the known screen. However, the vertical viewing angle was wide compared with the known screen. Thus, good results were obtained.

In the lens sheet in which the light-shielding layer was formed using the lenticular lens, although the light-shielding layer was formed under optimized exposure conditions, the resulting lens sheet had a light-shielding portion area ratio of only 70%, and the contrast was equal to the known screen.

On the basis of the evaluation results (a), (b), and (c), the light-shielding portion area ratio, the thickness of the black layer, the lens pitch, and the thickness of the PET film were evaluated. The evaluation results will be described below.

[Evaluation of Light-Shielding Portion Area Ratio]

In the fly's-eye lens sheet having the light-shielding layer in which the light-shielding portion area ratio was 80% in Comparative Example 6, the contrast was equal to the known screen.

In the fly's-eye lens sheet having the light-shielding layer in which the light-shielding portion area ratio was 65% in Comparative Example 7, the contrast was inferior to the known screen.

In the fly's-eye lens sheet having the light-shielding layer in Example 5, although the target area ratio of the light-shielding portion was 93%, the actual area ratio was 95%. Although the transmittance was decreased because the black layer partially remained in the openings, the contrast was equal to the known screen.

As is evident from the evaluation results, the area ratio of the light-shielding portion is preferably 70% or more of the area of the entire light-shielding layer.

[Evaluation of Black Layer]

In the fly's-eye lens sheet having the light-shielding layer in which the coating thickness of the black layer exceeded 2.0 μm in Comparative Example 3, occurrence of defects of cracks were observed in the surface of the light-shielding layer.

Furthermore, when a fly's-eye lens sheet having a light-shielding layer was formed using a black layer with a coating thickness of less than 0.5 μm, it was not possible to sufficiently block external light, and the contrast was inferior to the known screen.

As is evident from the evaluation results, the thickness of the black layer of the black transfer film is preferably 0.5 to 2.0 μm.

[Evaluation of Lens Pitch]

In the fly's-eye lens sheet having the light-shielding layer in which the lens pitch exceeded 200 μm and the thickness of plastic base film was 125 μm in Comparative Example 1, the light-shielding portion area ratio was 90%, and the total light transmittance from the lens side was 90%. Thus, good characteristics in which no defects were found with respect to incident light were obtained. However, since the lens pitch of the fly's-eye lens sheet was large, occurrence of moiré fringes was observed depending on the pixel pitch on the screen.

In the fly's-eye lens sheet having the light-shielding layer in which the lens pitch was less than 35 μm in Comparative Example 2, although the target area ratio of the light-shielding portion area ratio was 85%, it was not possible to attach the intended light-shielding layer because of the smallness of the light-collecting parts, and the black layer remained in the opening. Thus, the resulting lens sheet was dark at a total light transmittance of 33%.

As is evident from the evaluation results, the lens pitch is preferably, 35 to 150 μm.

[Evaluation of Thickness of Pet Film]

In Comparative Example 8, the photosensitive adhesive layer was exposed to light at the positions deviated from the light-collecting points of the lenses because of the large thickness of the PET film. As a result, the shape of the openings was irregular, and the black layer remained. Thus, the resulting lens sheet has a total light transmittance of less than 65%. The contrast was inferior to the known screen.

[Evaluation of Screen]

In the transmissive screen thus obtained in Example 1, the diffusion characteristic (luminance distribution) was evaluated.

Figure 21:
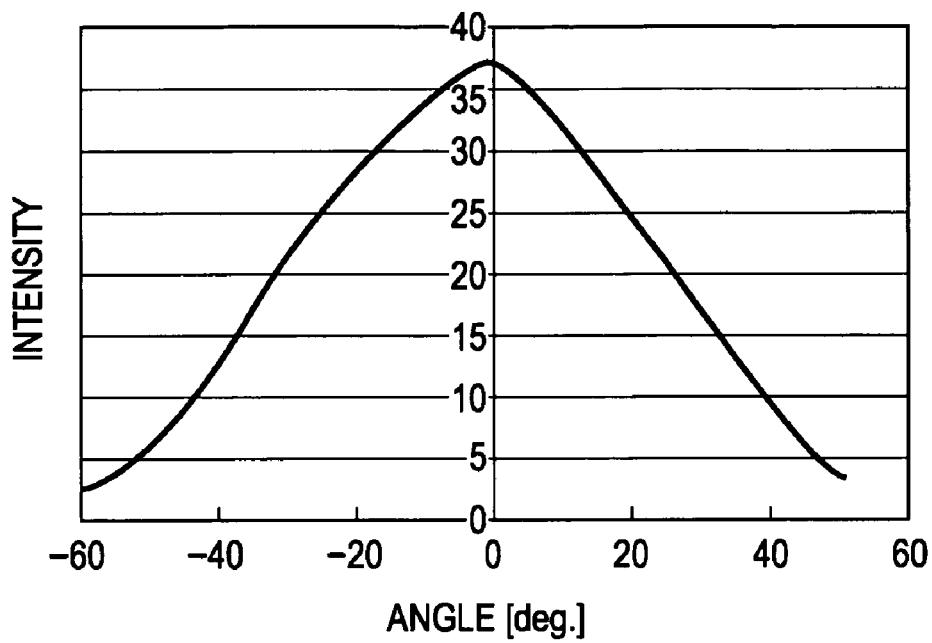
FIG. 21 is a characteristic diagram showing a horizontal diffusion characteristic (luminance distribution) in a transmissive screen of Example 1.
Figure 22:
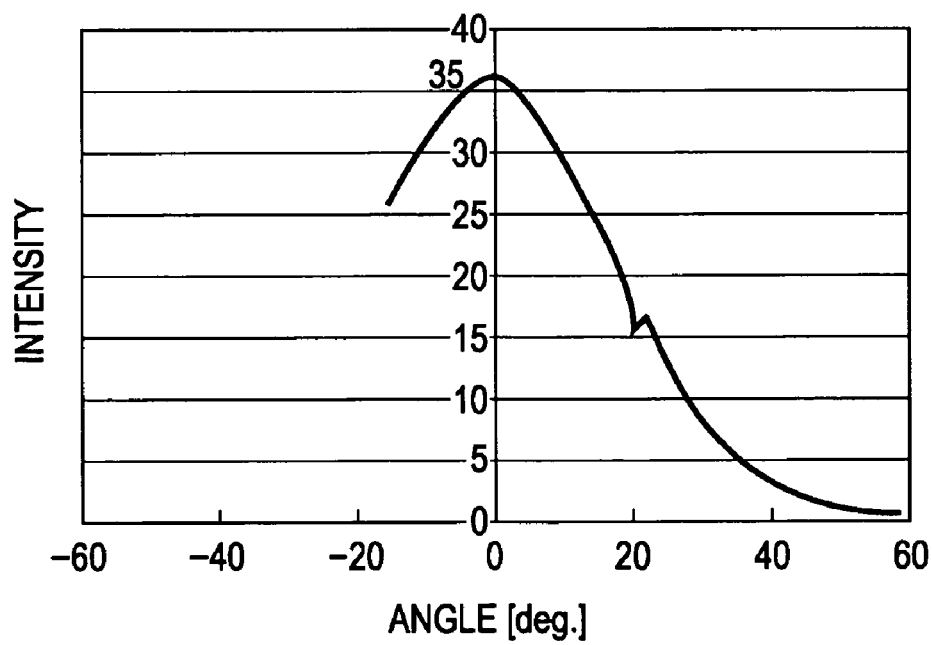
FIG. 22 is a characteristic diagram showing a vertical diffusion characteristic (luminance distribution) in the transmissive screen of Example 1.

FIG. 21 shows a horizontal diffusion characteristic (luminance distribution) in the transmissive screen of Example 1. FIG. 22 shows a vertical diffusion characteristic (luminance distribution) of the transmissive screen of Example 1. In each of FIGS. 21 and 22, the abscissa axis indicates the angle with respect to the normal line of the screen. Note that in FIG. 22, the fact that no luminance distribution is shown in a region below about −20 degrees is caused by the measurement conditions and is not related to the performance of the screen of Example 1.

As is evident from FIG. 21, the luminance is highest in the normal line direction of screen, and the luminance gradually decreases as the angle shifts from the normal line direction to the horizontal direction. Furthermore, as is evident from FIG. 22, the luminance is the highest in the normal line direction of the screen, and the luminance gradually decreases as the angle shifts from the normal line direction to the vertical direction. That is, as is evident from FIGS. 21 and 22, one fly's-eye lens sheet widely diffuses light in the horizontal direction and in the vertical direction, and anisotropy exists in each of the directions.

Furthermore, with respect to the transmissive screen having the lenticular lens sheet in Comparative Example 9, the diffusion characteristics were evaluated as in Example 1. In the transmissive screen of Comparative Example 9, with respect to the horizontal diffusion characteristic, the luminance is the highest in the normal line direction of the screen, and the luminance gradually decreases as the angle shifts from the normal line direction to the horizontal direction. With respect to the vertical diffusion characteristic, the luminance is the highest in the normal line direction of the screen, and the luminance abruptly decreases as the angle shifts from the normal line direction to the vertical direction.

As is evident from the results described above, the transmissive screen of Example 1 has an advantage in that it can diffuse light widely in the horizontal direction and the in the vertical direction, which cannot be achieved by the transmissive screen of Comparative Example 9.

Figure 23A:
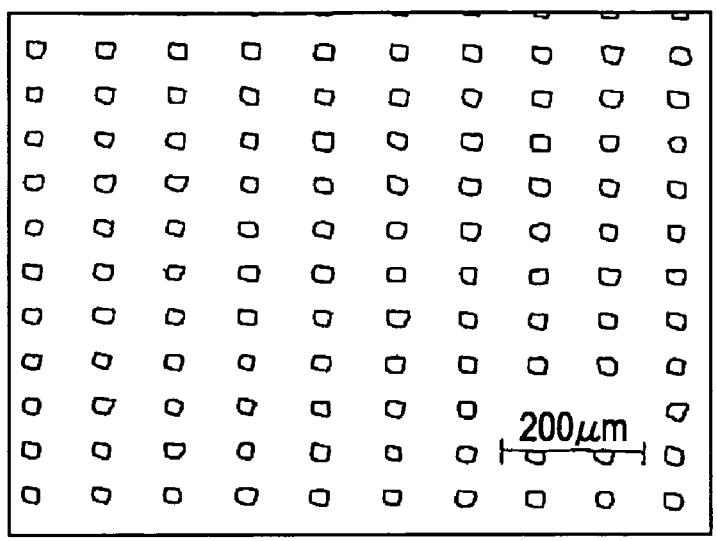
FIGS. 23A to 23C are outline diagrams showing observations of light-shielding layers, FIG. 23A showing a light-shielding portion area ratio of 92%, FIG. 23B showing a light-shielding portion area ratio of 88%, and FIG. 23C showing a light-shielding portion area ratio of 80%.
Figure 23B:
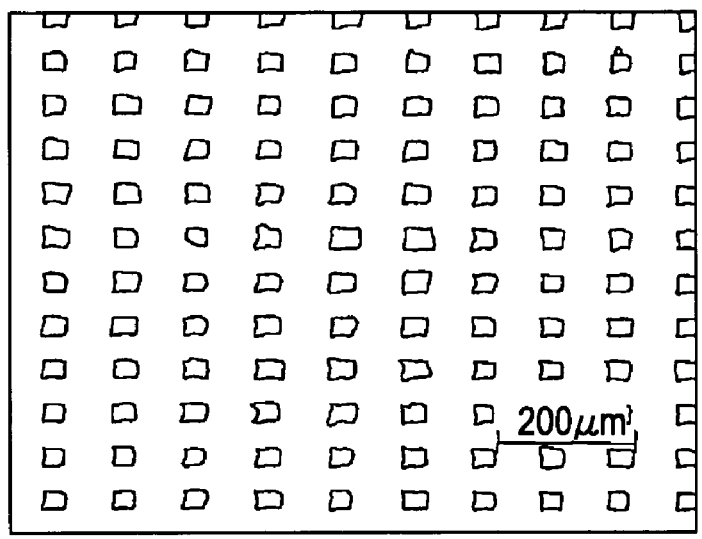
Figure 23C:
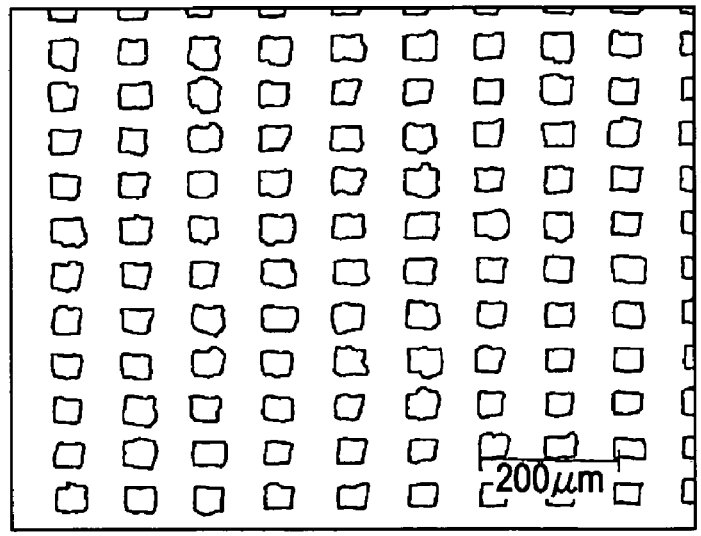

For reference, observations of light-shielding layers obtained using a digital microscope "VHX200" manufactured by Keyence Corporation will be described below. FIG. 23A shows the observations of a light-shielding layer having a light-shielding portion area ratio of 92%. FIG. 23B shows the observations of a light-shielding layer having a light-shielding portion area ratio of 88%. FIG. 23C shows the observations of a light-shielding layer having a light-shielding portion area ratio of 80%. Note that each of the fly's-eye lens sheets having the light-shielding layers shown in FIGS. 23A to 23C was fabricated by substantially the same method as that used in Example 1.

Figure 24:
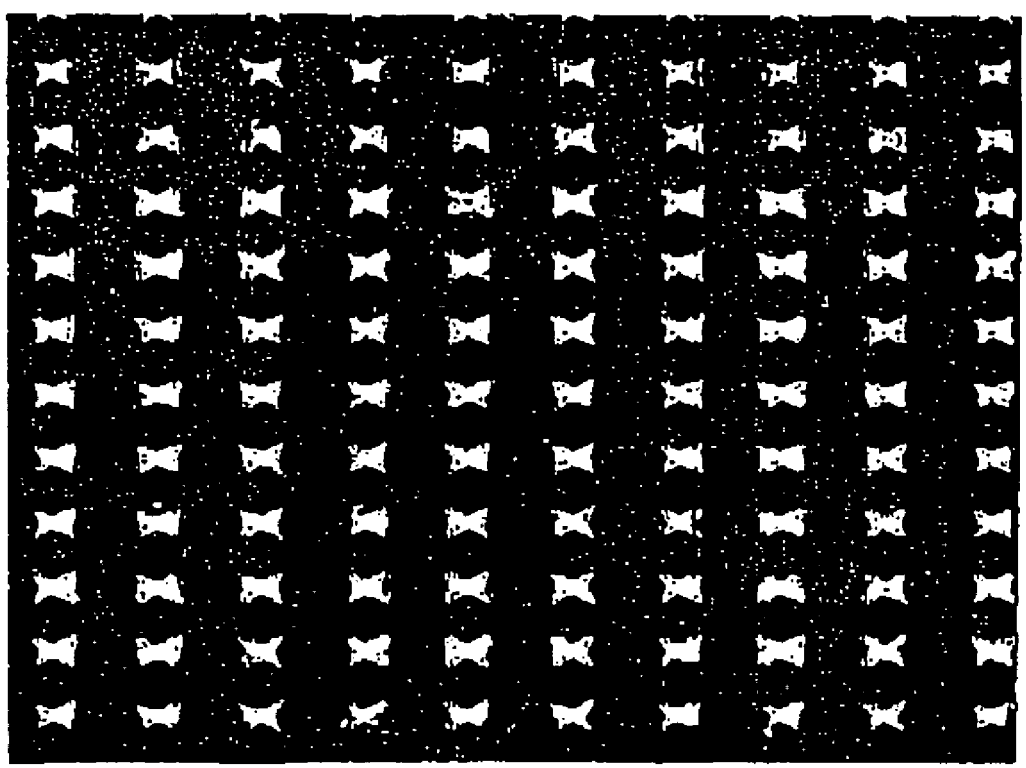
FIG. 24 shows a photo of a sample of a light-shielding layer including transmitting portions having a modified X shape.

As is evident from FIGS. 23A to 23C, the transmitting portions have a substantially quadrangular shape although slight deformation is observed. Furthermore, FIG. 24 shows a photo of a sample of a light-shielding layer including transmitting portions having an X shape (or modified X shape) as in the case of Example 13 or 14. With respect to the example of the linear shape of transmitting portions of a light-shielding layer, refer to FIGS. 8A and 8B.

Examples 16 to 21

Example 16

(1) Formation of Black Transfer Film

The starting materials shown below were mixed and dispersed for a predetermined time using a ball mill, and then the mixture was passed through a filter with a diameter of 5 μm. Thus, a coating material for a black transfer film with a carbon content of 60% by weight was prepared.

(Composition of Coating Material)

| | |
|---|---|
| Carbon black: RAVEN-1255 manufactured by Columbian Chemicals Company | 120 parts by weight |
| Binder resin: Polyester polyurethane (UR-8300 manufactured by Toyobo Co., Ltd.) | 80 parts by weight |
| Solvent: Methyl ethyl ketone | 500 parts by weight |
| Toluene | 500 parts by weight |

The coating material was applied to the surface of a PET film ("Lumirror" manufactured by Toray Industries, Inc.) with a thickness of 12 μm such that the film thickness after drying was 1 μm, followed by drying, and heat treatment was performed at 60° C. for 48 hours. The intended black transfer film was thereby obtained.

Evaluation of Black Transfer Film (a) Measurement of Total Light Transmittance

The total light transmittance of the black transfer film prepared in (1) was measured. The measurement result was 0.1%. As the evaluation apparatus, a haze meter HM-150 manufactured by Murakami Color Research Laboratory was used. The evaluation was performed under the conditions according to JIS K-7361.

(b) Measurement of Martens Hardness

The Martens hardness of the black transfer film prepared in (1) was measured under the following conditions. The measurement result was 80 N/mm$^2$.

Evaluation apparatus: Picodentor (microhardness measurement system manufactured by Fischer Instruments K.K.)

When a coating film is formed on an elastic body, such as a polymer film, the hardness may include the modulus of elasticity of the base depending on the indentation depth. In the measurement in this example, in order to accurately measure the hardness of the black layer only, the measurement was performed at an indentation depth (1/10 of the total thickness of the coating film) that was not affected by the modulus of elasticity of the base.

(2) Formation of Duplicate Mold

As the machine for forming a mold, a laser micromachining system MAS-300 manufactured by OPTEC s.a., Belgium, was used. As the mask, a mask in which a plurality of nail-like transmitting portions are arrayed in rows was used. As the workpiece, a substrate composed of polycarbonate was used.

First, a mask image was formed on the workpiece through the mask while the workpiece was moved in the lateral direction, and thus continuous machining was performed in the lateral direction by a laser beam to form recesses. Subsequently, after the mask was rotated by 90 degrees in the in-plane direction, a mask image was formed on the workpiece through the mask while the workpiece was moved in the longitudinal direction, and thus continuous machining was performed in the longitudinal direction by the laser beam to form recesses. By the process described above, a mold (lens pitch: X=100 μm, Y=60 μm) was formed.

Subsequently, a conductive film composed of nickel was formed, for example, by electroless plating on the mold thus obtained. The mold provided with the conductive film was placed in an electroforming apparatus, and a nickel plating layer was formed on the conductive film by electroplating. Then, the nickel plating layer was peeled off from the mold. Thus, a duplicate mold having a concave-convex pattern reversed from that of the mold was obtained.

(3) Formation of Fly's-Eye Lens Sheet Body

First, a UV curable resin (ARONIX manufactured by Toagosei Co., Ltd.) was poured into the duplicate mold (lens pitch: X=100 μm, Y=60 μm), and a PET film (A4300 manufactured by Toyobo Co., Ltd.) with a thickness of 50 μm was disposed thereon. Then, a load of 1 kg was applied by a rubber roller to achieve a uniform thickness of lenses. Subsequently, UV light of 1,000 mJ/cm$^2$ was applied from above the PET film to cure the UV curable resin. A fly's-eye lens sheet body was thereby obtained.

(4) Formation of Light-Shielding Pattern

Subsequently, in order to form a photosensitive adhesive layer on the fly's-eye lens sheet body thus obtained, a coating material having the composition described below was prepared by mixing with a roll mill and applied to the fly's-eye lens sheet body. Drying was performed at 100° C. for 10 minutes, and a photosensitive adhesive layer with a thickness of about 10 μm was thereby formed.

(Composition of Coating Material)

| | |
|---|---|
| Acrylic acid ester | 55 parts by weight |
| Trimethylolpropane triacrylate | 40 parts by weight |
| Photoinitiator: Irgacure 184 (Trade name; manufactured by Ciba Specialty Chemicals) | 5 parts by weight |

Collimated UV light (100 mJ/cm$^2$) was applied from the side of the lenses to form concave portions in the light-collecting parts of the photosensitive adhesive layer.

(Measurement of Depth of Concave Portions)

The photosensitive adhesive layer was subjected to sampling, and the concave depth of the concave portions was measured. A non-contact three-dimensional measuring system NH-3 (manufactured by Mitaka Kohki Co., Ltd.) was used for the measurement. As a result, the concave depth of the concave portions was 1.8 μm.

(5) Transfer of Light-Shielding Pattern

Subsequently, the black transfer film prepared in (1) was laminated to the photosensitive adhesive layer side surface of the fly's-eye lens sheet body. Then, by pulling an extra portion of the black transfer film, the black transfer film was peeled off from the fly's-eye lens sheet body. Thus, the black layer was transferred to the adhesive portion of the photosensitive adhesive layer and a light-shielding layer was formed. By the process described above, a fly's-eye lens sheet having a light-shielding layer with a size of 786 mm in height and 1,362 mm in width was obtained.

A double-sided adhesive sheet (manufactured by 3M Corp.) was bonded to the surface of the light-shielding layer, and a diffuser plate was bonded to a surface opposite to the lens sheet side surface of the adhesive sheet. A fly's-eye lens screen was thereby obtained.

Example 17

First, a black transfer film and a fly's-eye lens sheet body were fabricated using the same materials and by the same process as in Example 16. Subsequently, a photosensitive adhesive layer was formed using the coating material described below, and collimated UV light (200 mJ/cm$^2$) was applied from the side of the lenses to form concave portions in the light-collecting parts of the photosensitive adhesive layer. The concave depth of the concave portions was 3 μm. Subsequently, the black layer was transferred to form a light-shielding layer. The materials and the process used were the same as in Example 16 except for the conditions described herein.

(Composition of Coating Material)

| | |
|---|---|
| Acrylic acid ester | 50 parts by weight |
| Dipentaerythritol hexaacrylate | 40 parts by weight |
| Irgacure 184 (Trade name; manufactured by Ciba Specialty Chemicals) | 5 parts by weight |

Example 18

First, a black transfer film and a fly's-eye lens sheet body were fabricated using the same materials and by the same process as in Example 16. Subsequently, a photosensitive adhesive layer was formed, and collimated UV light (50 mJ/cm$^2$) was applied from the side of the lenses to form concave portions in the light-collecting parts of the photosensitive adhesive layer. The concave depth of the concave portions was 0.05 μm. Subsequently, the black layer was transferred to form a light-shielding layer. The materials and the process used were the same as in Example 16 except for the conditions described herein.

Example 19

First, a black transfer film and a fly's-eye lens sheet body were fabricated using the same materials and by the same process as in Example 16. Subsequently, a photosensitive adhesive layer was formed, and collimated UV light (500 mJ/cm$^2$) was applied from the side of the lenses to form concave portions in the light-collecting parts of the photosensitive adhesive layer. The concave depth of the concave portions was 7 μm. Subsequently, the black layer was transferred to form a light-shielding layer. The materials and the process used were the same as in Example 16 except for the conditions described herein.

Example 20

First, the starting materials shown below were mixed, and a black transfer film was formed by the same process as in Example 16. The total light transmittance was 0.05% or less (below the detection limit of the apparatus), and the Martens hardness was 30 N/mm$^2$.

(Composition of Coating Material)

| | |
|---|---|
| Carbon black: RAVEN-1255 manufactured by Columbian Chemicals Company | 150 parts by weight |
| Binder resin: Polyester polyurethane (UR-8300 manufactured by Toyobo Co., Ltd.) | 50 parts by weight |
| Solvent: Methyl ethyl ketone | 500 parts by weight |
| Toluene | 500 parts by weight |

Then, a fly's-eye lens sheet having a light-shielding layer was fabricated using the same materials and the same process as in Example 16. The concave depth of the concave portions formed in the light-collecting parts of the photosensitive adhesive layer was 1.8 μm.

Example 21

First, the starting materials shown below were mixed, and a black transfer film was formed by the same process as in Example 16. The total light transmittance was 0.5%, and the Martens hardness was 200 N/mm².

(Composition of Coating Material)

| | |
|---|---|
| Carbon black: RAVEN-1255 manufactured by Columbian Chemicals Company | 110 parts by weight |
| Binder resin: Polyester polyurethane (UR-8300 manufactured by Toyobo Co., Ltd.) | 90 parts by weight |
| Solvent: Methyl ethyl ketone | 500 parts by weight |
| Toluene | 500 parts by weight |

Then, a fly's-eye lens sheet having a light-shielding layer was fabricated using the same materials and the same process as in Example 16. The concave depth of the concave portions formed in the light-collecting parts of the photosensitive adhesive layer was 1.8 μm.

Comparative Example 10

First, a black transfer film and a fly's-eye lens sheet body were fabricated using the same materials and by the same process as in Example 16. The total light transmittance was 0.1%, and the Martens hardness was 80 N/mm². Subsequently, a photosensitive adhesive layer was formed, and collimated UV light (100 mJ/cm²) was applied from the side of the lenses to form concave portions in the light-collecting parts of the photosensitive adhesive layer. The concave depth of the concave portions was 0.03 μm. Subsequently, the black layer was transferred to form a light-shielding layer. The materials and the process used were the same as in Example 16 except for the conditions described herein.

(Composition of Coating Material)

| | |
|---|---|
| Acrylic acid ester | 60 parts by weight |
| 2-Ethylhexanol acrylate | 35 parts by weight |
| Irgacure 184 (Trade name; manufactured by Ciba Specialty Chemicals) | 5 parts by weight |

Comparative Example 11

First, the starting materials shown below were mixed, and a black transfer film was formed by the same process as in Example 16. The total light transmittance was 0.05% or less (below the detection limit of the apparatus), and the Martens hardness was 20 N/mm². The film cohesion of the black layer was low and powder-falling occurred. Therefore, the evaluation of the subsequent steps was cancelled.

(Composition of Coating Material)

| | |
|---|---|
| Carbon black: RAVEN-1255 manufactured by Columbian Chemicals Company | 140 parts by weight |
| Binder resin: Polyester polyurethane (UR-8300 manufactured by Toyobo Co., Ltd.) | 60 parts by weight |
| Solvent: Methyl ethyl ketone | 500 parts by weight |
| Toluene | 500 parts by weight |

Comparative Example 12

First, the starting materials shown below were mixed, and a black transfer film was formed by the same process as in Example 16. The total transmittance was 1.5%, and the Martens hardness was 220 N/mm².

| | |
|---|---|
| Carbon black: RAVEN-1255 manufactured by Columbian Chemicals Company | 80 parts by weight |
| Binder resin: Polyester polyurethane (UR-8300 manufactured by Toyobo Co., Ltd.) | 120 parts by weight |
| Solvent: Methyl ethyl ketone | 500 parts by weight |
| Toluene | 500 parts by weight |

Then, a fly's-eye lens sheet having a light-shielding layer was fabricated using the same materials and the same process as in Example 16. The concave depth of the concave portions formed in the light-collecting parts of the photosensitive adhesive layer was 1.8 μm.

[Evaluation Methods]

With respect to the fly's-eye lens sheet having the light-shielding layer in each of Examples 16 to 21 and Comparative Examples 10 to 12, evaluations were conducted on the following items.

Evaluation of Fly's-Eye Lens Sheet Having Light-Shielding Layer (a) Measurement of the Area Ratio of Light-Shielding Portion and Confirmation of the Shape of Transmitting Portions A 1-cm-square sample was cut from a given point of the fly's-eye lens sheet having the light-shielding layer in each of the examples and comparative examples. The surface of the light-shielding layer in each sample was photographed with an optical microscope, and using image analysis software, the area ratio of the light-shielding portion was measured. Simultaneously, the shape of the transmitting portions was observed with the optical microscope.

(b) Measurement of Total Light Transmittance

The measurement was conducted while light was allowed to enter from the lens side of the fly's-eye lens sheet having the light-shielding layer in each of the examples and comparative examples. As the evaluation apparatus, a haze meter HM-150 manufactured by Murakami Color Research Laboratory was used. The evaluation was performed under the conditions according to JIS K-7361.

(c) Evaluation of Contrast

A portion of a lenticular lens screen was cut from a rear projection television ("Grand Wega") manufactured by Sony Corporation, and the fly's-eye lens sheet having the light-shielding layer in each of the examples and comparative examples was fitted and fixed in the cut-away portion. An image was projected, and comparison was made with the portion composed of the lenticular lens sheet as a known lens sheet. Evaluations were conducted on the basis of the following three criteria:

Poor: Contrast is inferior to known lens sheet
Average: Contrast is equal to known lens sheet
Good: Contrast is superior to known lens sheet The measurement results in the examples and comparative examples are shown in Tables 6 and 7.

TABLE 6

| | | | Examples | | | | | |
|---|---|---|---|---|---|---|---|---|
| | | | Example 16 | Example 17 | Example 18 | Example 19 | Example 20 | Example 21 |
| Black transfer film | Thickness of black layer | (μm) | 1.0 | 1.0 | 1.0 | 1.0 | 1.0 | 1.0 |
| | Carbon content | (wt %) | 60 | 60 | 60 | 60 | 75 | 45 |
| | Total light transmittance | (%) | 0.1 | 0.1 | 0.1 | 0.1 | 0.05 | 0.5 |
| | Martens hardness | (N/mm$^2$) | 80 | 80 | 80 | 80 | 30 | 200 |
| Lens | Pitch | X(μm) | 100 | 100 | 100 | 100 | 100 | 100 |
| | | Y(μm) | 60 | 60 | 60 | 60 | 60 | 60 |
| | Sag (depth) | (μm) | 45 | 45 | 45 | 45 | 45 | 45 |
| Base | Type | — | PET | PET | PET | PET | PET | PET |
| | Thickness | (μm) | 50 | 50 | 50 | 50 | 50 | 50 |
| Photosensitive adhesive layer | Concave depth | (μm) | 1.8 | 3 | 0.05 | 7 | 1.8 | 1.8 |
| Light-shielding layer | Thickness | (μm) | 1.0 | 1.0 | 1.0 | 1.0 | 1.0 | 1.0 |
| | shape of opening | | Quadrangular | Quadrangular | Quadrangular | Quadrangular | Quadrangular | Quadrangular |
| Lens sheet | Total light transmittance (incident from lens side) | (%) | 90 | 90 | 85 | 80 | 90 | 90 |
| | Light-shielding portion area ratio | (%) | 90 | 90 | 93 | 90 | 90 | 90 |
| | Contrast | | Good | Good | Average | Average | Good | Good |

TABLE 7

| | | | Comparative Examples | | |
|---|---|---|---|---|---|
| | | | Comparative Example 10 | Comparative Example 11 | Comparative Example 12 |
| Black transfer film | Thickness of black layer | (μm) | 1.0 | 1.0 | 1.0 |
| | Carbon content | (wt %) | 60 | 70 | 40 |
| | Total light transmittance | (%) | 0.1 | 0.05 | 1.5 |
| | Martens hardness | (N/mm$^2$) | 80 | 20 | 220 |
| Lens | Pitch | X(μm) | 100 | | 100 |
| | | Y(μm) | 60 | | 60 |
| | Sag (depth) | (μm) | 45 | | 45 |
| Base | Type | — | PET | | PET |
| | Thickness | (μm) | 50 | | 50 |
| Photosensitive adhesive layer | Concave depth | (μm) | 0.03 | | 1.8 |
| Light-shielding layer | Thickness | (μm) | 1.0 | | 1.0 |
| | Shape of opening | | Quadrangular | | Irregular |
| Lens sheet | Total light transmittance (incident from lens side) | (%) | 60 | | 85 |
| | Light-shielding portion area ratio | (%) | 95 | | 50 |
| | Contrast | | Poor | | Poor |

In the fly's-eye lens sheet having the light-shielding layer in each of Examples 16, 17, 20, and 21, the light-shielding portion area ratio was high, and the total light transmittance in the transmitting portions was also high. Thus, good results were obtained.

In Example 18, the concave depth of the concave portions was small at 0.05 μm, and the black layer, and the black layer partially adhered to the transmitting portions. However, the total light transmittance was higher than that of the known lens sheet.

In Example 19, since the concave depth of the concave portions is large, an air space was formed between the photosensitive adhesive layer and the adhesive layer of the diffuser plate, and interface reflection was caused. As a result, the total light transmittance was slightly decreased. However, the total light transmittance was higher than that of the known lens sheet.

In the fly's-eye lens screen in Comparative Example 10 in which the concave depth of the transmitting portions was less than 0.05 μm, since the black layer remained in the transmitting portions, the resulting lens sheet was dark at a total light transmittance of 60%.

In the fly's-eye lens screen in Comparative Example 12 in which the Martens hardness exceeded 200 N/mm², since the film cohesion of the black layer was high, it was difficult to form the light-shielding layer according to the shape of light collection by the lenses. As a result, the light-shielding portion area ratio was low, and the contrast was poor.

Examples 22 to 27

Example 22

(1) Formation of Black Transfer Film

The starting materials shown below were mixed and dispersed for a predetermined time using a ball mill, and then the mixture was passed through a filter with a diameter of 5 μm. Thus, a coating material for a black transfer film was prepared.

(Composition of Coating Material)

| | |
|---|---|
| Carbon black: RAVEN-1255 manufactured by Columbian Chemicals Company | 130 parts by weight |
| Binder resin: Polyester polyurethane (UR-8300 manufactured by Toyobo Co., Ltd.) | 70 parts by weight |
| Solvent: Methyl ethyl ketone | 500 parts by weight |
| Toluene | 500 parts by weight |

The coating material was applied to the surface of a PET film ("Lumirror" manufactured by Toray Industries, Inc.) with a thickness of 12 μm such that the film thickness after drying was 1 μm, followed by drying, and heat treatment was performed at 60° C. for 48 hours. The intended black transfer film was thereby obtained.

(2) Formation of Duplicate Mold

As the machine for forming a mold, a laser micromachining system MAS-300 manufactured by OPTEC s.a., Belgium, was used. As the mask, a mask in which a plurality of nail-like transmitting portions were arrayed in rows was used. As the workpiece, a substrate composed of polycarbonate was used.

First, a mask image was formed on the workpiece through the mask while the workpiece was moved in the lateral direction, and thus continuous machining was performed in the lateral direction by a laser beam to form recesses. Subsequently, after the mask was rotated by 90 degrees in the in-plane direction, a mask image was formed on the workpiece through the mask while the workpiece was moved in the longitudinal direction, and thus continuous machining was performed in the longitudinal direction by the laser beam to form recesses. By the process described above, a mold (lens pitch: X=100 μm, Y=60 μm) was formed.

Subsequently, a conductive film composed of nickel was formed, for example, by electroless plating on the mold thus obtained. The mold provided with the conductive film was placed in an electroforming apparatus, and a nickel plating layer was formed on the conductive film by electroplating. Then, the nickel plating layer was peeled off from the mold. Thus, a duplicate mold having a concave-convex pattern reversed from that of the mold was obtained.

Subsequently, a nickel plating layer was formed by electroplating on the surface provided with the concave-convex pattern of the resulting duplicate mold. Then the nickel plating layer was peeled off from the duplicate mold. Thus, a duplicate mold having the same concave-convex shape as that of the mold was formed.

(3) Formation of Fly's-Eye Lens Sheet Body

First, a UV curable resin (ARONIX manufactured by Toagosei Co., Ltd.) was poured into the duplicate mold for fly's-eye lenses (lens pitch: X=100 μm, Y=60 μm), and a PET film (A4300 manufactured by Toyobo Co., Ltd.) with a thickness of 50 μm was disposed thereon. Then, a load of 1 kg was applied by a rubber roller to achieve a uniform thickness of lenses. Subsequently, UV light of 1,000 mJ/cm² was applied from above the PET film to cure the UV curable resin. A fly's-eye lens sheet body was thereby obtained.

Measurement of Heat Shrinkage Ratio

The heat shrinkage ratio in the width direction (narrow-side direction of the screen) of the PET film during the formation was measured. As the measurement apparatus, an "EXSTAR TMA/SS6000" manufactured by SII NanoTechnology Inc. was used. The measurement was conducted under the conditions of 150° C. and 30 minutes. As a result, the heat shrinkage ratio was 0.2%.

(4) Formation of Light-Shielding Pattern

Subsequently, a photosensitive adhesive (manufactured by Toagosei Co., Ltd.) was applied to the fly's-eye lens sheet body thus obtained, and collimated UV light (500 mJ/cm²) was applied from the side of the lenses to form adhesive and non-adhesive patterns.

(5) Transfer of Light-Shielding Pattern

Subsequently, the black transfer film prepared in (1) was laminated to the photosensitive adhesive layer side surface of the fly's-eye lens sheet body. Then, by pulling an extra portion of the black transfer film, the black transfer film was peeled off from the fly's-eye lens sheet body. Thus, the black layer was transferred to the adhesive portion of the photosensitive adhesive layer and a light-shielding layer having a target area ratio of the light-shielding portion of 90% was formed. By the process described above, a fly's-eye lens sheet having a light-shielding layer with a size of 786 mm in height and 1,362 mm in width was obtained.

(6) Formation of Hard Coat Layer on Plastic Plate

A solventless, matting agent-containing hard coat material (manufactured by Chugoku Marine Paint, Ltd.) was applied to one surface of a plastic plate (MS plate; manufactured by Japan Acryace Corporation) with a bar coater, and curing was performed by irradiation using a UV irradiation apparatus (manufactured by Ushio Inc.) at 500 mJ/cm². Thus, a hard coat layer with a thickness of 10 μm was formed.

(7) Formation of Adhesive Layer

In order to form an adhesive layer on the other surface of the plastic plate, the components described below were mixed with a roll mill to prepare a coating material, and coating was performed, followed by drying at 100° C. for 5 minutes. An adhesive layer with a thickness of about 50 μm was thereby formed.

(Composition of Coating Material)

| | |
|---|---|
| Butyl acrylate | 90 parts by weight |
| Acrylic acid | 5 parts by weight |
| Vinyl acetate | 5 parts by weight |
| Isocyanate crosslinking agent | 3 parts by weight |

Measurement of Young's Modulus

The Young's modulus of the adhesive layer was measured. As the measurement apparatus, a viscoelasticity analyzer "DVA-220" manufactured by IT Keisoku Seigyo Co., Ltd. was used. The measurement was conducted under tensile conditions (5 Hz). Viscoelastic curves were determined, and the maximum value and the minimum value of the storage modulus at 100° C. to 200° C. were read from the graph. The results were as follows: minimum $2 \times 10^4$ Pa (100° C.) and maximum $5 \times 10^4$ Pa (200° C.).

(8) Lamination

The machining direction of the base film of the fly's-eye lens sheet body was aligned with the long-side direction of the plastic plate (or screen), and lamination was performed. A high-accuracy laminator (HAL, manufactured by Sankyo co., Ltd.) was used for the lamination.

Example 23

First, a black transfer film and a fly's-eye lens sheet having a light-shielding layer were fabricated using the same materials and by the same process as in Example 22. Subsequently, a hard coat layer with a thickness of 10 μm was formed on one surface of a plastic plate using the same material as in Example 22. An adhesive layer with the composition described below was formed on the other surface of the plastic plate. The thickness of the adhesive layer was set at 20 μm. The Young's modulus was as follows: minimum $1 \times 10^4$ Pa (100° C.) and maximum $5 \times 10^4$ Pa (200° C.). The machining direction of the base film of the fly's-eye lens sheet body was aligned with the long-side direction of the plastic plate, and lamination was performed by the same process as in Example 22. A fly's-eye lens screen was thereby fabricated.

(Composition of Coating Material)

| | |
|---|---|
| Butyl acrylate | 80 parts by weight |
| Acrylic acid | 10 parts by weight |
| Vinyl acetate | 10 parts by weight |
| Isocyanate crosslinking agent | 1 part by weight |

The fabrication was performed using the same materials and by the same process as in Example 22 except for the conditions described herein.

Example 24

The fabrication was performed using the same materials and by the same process as in Example 22 except that the thickness of the adhesive layer was set at 125 μm.

Example 25

The fabrication was performed using the same materials and by the same process as in Example 22 except that the thickness of the adhesive layer was set at 50 μm and that the coating material having the composition described below was used. The Young's modulus of the adhesive layer was as follows: minimum $4 \times 10^4$ Pa (100° C.) and maximum $9 \times 10^4$ Pa (200° C.). As the plastic plate, a warped plate was used.

(Composition of Coating Material)

| | |
|---|---|
| Butyl acrylate | 80 parts by weight |
| Acrylic acid | 10 parts by weight |
| Vinyl acetate | 5 parts by weight |
| Isocyanate crosslinking agent | 5 parts by weight |

Example 26

The fabrication was performed using the same materials and by the same process as in Example 22 except that the thickness of the base film of the fly's-eye lens sheet body was set at 38 μm. The heat shrinkage ratio was 0.4%.

Example 27

The fabrication was performed using the same materials and by the same process as in Example 22 except that the thickness of the base film of the fly's-eye lens sheet body was set at 100 μm. The heat shrinkage ratio was 0.05%.

Comparative Example 13

The fabrication was performed using the same materials and by the same process as in Example 22 except that the thickness of the adhesive layer was set at 150 μm.

Comparative Example 14

The fabrication was performed using the same materials and by the same process as in Example 22 except that the thickness of the adhesive layer was set at 10 μm.

Comparative Example 15

The fabrication was performed using the same materials and by the same process as in Example 22 except that the thickness of the adhesive layer was set at 50 μm and that the coating material having the composition described below was used. The Young's modulus of the adhesive layer was as follows: minimum $7 \times 10^4$ Pa (100° C.) and maximum $5 \times 10^5$ Pa (200° C.).

(Composition of Coating Material)

| | |
|---|---|
| Butyl acrylate | 85 parts by weight |
| Acrylic acid | 10 parts by weight |
| Vinyl acetate | 5 parts by weight |
| Isocyanate crosslinking agent | 20 parts by weight |

Comparative Example 16

First, a black transfer film and a fly's-eye lens sheet having a light-shielding layer were fabricated using the same materials and by the same process as in Example 22. The machining direction of the base film of the fly's-eye lens sheet body was aligned with the narrow-side direction of the plastic plate (or screen), and lamination was performed by the same process as in Example 22. A fly's-eye lens screen was thereby fabricated. The heat shrinkage ratio of the base film was 1.0%.

[Evaluation Methods]

With respect to the fly's-eye lens screen in each of Examples 22 to 27 and Comparative Examples 13 to 16, evaluations were conducted on the following items before and after environmental testing.

(Environmental Testing Conditions)
1. Measurement of amount of warpage and confirmation of distortion of image in an environment of 25° C. and 50%
2. Measurement of amount of warpage after being stored in an environment of 60° C. and 90% for 24 hours
3. Measurement of amount of warpage and confirmation of distortion of image in an environment of 25° C. and 50% after being left to stand for 24 hours.

[Evaluation of Amount of Warpage of Screen]

The hard coat surface of the plastic plate was disposed so as to face the front side, and the screen was suspended with the upper-left corner being a supporting point. A string was stretched across the screen from the center of the upper side to the center of the lower side (in the narrow-side direction), and the vertical distance between the string and the plastic plate was measured with a carpenter's square. The amount of warpage was recorded in each environment, and the difference between the maximum value and the minimum value was defined as the amount of change in warpage.

[Evaluation of Distortion of Image]

A lenticular lens screen was detached from a rear projection television ("Grand Wega") manufactured by Sony Corporation, and the fly's-eye lens screen in each of the examples and comparative examples was fitted and fixed therein. A grid pattern was projected before and after the storage in the environment, and the presence or absence of distortion of the image was confirmed.

The measurement results in the examples and comparative examples are shown in Tables 8 and 9.

TABLE 8

| | | | Examples | | | | | |
|---|---|---|---|---|---|---|---|---|
| | | | Example 22 | Example 23 | Example 24 | Example 25 | Example 26 | Example 27 |
| Structure | | | | | | | | |
| Adhesive layer | Thickness | (µm) | 50 | 20 | 125 | 50 | 50 | 50 |
| | Young's modulus (minimum) | (Pa) | 2.E+04 | 1.E+04 | 2.E+04 | 4.E+04 | 2.E+04 | 2.E+04 |
| | Young's modulus (maximum) | (Pa) | 5.E+04 | 5.E+04 | 5.E+04 | 9.E+04 | 5.E+04 | 5.E+04 |
| Lamination direction | Screen | | Narrow side | Narrow side | Narrow side | Narrow side | Narrow side | Narrow side |
| | Lens sheet base direction | | Width direction | Width direction | Width direction | Width direction | Width direction | Width direction |
| Base | Thickness | (µm) | 50 | 50 | 50 | 50 | 38 | 100 |
| | Heat shrinkage (narrow-side direction of screen) | (%) | 0.2 | 0.2 | 0.2 | 0.2 | 0.4 | 0.05 |
| Evaluation results | | | | | | | | |
| Warpage | Warping | Performed/ Not performed | Not performed | Not performed | Not performed | Performed | Not performed | Not performed |
| | Amount of change in warpage in narrow side | (mm) | 15 | 27 | 13 | 13 | 10 | 18 |
| | Change before and after storage (value after storage in environment— initial value) | (mm) | 1 | 5 | 0 | 2 | 1 | 3 |
| Image | Distortion | | Good | Average | Good | Good | Good | Good |
| | Decrease in transmittance due to excessive light-shielding portion | | Good | Average | Good | Good | Good | Good |

TABLE 9

|  |  |  | Comparative Examples | | | |
|---|---|---|---|---|---|---|
|  |  |  | Comparative Example 13 | Comparative Example 14 | Comparative Example 15 | Comparative Example 16 |
| Structure | | | | | | |
| Adhesive layer | Thickness | (μm) | 150 | 10 | 50 | 50 |
|  | Young's modulus (minimum) | (Pa) | 2.E+04 | 2.E+04 | 7.E+04 | 2.E+04 |
|  | Young's modulus (maximum) | (Pa) | 5.E+04 | 5.E+04 | 5.E+05 | 5.E+04 |
| Lamination direction | Screen Lens sheet base direction | | Narrow side Width direction | Narrow side Width direction | Narrow side Width direction | Narrow side Machining direction |
| Base | Thickness | (μm) | 50 | 50 | 50 | 50 |
|  | Heat shrinkage (narrow-side direction of screen) | (%) | 0.2 | 0.2 | 0.2 | 1 |
| Evaluation results | | | | | | |
| Warpage | Warping | Performed/ Not performed | Not performed | Not performed | Not performed | Not performed |
|  | Amount of change in warpage in narrow side | (mm) | 13 | 25 | 13 | 28 |
|  | Change before and after storage (value after storage in environment— initial value) | (mm) | 0 | −7 | −3 | −10 |
| Image | Distortion | | Good | Poor | Poor | Poor |
|  | Decrease in transmittance due to excessive light-shielding portion | | Good | Poor | Poor | Poor |

With respect to the fly's-eye lens sheet having the light-shielding layer in each of Examples 22 to 27, the amount of change in warpage during storage in the environment was small, and after storage in the environment, the original shape was substantially recovered. Distortion of the image and a decrease in transmittance due to an excessive light-shielding portion were not observed. Thus, good results were obtained.

With respect to Comparative Example 13, although the evaluations on image were good, the thickness of the adhesive layer was large, and there was concern about the problem of workability in the fabrication process and the increase in the material costs.

In the fly's-eye lens screen of Comparative Example 14 in which the thickness of the adhesive layer was less than 20 μm, the amount of change in warpage during storage in the environment was large, and the change from the initial value to the value after the temperature was decreased to the normal temperature was −7 mm. If the warpage changes to the negative value, the degree of parallelization with respect to the Fresnel lens sheet greatly changes, and distortion of the image becomes significant. In Comparative Example 14, such a phenomenon was confirmed.

In Comparative Example 15, in which the Young's modulus of the adhesive layer exceeded $1 \times 10^5$ Pa, the change from the initial value to the value after the temperature was decreased to the normal temperature was −3 mm, and distortion of image was confirmed.

In Comparative Example 16 in which the machining direction of the base film the fly's-eye lens sheet body was aligned with the narrow-side direction of the screen, since the machining direction in which the heat shrinkage of the base film is large was aligned with the narrow-side direction of the screen, the change from the initial value to the value after the temperature was decreased to the normal temperature was −10 mm, and distortion of the image was confirmed.

It is to be understood that the present invention is not limited to the embodiments described above, and various modifications are possible without departing from the true spirit and scope of the present invention.

For example, the numerical values stated in the individual embodiments are merely examples, and different numerical values may be used according to need.

Furthermore, the optical system to which the present invention is applicable is not particularly limited. Examples of the optical system include a screen for a rear projection television, a rear projection television including transmissive liquid crystal elements, a rear projection television including DLP elements, and a rear projection television including reflective liquid crystal elements (LCOS). When the present invention is applied to these devices, good image contrast can be obtained, thus being advantageous.

Furthermore, the aspect ratio (XY ratio) of the lens pitch is not limited to the individual embodiments. The aspect ratio may be appropriately selected depending on desired characteristics of a fly's-eye lens sheet having a light-shielding layer, a transmissive screen, or the like.

In each of the embodiments described above, the case in which a duplicate mold is formed from a mold, and a fly's-eye lens sheet is formed using the duplicate mold is taken as the example. It may also be possible to form a fly's-eye lens sheet directly from a mold.

In each of the embodiments described above, the case in which a fly's-eye lens sheet having a quadrangular shape, an X shape, a linear shape, or a modified shape thereof is fabricated is taken as the example. However, present invention is not limited thereto. For example, by appropriately changing the shape of the mask used for machining in each of the x-axis direction (lateral direction) and the y-axis direction (longitudinal direction), the workpiece can be formed into a given shape.

Furthermore, in each of the embodiments described above, the case in which the present invention is applied to a fly's-eye lens sheet having a light-shielding layer including lenses having a quadrangular shape, an X shape, a linear shape, or a modified shape thereof is taken as the example. However, the shape of lenses is not limited thereto. For example, the present invention is also applicable to a fly's-eye lens sheet having a light-shielding layer including lenses having a polygonal shape, such as a triangle, pentagonal, hexagonal, or octagonal shape. Furthermore, in the step of forming a mold for the fly's-eye lens sheet, when the workpiece is machined in the lateral direction and in the longitudinal direction, by changing the shape of the mask according to the direction, it is possible to form a given shape.

Furthermore, each of the embodiments described above, the case in which the present invention is applied to a rear projection display device in which a projector and a transmissive screen are separated is taken as the example. However, it may also be possible to apply the present invention to a rear projection display device in which a projector and a screen are enclosed in a box cabinet and combined.

It should be understood by those skilled in the art that various modifications, combinations, sub-combinations and alterations may occur depending on design requirements and other factors insofar as they are within the scope of the appended claims or the equivalents thereof.

What is claimed is:

1. A fly's-eye lens sheet having a light-shielding layer, comprising:
    a fly's-eye lens sheet body provided with fly's-eye lenses on one principal surface thereof; the light-shielding layer provided on an other principal surface of the fly's-eye lens sheet body; and
    a photosensitive adhesive layer disposed between the fly's-eye lens sheet body and the light-shielding layer, the photosensitive adhesive layer having adhesive and non-adhesive patterns, wherein
    the light-shielding layer includes a light-shielding portion disposed on the adhesive pattern and transmitting portions disposed on the non-adhesive pattern for transmitting light transmitted through the fly's-eye lenses,
    the transmitting portions are located at positions corresponding to light-collecting parts of the fly's-eye lenses,
    the light-shielding portion contains carbon particles, a carbon content of the carbon particles being 45% to 65% by weight, and
    the transmitting portions have an X shape or a modified X shape.

2. The fly's-eye lens sheet having the light-shielding layer according to claim 1, wherein the transmitting portions have a quadrangular shape or a modified quadrangular shape.

3. The fly's-eye lens sheet having the light-shielding layer according to claim 1, wherein the transmitting portions have a linear shape or a modified linear shape.

4. The fly's-eye lens sheet having the light-shielding layer according to claim 1, wherein the fly's-eye lenses have an aspherical shape.

5. The fly's-eye lens sheet having the light-shielding layer according to claim 1, wherein an area of the light-shielding portion is 70% or more of an area of the light-shielding layer.

6. The fly's-eye lens sheet having the light-shielding layer according to claim 1, wherein concave portions are disposed on a light-shielding layer-side surface of the non-adhesive pattern.

7. The fly's-eye lens sheet having the light-shielding layer according to claim 6, wherein the concave portions have a depth of 0.05 μm or more.

8. The fly's-eye lens sheet having the light-shielding layer according to claim 1, wherein the light-shielding layer has a thickness of 0.5 to 2.0 μm.

9. The fly's-eye lens sheet having the light-shielding layer according to claim 1, wherein the light-shielding portion has a transmittance of 2.0% or less.

10. The fly's-eye lens sheet having the light-shielding layer according to claim 1, wherein the light-shielding portion has a Martens hardness of 30 to 200 N/mm$^2$.

11. The fly's-eye lens sheet having the light-shielding layer according to claim 1, wherein a pitch of the fly's-eye lenses is 35 to 150 μm.

12. The fly's-eye lens sheet having the light-shielding layer according to claim 1, wherein the fly's-eye lens sheet body includes the fly's-eye lens and a film-like support base supporting the fly's-eye lenses, and the support base has a thickness of 35 to 105 μm.

13. The fly's-eye lens sheet having the light-shielding layer according to claim 1, wherein a total light transmittance from a lens side is 65% or more with respect to the fly's-eye lens sheet provided with the light-shielding layer.

14. The fly's-eye lens sheet having the light-shielding layer according to claim 1, wherein a plastic plate is laminated to the light-shielding layer with a transparent adhesive layer therebetween and the adhesive layer has a thickness of 20 to 125 μm and a modulus of elasticity of $1 \times 10^4$ to $1 \times 10^5$ Pa in a range of 100° C. to 200° C.

15. The fly's-eye lens sheet having the light-shielding layer according to claim 14, wherein the plastic plate has a light-diffusion function.

16. A transmissive screen, comprising:
    a Fresnel lens sheet; and
    a fly's-eye lens sheet having a light-shielding layer,
    wherein the fly's-eye lens sheet having the light-shielding layer includes
        a fly's-eye lens sheet body provided with fly's-eye lenses on one principal surface thereof,
        the light-shielding layer provided on an other principal surface of the fly's-eye lens sheet body, and
        a photosensitive adhesive layer disposed between the fly's-eye lens sheet body and the light-shielding layer, the photosensitive adhesive layer having adhesive and non-adhesive patterns,
    wherein the light-shielding layer includes a light-shielding portion disposed on the adhesive pattern and transmitting portions disposed on the non-adhesive pattern for transmitting light transmitted through the fly's-eye lenses,
    the transmitting portions are located at positions corresponding to light-collecting parts of the fly's-eye lenses,
    the light-shielding portion contains carbon particles, a carbon content of the carbon particles being 45% to 65% by weight, and
    the transmitting portions have an X shape or a modified X shape.

17. The transmissive screen according to claim 16, wherein the fly's-eye lens sheet body includes the fly's-eye lens and a film-like support base supporting the fly's-eye lenses, and a machining direction during a film formation of the support base is aligned with a long-side direction of the screen.

18. The transmissive screen according to claim 17, wherein a heat shrinkage rate in a width direction during the film formation of the support base is 0.4% or less.

19. A rear projection image display devices comprising:
a projector; and
a transmissive screen which transmits and displays an image projected from the projector,
wherein the transmissive screen includes
a Fresnel lens sheet; and
a fly's-eye lens sheet having a light-shielding layer,
wherein the fly's-eye lens sheet having the light-shielding layer includes
a fly's-eye lens sheet body provided with fly's-eye lenses on one principal surface thereof,
the light-shielding layer provided on an other principal surface of the fly's-eye lens sheet body, and
a photosensitive adhesive layer disposed between the fly's-eye lens sheet body and the light-shielding layer, the photosensitive adhesive layer having adhesive and non-adhesive patterns,
wherein the light-shielding layer includes a light-shielding portion disposed on the adhesive pattern and transmitting portions disposed on the non-adhesive pattern for transmitting light transmitted through the fly's-eye lenses,
the transmitting portions are located at positions corresponding to light-collecting parts of the fly's-eye lenses,
the light-shielding portion contains carbon particles, a carbon content of the carbon particles being 45% to 65% by weight, and
the transmitting portions have an X shape or a modified X shape.

* * * * *